US012789088B2

(12) United States Patent
Kaplan et al.

(10) Patent No.: US 12,789,088 B2
(45) Date of Patent: Nov. 10, 2026

(54) COLLABORATIVE PLATFORM UTILIZING DRAWINGS AND SENTIMENT ANALYSIS

(71) Applicant: Scribl, Inc., Pawtucket, RI (US)

(72) Inventors: Matthew Kaplan, Warwick, RI (US); Jeffrey Sparr, Pawtucket, RI (US); Eric Rice, Providence, RI (US)

(73) Assignee: Scribl, Inc., Pawtucket, RI (US)

( * ) Notice: Subject to any disclaimer, the term of this patent is extended or adjusted under 35 U.S.C. 154(b) by 134 days.

(21) Appl. No.: 18/956,695

(22) Filed: Nov. 22, 2024

(65) Prior Publication Data

US 2025/0161812 A1 May 22, 2025

Related U.S. Application Data

(60) Provisional application No. 63/637,083, filed on Apr. 22, 2024, provisional application No. 63/602,131, filed on Nov. 22, 2023.

(51) Int. Cl.

| | |
|---|---|
| ***A63F 13/533*** | (2014.01) |
| ***A63F 13/48*** | (2014.01) |
| ***A63F 13/67*** | (2014.01) |
| ***G06T 11/60*** | (2026.01) |

(52) U.S. Cl.

CPC ............ *A63F 13/533* (2014.09); *A63F 13/48* (2014.09); *A63F 13/67* (2014.09); *G06T 11/60* (2013.01); *G06T 2200/24* (2013.01)

(58) Field of Classification Search

CPC ........ A63F 13/533; A63F 13/48; A63F 13/67; G06T 11/60; G06T 2200/24

See application file for complete search history.

(56) References Cited

U.S. PATENT DOCUMENTS

| | | | | |
|---|---|---|---|---|
| 2014/0045590 | A1* | 2/2014 | Smith-Stout | A63F 13/45 463/31 |
| 2016/0101360 | A1* | 4/2016 | Yan | H04L 67/131 463/29 |
| 2020/0162522 | A1 | 5/2020 | Taine et al. | |
| 2021/0398164 | A1 | 12/2021 | Ken-Dror | |
| 2023/0053425 | A1 | 2/2023 | Arat et al. | |
| 2025/0005822 | A1* | 1/2025 | Xuan | G06F 16/535 |

OTHER PUBLICATIONS

International Search Report and Written Opinion dated Jan. 29, 2025, in connection with International Application No. PCT/US2024/057047.

* cited by examiner

*Primary Examiner* — Kang Hu

(74) *Attorney, Agent, or Firm* — Wolf, Greenfield & Sacks, P.C.

(57) ABSTRACT

Techniques for enabling collaborative sessions between participant computing devices. Drawing inputs and sentiment inputs collected during a collaborative session are used to generate artwork that can be shared among the participant computing devices.

20 Claims, 80 Drawing Sheets

A collage of the player's drawings can be combined with a heatmap.

FIG. 15B
1511
scribl
Players Joining
A few more seconds now!

FIG. 15K
1520
One last thing before you leave!
How are you feeling now?

1611

FIG. 38B
3802
scribl
How are you feeling?
Relaxed
Optimistic
Kind
Helpful
None of the above
Let's Play!

FIG. 39A
3900
Thanks for playing.
When you started you felt Weary, how are you feeling now?
Finish Game

4500

COLLABORATIVE PLATFORM UTILIZING DRAWINGS AND SENTIMENT ANALYSIS

CROSS-REFERENCE TO RELATED APPLICATIONS

This application claims the benefit of priority under 35 U.S.C. 119(e) to U.S. Provisional Patent Application Ser. No. 63/602,131, filed on Nov. 22, 2023, titled "Collaborative Platform Utilizing Drawings and Sentiment Analysis", and U.S. Provisional Patent Application Ser. No. 63/637,083, filed on Apr. 22, 2024, titled "Collaborative Platform Utilizing Drawings and Sentiment Analysis," which are hereby incorporated by reference herein in their entirety.

BACKGROUND

Online collaboration tools used by organizations allow participants (e.g., employees or workers) to communicate with one another via messaging (e.g., text messages, video messages), and collaborate with one another using file sharing mechanisms or video conferencing platforms. For example, video conferencing platforms allow users in different locations to hold meetings over the internet. As more and more employees or workers choose to work remotely (e.g., from home or other workspace different from their physical workplace), use of such online collaboration tools has become ubiquitous.

BRIEF SUMMARY

Some embodiments provide for a method that comprises using at least one processor to perform: launching a session for each of a first computing device and a second computing device; receiving from the first computing device and during an interactive period of the session: a first input from a first user of the first computing device via a user interface of the first computing device, the first input including a first drawing corresponding to a prompt; and a second input from the first user of the first computing device, the second input indicating a sentiment of the first user of the first computing device to a story and/or drawing shared by a second user of the second computing device; receiving from the second computing device and during the interactive period of the session: a third input from the second user of the second computing device via a user interface of the second computing device, the second input including a second drawing corresponding to the prompt; and a fourth input from the second user of the second computing device, the fourth input indicating a sentiment of the second user of the second computing device to a story and/or drawing shared by the first user of the first computing device; and generating artwork using the first and second inputs received from the first user of the first computing device and the third and fourth inputs received from the second user of the second computing device.

In some embodiments, the method may include launching a session for each of a plurality of computing devices including the first and second computing devices; receiving a plurality of inputs from the plurality of computing devices during the interactive period of the session, the plurality of inputs comprising: a first set of inputs from users of plurality of computing devices, the first set of inputs comprising drawings corresponding to the prompt; and a second set of inputs from the users of the plurality of computing devices, the second set of inputs comprising inputs indicating sentiments of users to each other's drawings and/or stories shared through the respective user interfaces of the plurality of computing devices; and generating the artwork using the first set of inputs and the second set of inputs.

In some embodiments, the method may include receiving requests from the first and second computing devices to join the session, wherein the requests are generated by scanning of a machine-readable code using respective cameras of the first and second computing devices.

In some embodiments, launching a session for each of a first computing device and a second computing device comprises launching a game session for each of the first and second computing devices.

In some embodiments, generating the artwork further comprises generating the artwork using one or more session parameters.

In some embodiments, the method may include receiving a fifth input from the first user of the first computing device indicating a sentiment of the first user prior the interactive period of the session; receiving a sixth input from the first user of the first computing device indicating a sentiment of the first user after the interactive period of the session; receiving a seventh input from the second user of the second computing device indicating a sentiment of the second user prior the interactive period of the session; receiving an eighth input from the second user of the second computing device indicating a sentiment of the second user after the interactive period of the session; and wherein generating the artwork comprises generating the artwork using the first, second, third, fourth, fifth, sixth, seventh, and eighth inputs.

In some embodiments, the method may include analyzing the second input from the first user of the first computing device and the fourth input from the second user of the second computing device; and generating a background image for the artwork based on the analysis.

In some embodiments, generating the background image for the artwork comprises generating the background image using a machine learning model or a statistical model.

In some embodiments, the method may include overlaying the first input from the first user of the first computing device and the third input from the second user of the second computing device onto the background image to generate the artwork.

In some embodiments, the method may include communicating the generated artwork to the first computing device and the second computing device.

Some embodiments provide for a system that comprises at least one processor; and at least one non-transitory computer-readable storage medium storing instructions that, when executed by the at least one processor, cause the at least one processor to perform a method comprising: launching a session for each of a first computing device and a second computing device; receiving from the first computing device and during an interactive period of the session: a first input from a first user of the first computing device via a user interface of the first computing device, the first input including a first drawing corresponding to a prompt; and a second input from the first user of the first computing device, the second input indicating a sentiment of the first user of the first computing device to a story and/or drawing shared by a second user of the second computing device; receiving from the second computing device and during the interactive period of the session: a third input from the second user of the second computing device via a user interface of the second computing device, the second input including a second drawing corresponding to the prompt; and a fourth input from the second user of the second computing device, the fourth input indicating a sentiment of the second user of the second computing device to a story and/or drawing shared by the first user of the first computing device; and generating artwork using the first and second inputs received from the first user of the first computing device and the third and fourth inputs received from the second user of the second computing device.

In some embodiments, the method performed by the at least one processor may include launching a session for each of a plurality of computing devices including the first and second computing devices; receiving a plurality of inputs from the plurality of computing devices during the interactive period of the session, the plurality of inputs comprising: a first set of inputs from users of plurality of computing devices, the first set of inputs comprising drawings corresponding to the prompt; and a second set of inputs from the users of the plurality of computing devices, the second set of inputs comprising inputs indicating sentiments of users to each other's drawings and/or stories shared through the respective user interfaces of the plurality of computing devices; and generating the artwork using the first set of inputs and the second set of inputs.

In some embodiments, the method performed by the at least one processor may include receiving a fifth input from the first user of the first computing device indicating a sentiment of the first user prior the interactive period of the session; receiving a sixth input from the first user of the first computing device indicating a sentiment of the first user after the interactive period of the session; receiving a seventh input from the second user of the second computing device indicating a sentiment of the second user prior the interactive period of the session; receiving an eighth input from the second user of the second computing device indicating a sentiment of the second user after the interactive period of the session; and wherein generating the artwork comprises generating the artwork using the first, second, third, fourth, fifth, sixth, seventh, and eighth inputs.

In some embodiments, the method performed by the at least one processor may include analyzing the second input from the first user of the first computing device and the fourth input from the second user of the second computing device; and generating a background image for the artwork based on the analysis.

In some embodiments, generating the background image for the artwork comprises generating the background image using a machine learning model or a statistical model.

In some embodiments, the method performed by the at least one processor may include overlaying the first input from the first user of the first computing device and the third input from the second user of the second computing device onto the background image to generate the artwork.

In some embodiments, launching a session for each of a first computing device and a second computing device comprises launching a game session for each of the first and second computing devices.

In some embodiments, generating the artwork further comprises generating the artwork using one or more session parameters.

In some embodiments, generating the artwork further comprises generating the artwork using sentiment information received from the first and second computing devices prior to the interactive period of the session and after the interactive period of the session.

Some embodiments provide for at least one non-transitory computer-readable storage medium storing instructions that, when executed by at least one processor, cause the at least one processor to perform a method comprising: launching a session for each of a first computing device and a second computing device; receiving from the first computing device and during an interactive period of the session: a first input from a first user of the first computing device via a user interface of the first computing device, the first input including a first drawing corresponding to a prompt; and a second input from the first user of the first computing device, the second input indicating a sentiment of the first user of the first computing device to a story and/or drawing shared by a second user of the second computing device; receiving from the second computing device and during the interactive period of the session: a third input from the second user of the second computing device via a user interface of the second computing device, the second input including a second drawing corresponding to the prompt; and a fourth input from the second user of the second computing device, the fourth input indicating a sentiment of the second user of the second computing device to a story and/or drawing shared by the first user of the first computing device; and generating artwork using the first and second inputs received from the first user of the first computing device and the third and fourth inputs received from the second user of the second computing device.

In some embodiments, the method may include launching a session for each of a plurality of computing devices including the first and second computing devices; receiving a plurality of inputs from the plurality of computing devices during the interactive period of the session, the plurality of inputs comprising: a first set of inputs from users of plurality of computing devices, the first set of inputs comprising drawings corresponding to the prompt; and a second set of inputs from the users of the plurality of computing devices, the second set of inputs comprising inputs indicating sentiments of users to each other's drawings and/or stories shared through the respective user interfaces of the plurality of computing devices; and generating the artwork using the first set of inputs and the second set of inputs.

In some embodiments, the method may include receiving a fifth input from the first user of the first computing device indicating a sentiment of the first user prior the interactive period of the session; receiving a sixth input from the first user of the first computing device indicating a sentiment of the first user after the interactive period of the session; receiving a seventh input from the second user of the second computing device indicating a sentiment of the second user prior the interactive period of the session; receiving an eighth input from the second user of the second computing device indicating a sentiment of the second user after the interactive period of the session; and wherein generating the artwork comprises generating the artwork using the first, second, third, fourth, fifth, sixth, seventh, and eighth inputs.

In some embodiments, the method may include analyzing the second input from the first user of the first computing device and the fourth input from the second user of the second computing device; and generating a background image for the artwork based on the analysis.

In some embodiments, generating the background image for the artwork comprises generating the background image using a machine learning model or a statistical model.

In some embodiments, the method may include overlaying the first input from the first user of the first computing device and the third input from the second user of the second computing device onto the background image to generate the artwork.

In some embodiments, launching a session for each of a first computing device and a second computing device comprises launching a game session for each of the first and second computing devices.

In some embodiments, generating the artwork further comprises generating the artwork using one or more session parameters.

In some embodiments, generating the artwork further comprises generating the artwork using sentiment information received from the first and second computing devices prior to the interactive period of the session and after the interactive period of the session.

BRIEF DESCRIPTION OF DRAWINGS

Various aspects and embodiments will be described herein with reference to the following figures. It should be appreciated that the figures are not necessarily drawn to scale. Items appearing in multiple figures are indicated by the same or similar reference number in all the figures in which they appear.

DETAILED DESCRIPTION

Figure 1:
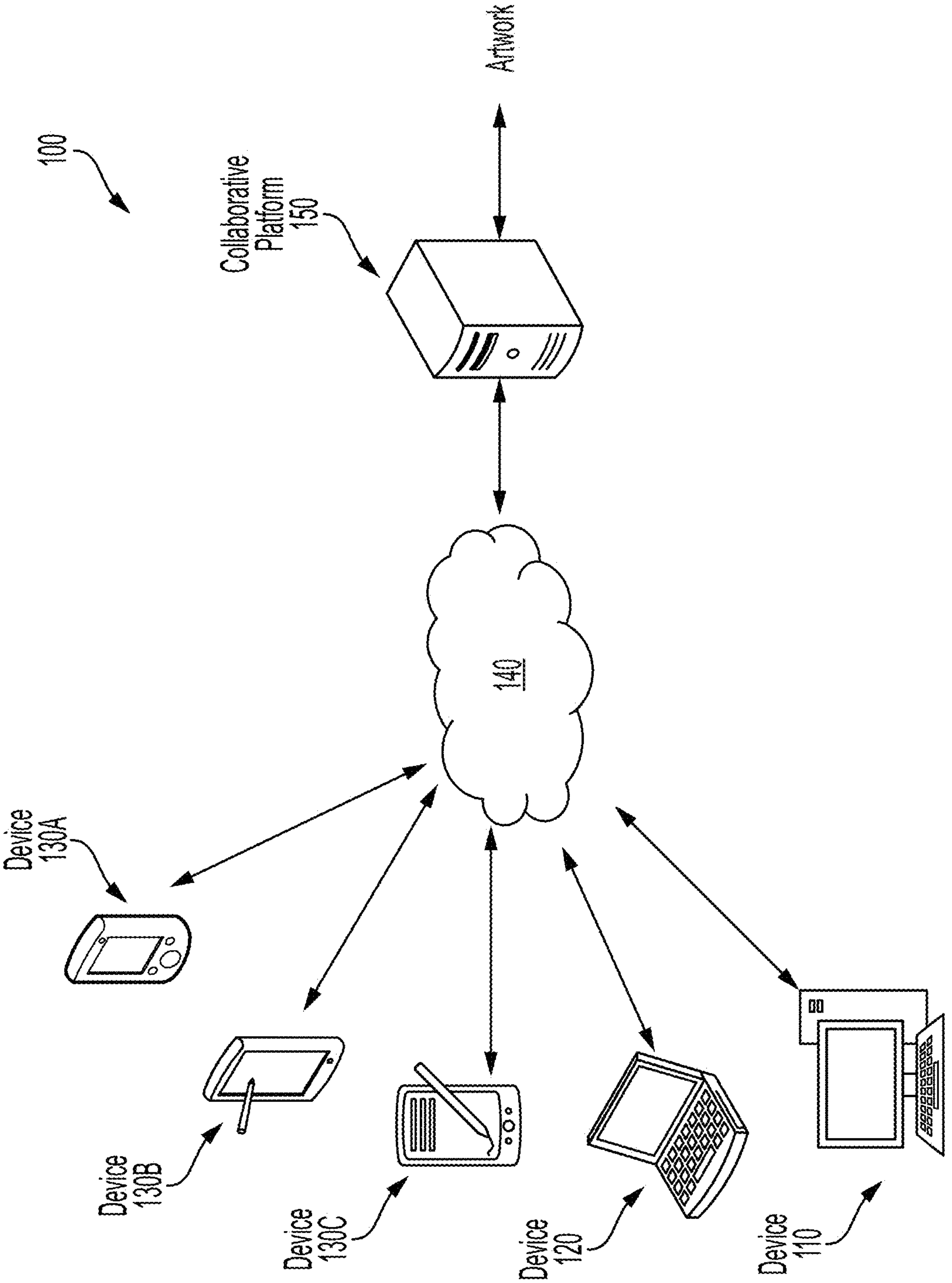
FIG. 1 is a block diagram of an example environment or system in which some embodiments of the technology described herein may be implemented.

Existing online or web-based collaboration tools, such as, video conferencing platforms and other team collaboration platforms, are being used to support hybrid workplaces. These platforms allow teammates and colleagues to communicate with one another regarding work projects and/or for other reasons. The inventors have recognized that while these existing platforms allow participants in different locations to communicate with one another using audio and video, they lack mechanisms for building meaningful connections and inclusivity in the hybrid workspace. Building such meaningful connections can improve the overall morale of the organization's employees and can promote corporate and employee mental wellness.

The inventors have developed a collaborative platform that includes or works with other online collaboration tools (e.g., video conferencing tools) to allow users to interact or collaborate through a mobile drawing canvas which leads to building deeper connections, trust, and belonging in the hybrid workplace. The collaborative platform may be a collaborative gaming platform that hosts a web-based game or other application type that allows a group of participants to interact with one another by sharing drawings and stories using their computing devices (e.g., mobile computing device such as smartphones). In some embodiments, users utilize their mobile devices as inputs to create drawings which can be displayed to other users within the collaborative environment. Sentiments regarding user's drawings can be collected and presented to the group of users as well as to an organizer or director of the collaborative experience.

Starting with a common prompt (e.g., a prompt question), each participant draws a drawing corresponding to that prompt on a drawing canvas on his/her respective mobile computing device. For example, if a common prompt question is "what is your favorite type of shoe?", one participant may draw skiing boots as his favorite type of shoe while another participant may draw a particular brand of sneakers as his favorite type of shoe. Each of the participants may then share a story regarding their drawing. As a participant shares his/her story, each of the other participants may provide input indicating his/her sentiment (e.g., feeling of gratitude or connection) to the shared story. After all the participants have had a chance to share their story, the drawings and sentiments collected from the participants may be used to generate artwork for the group that can be shared with each participant of the group.

Such a collaborative platform 1) allows participants (e.g., employees of an organization) to share their stories and reflect on other's shared stories while supporting the social and emotional well-being of individuals and groups, 2) brings visibility to connections across users to enable community around shared or common experiences, 3) can be used to provide a gaming experience that is scalable and drives continuous engagement, and 4) promotes corporate and employee mental wellness (e.g., by providing a social impact by driving change in mental health and wellness at scale via a gaming experience).

In some embodiments, the collaborative platform may be a collaborative gaming platform that hosts or provides access to a web-based gaming application that allows a group of participants to interact with one another by sharing drawings and stories using their respective computing devices. For example, the participants and hosts may interact with the web-based gaming application through their mobile computing devices, such as smartphones.

Some embodiments may be described herein using a collaborative gaming platform for a workspace; however, the disclosure is not limited in this respect. The collaborative platform described herein can be used in different environments and scenarios to boost group connections. As one example, the collaborative platform may be used in a corporate environment. In the corporate environment, the platform may be used as part of a wellness program or a decision-making process for which employee reactions would be helpful. For example, employees may be asked what they would like to see in a new office space and office décor decisions may be made based on the employees' drawings and/or sentiments to each other's drawings. If multiple employees drew bean bag chairs and indicated a feeling of connection amongst each other's drawings of the bean bag chairs, the organization may consider buying a couple of bean bag chairs for the new office space. As another example, the collaborative platform may be used in an educational environment (e.g., in a classroom by teachers and students). As yet another example, the collaborative platform may be used in an event/conference environment (e.g., in an auditorium for small or large groups).

FIG. 1 is an example environment 100 in which some embodiments of the technology described herein may be implemented. As shown in FIG. 1, the environment 100 includes a collaborative platform 150 (also referred to herein as "the platform 150") in communication with multiple computing devices 110, 120, 130A, 130B, 130C over a communication network 140. In some embodiments, the computing devices that access the platform 150 may be any suitable computing devices. The computing devices may comprise desktops, laptops, smartphones, tablets, wearable devices, augmented reality (AR) devices, virtual reality (VR) devices, and/or other suitable computing devices. Some embodiments are not limited to computing devices described herein.

The computing devices may be used by various users to interact with the platform 150. For example, computing device 110 may be used by an admin user to interact with the platform 150. Computing device 110 may be a desktop or a mobile computing device, such as a laptop or smartphone. As another example, computing device 120 may be used by a host user or organizer to interact with the platform 150. Computing device 120 may be a mobile computing device such as a laptop or smartphone. In some embodiments, the host user may use a first computing device (e.g., a laptop) to initiate a meeting using a video conferencing tool and a second computing device (e.g., a smartphone) to participate in a collaborative session hosted by the platform 150. As yet another example, computing devices 130A, 130B, 130C may be used by other non-host participants to interact with the platform 150. Computing devices 130A, 130B, 130C may be mobile computing devices, such as smartphones. In some embodiments, each non-host participant may also use a first computing device (e.g., a laptop) to participate in the meeting using the video conferencing tool and a second computing device (e.g., a smartphone) to participate in the collaborative session hosted by the platform 150.

In some embodiments, the communication network 140 of FIG. 1 may be the Internet, a local area network, a wide area network, and/or any other suitable communication network. Aspects of the technology described herein are not limited in this respect.

Figure 8:
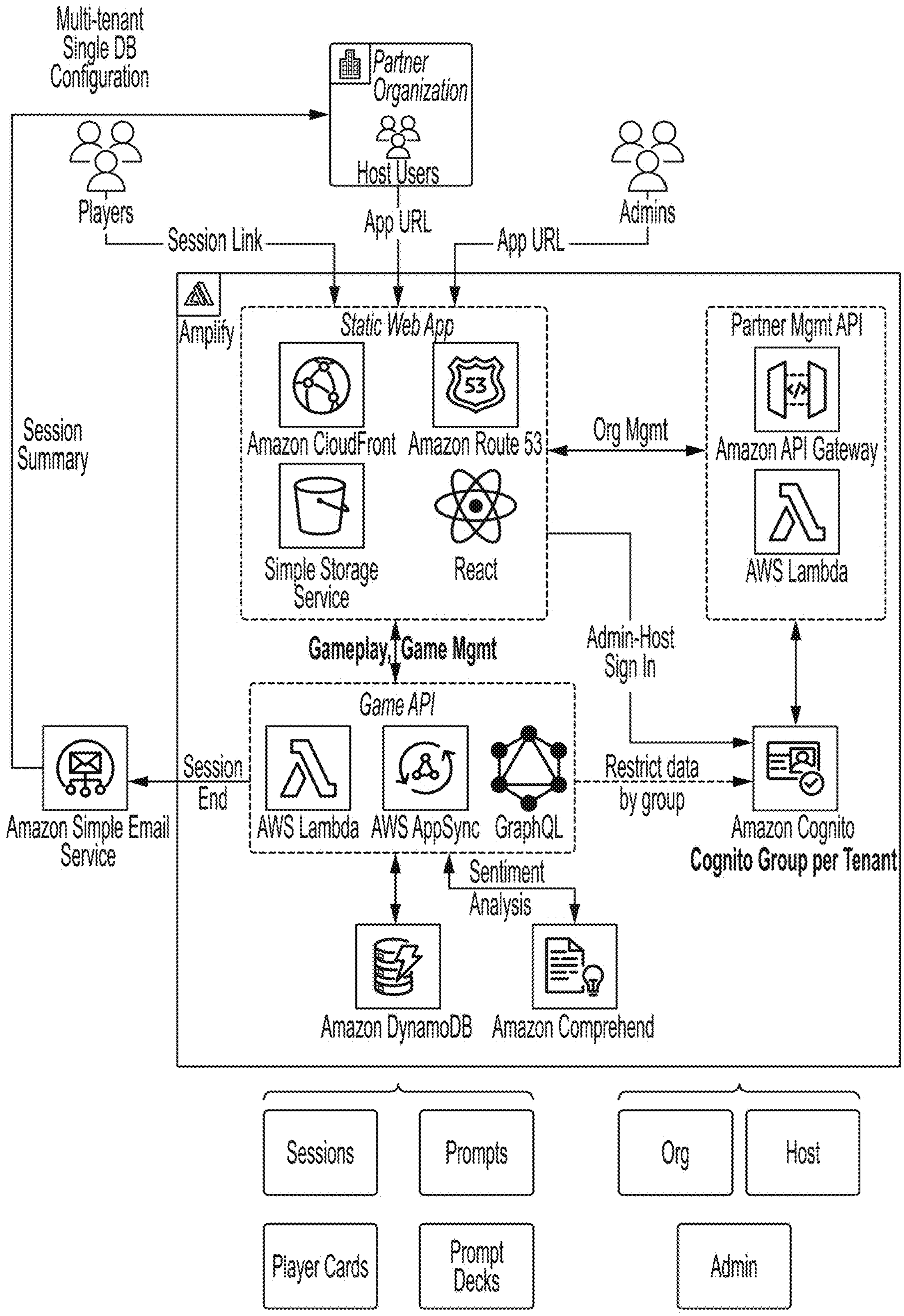
FIG. 8 is an example system architecture of the collaborative platform of FIG. 2, in accordance with some embodiments of the technology described herein.

In some embodiments, the platform 150 may be used by different organizations. For each organization, the platform 150 may invoke one or more cloud-based services (e.g., services offered by cloud service providers, such as Amazon Web Services (AWS), Microsoft Azure, Google Cloud Platform (GCP), etc.) to create, manage, and track collaborative sessions between groups of participants within the organization. An example system architecture of the platform 150 is shown in FIG. 8. In some embodiments, the system architecture may be multi-tenant single database architecture where a single application/software instance and database serve multiple user groups, such as, admin users, host users, and participants, across different organizations. The system architecture may be built on a serverless offering to allow for scaling with minimal upfront costs. As shown in FIG. 8, the system architecture uses services provided by Amazon to create, manage, and track collaborative sessions; however, services provided by other cloud service providers may be used as the disclosure is not limited in this respect. For example, AWS Amplify may be used to accelerate development and deployment and AWS Cognito and Cognito Groups may be used for isolation of game data between various partner organizations.

Figure 9:
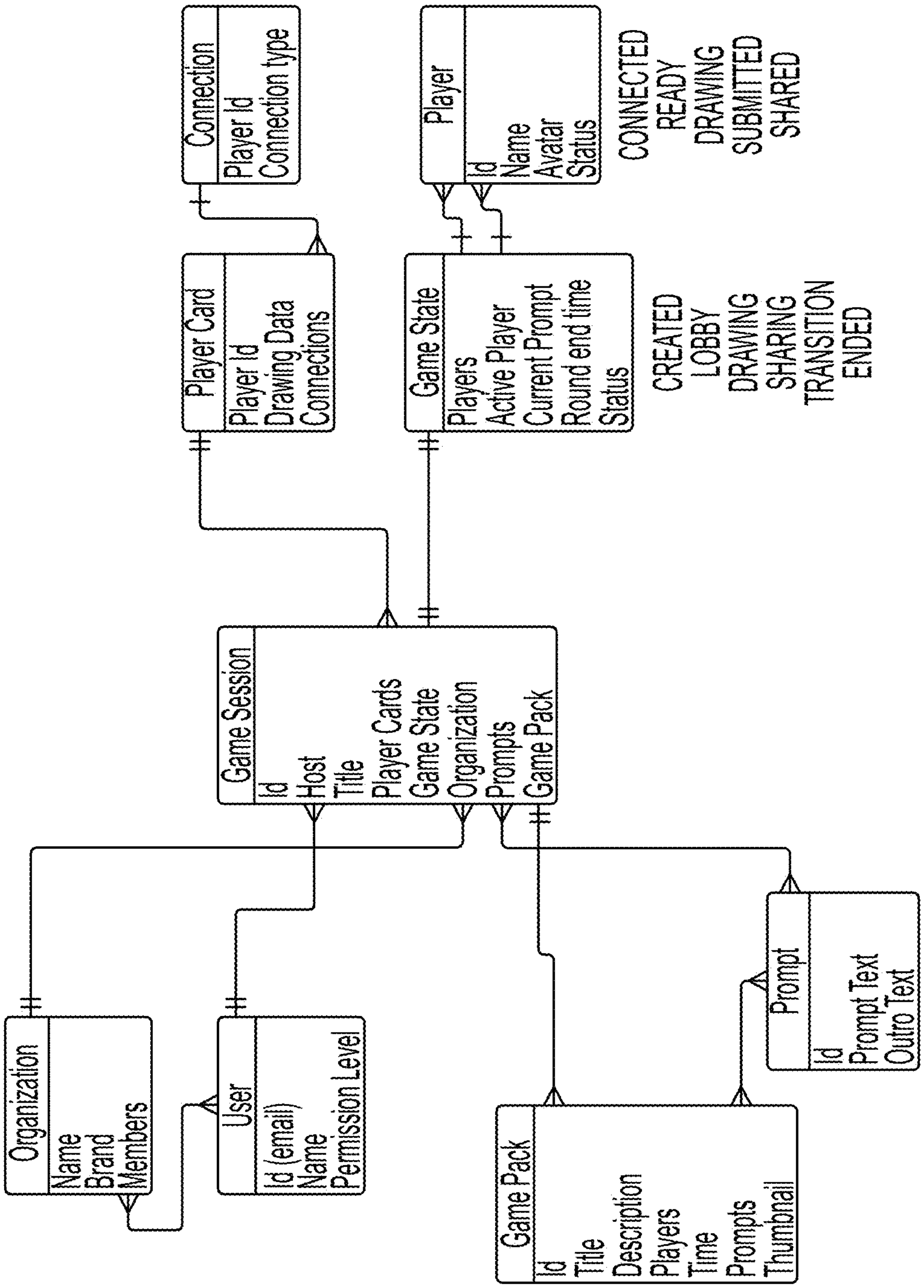
FIG. 9 is an example data model indicating the types of data collected, tracked, and stored by the collaborative platform of FIG. 2, in accordance with some embodiments of the technology described herein.
Figure 10:
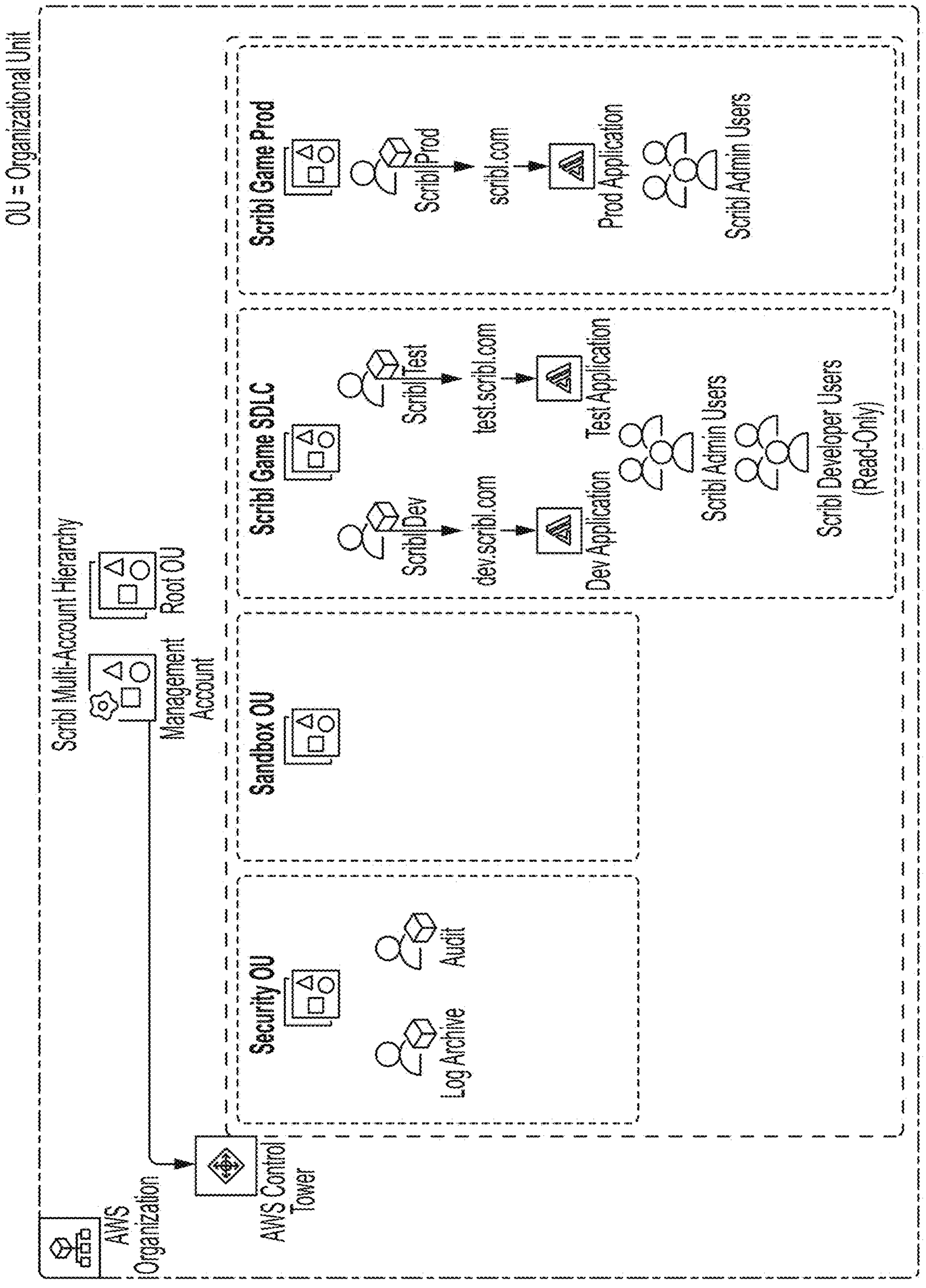
FIG. 10 is an example account structure for accounts managed the collaborative platform of FIG. 2, in accordance with some embodiments of the technology described herein.

In some embodiments, the platform 150 may collect and track data associated with the collaborative sessions across different groups within an organization or across different organizations. An example data model indicating the types of data collected, tracked, and stored in a database (e.g., database 220 shown in FIG. 2) of the platform 150 is shown in FIG. 9. In some embodiments, the platform 150 may manage a plurality of accounts for the different organizations. An employee of an organization may be designated as the corporate admin for the organization and given access to the organization's account. The corporate admin may access the platform 150 using computing device 110. An example account structure for accounts managed the platform 150 is shown in FIG. 10. The account structure allows for separation of accounts between environments (e.g., development and production environment) for clear organization of services. As shown in FIG. 9, AWS Control Tower may be used to set up and govern a secure, multi-account environment; however, services provided by other cloud service providers may be used as the disclosure is not limited in this respect.

In some embodiments, the platform 150 may be accessed via a global admin user (e.g., using a laptop or desktop computing device) to manage accounts for various organizations (e.g., create, delete, modify accounts), to create prompts that can be used across organizations, designate one or more employees of an organization as corporate admins for the organization, obtain account information for the organizations (e.g., account status, time since account is active, number of corporate admins for an organization and their user ids and passwords), and/or perform other tasks relating to account management for organizations. In some embodiments, the global admin may manage account permissions for corporate admins of the various organizations (e.g., by indicating at least one corporate admin for an organization who is permitted to access the organization's account). In some embodiments, a corporate admin of an organization may manage account permissions for host users of the organization (e.g., by indicating one or more host users who are permitted to initiate collaborative sessions with participants). Example user personas managed by the platform 150 may include but not be limited to global admin, corporate admin, host user, and participant/player. A corporate admin may be a key account holder of the game. For example, the corporate admin may be a director or a department head who is continually focused on the overall well-being of their group. The collaborative platform 150 allows corporate admins to view sentiment analysis of participants, track participation outcomes, create and manage subset teams, and/or perform other activities for enhancing connections between their team members. Host users may be individuals responsible for setting up and launching game sessions. Host users may be tasked with inviting participants, getting players onboarded to the game, and facilitating the engagement. The collaborative platform 150 allows host users to manage session flow, systematically track and select players when storytelling, clear transitions within the game to navigate onboarding, activity, and wrap up, and/or perform other activities for controlling the game. Participants/players may be individuals who join the game by invitation for different reasons, such as, team bonding, meeting breaks, going away parties, etc. The collaborative platform 150 allows participants/players to interact with a drawing canvas and engage with other players' storytelling. A global admin may control the overall creation and management of game accounts and game settings.

In some embodiments, the collaborative platform 150 may launch a collaborative session between a group of participants (e.g., hosts and other participants) in response to a request from a host participant's computing device, for example, a laptop. Each participant (e.g., including the host and other participants) in the group may join the collaborative session using his/her respective computing device, for example, smartphone. For each computing device that joined the collaborative session, the platform 150 may cause a blank drawing canvas to be presented via a user interface of the computing device. Each participant may draw a drawing on the drawing canvas presented on his/her computing device. For example, the participant may draw on the drawing canvas by moving his/her finger or a drawing tool (e.g., a stylus) across the screen of the computing device. The drawing canvas may include various graphical user elements representing colors (e.g., red, green, blue, etc.) or drawing styles (e.g., line, brush, marker, etc.). A participant may select one or more of these elements when drawing on the drawing canvas. After each participant completes his/her drawing, each participant may be prompted to share his/her story associated with the drawing.

When a participant shares his/her story, the other participants may indicate one or more sentiments (e.g., feeling of gratitude and connection) to the shared story. As the participant shares the story, his/her drawing is presented on the other participants' devices along with multiple graphical user interface elements, where each graphical user interface element corresponds to a particular sentiment (e.g., gratitude, connection, strength, support, reflection, and/or other sentiments). Each other participant may indicate his/her sentiment to the story by selecting one or more of the multiple graphical user interface elements presented on his/her computing device. For example, a first participant may share his story associated with a drawing of a shoe he drew on his device's drawing canvas. A second participant feeling connection with the story may indicate this sentiment by selecting a graphical user interface element corresponding to the "connection" sentiment via his computing device.

Similarly, a third participant feeling gratitude and connection with the story may indicate this sentiment by selecting graphical user interface elements corresponding to the "gratitude" and "connection" sentiments, respectively, via his computing device. Each participant gets a turn to share his/her story associated with his/her drawing, and the other participants indicate their sentiments to the story.

The collaborative platform 150 may receive, from each participant's computing device, an input including a drawing drawn by the participant and another input indicating sentiments to stories shared by other participants. These inputs are received during an interactive period of the collaborative session, where the interactive period of the collaborative session is the time period during which the participants are collaborating by drawing and sharing stories with one another. The collaborative platform 150 may generate artwork using the received drawings and sentiment information from all the participants of the collaborative session.

Figure 11A:
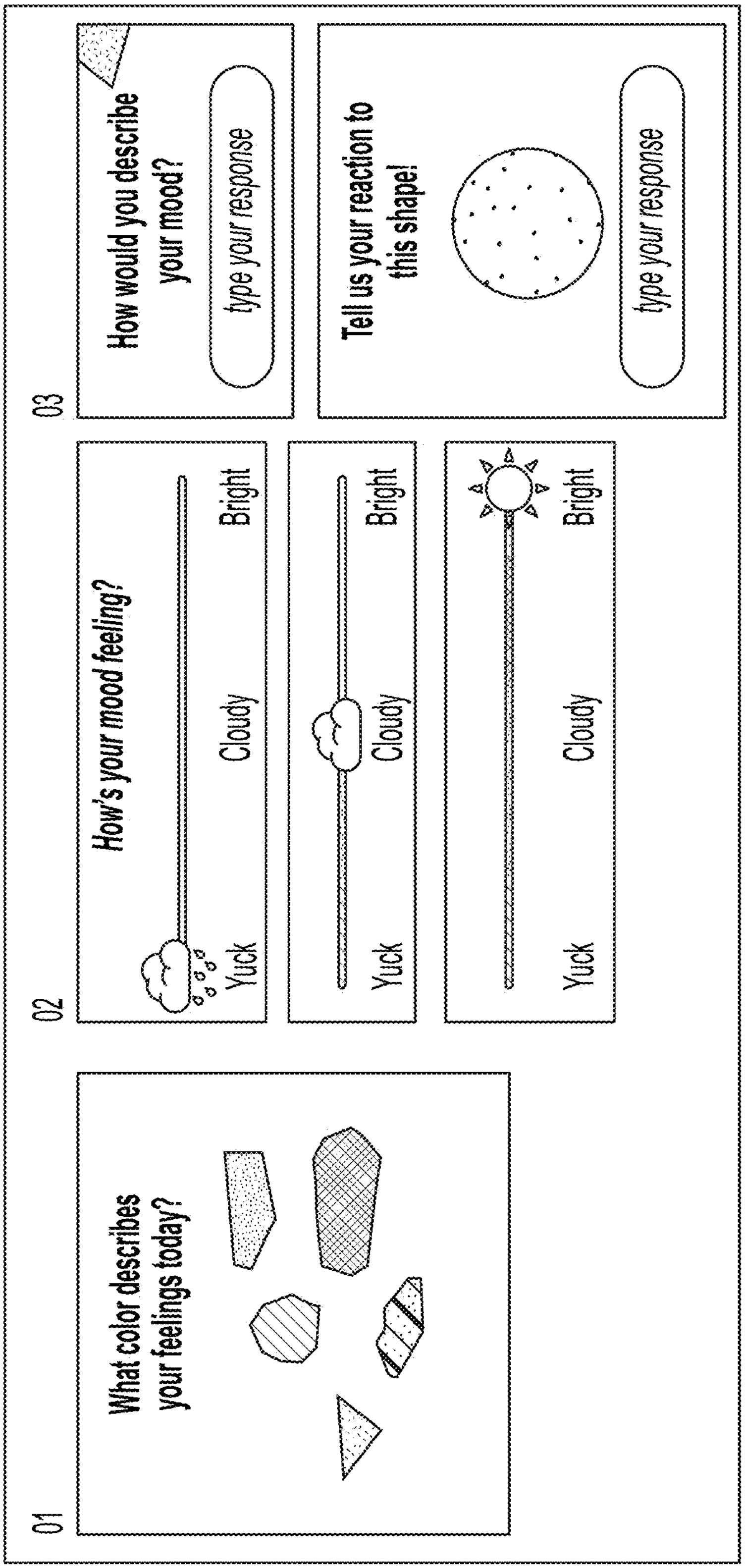
FIGS. 11A-11B illustrate example inputs, indicating sentiments of the participants, received by the collaborative platform of FIG. 2, in accordance with some embodiments of the technology described herein.
Figure 11B:
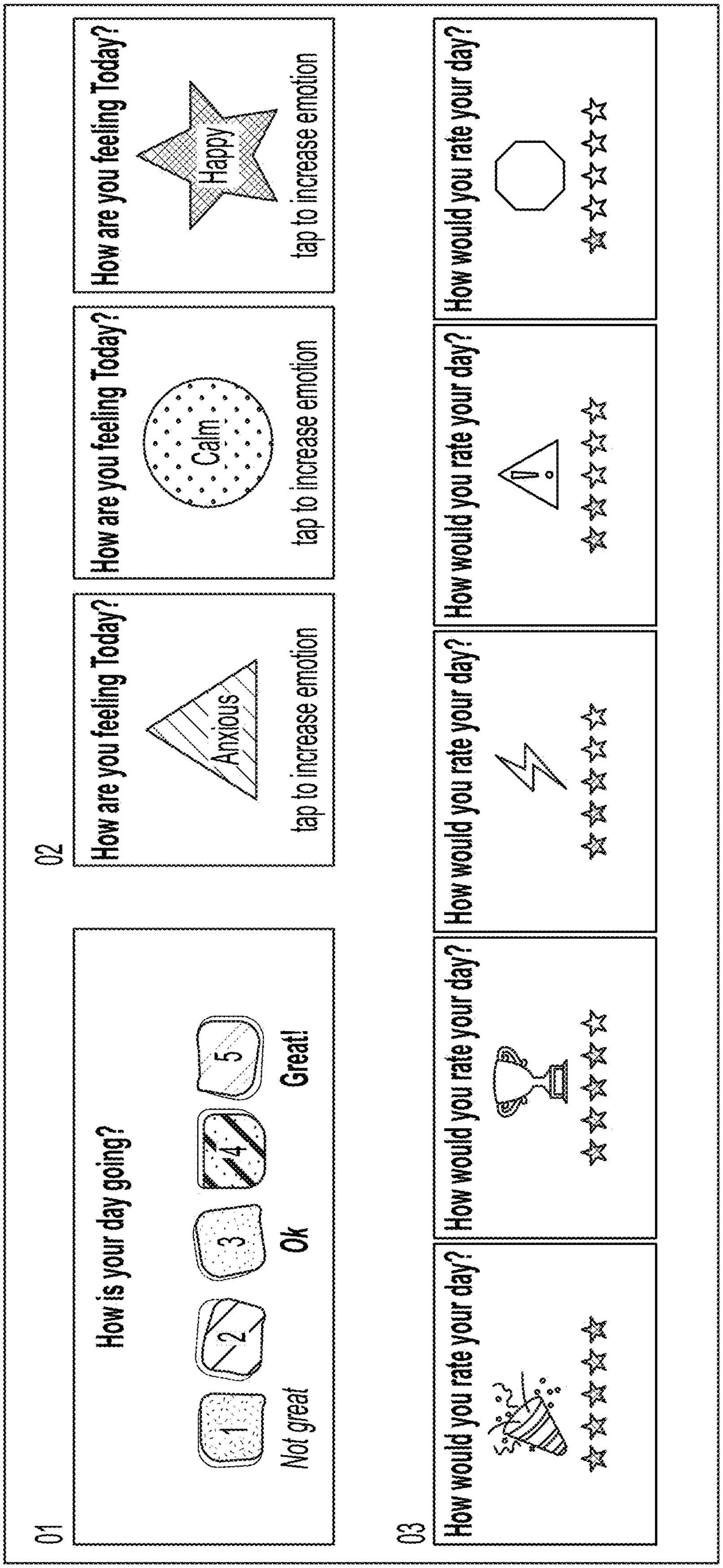

In some embodiments, the collaborative platform 150 may receive additional inputs indicating sentiments of the participants prior to the interactive period of the collaborative session and after the interactive period of the collaborative session. For example, both prior to and after the interactive period of the collaborative session, one or more graphical user interface elements representing a rating scale may be presented on each of the participants' devices. The rating scale may be any suitable rating scale, such as a scale from 1 to 5, where "1" represents a very sad sentiment or mood and "5" represents a very happy sentiment or mood. As another example, both prior to and after the interactive period of the collaborative session, one or more graphical user interface elements representing one or more emoticons may be presented on each of the participants' devices. Any suitable emoticons may be presented ranging from very sad to very happy emoticons. Any type of rating mechanisms (e.g., rating scales, emoticons, emojis, or other mechanisms) may be used to receive the additional inputs indicating sentiments of the participants prior to and after the interactive period of the collaborative session as the disclosure is not limited in this respect. In some embodiments, the same set of graphical user elements are presented to prompt sentiment input both prior to and after the interactive period of the collaborative session. Examples of these sentiment inputs are shown in FIGS. 11A-11B.

In some embodiments, the collaborative platform 150 may analyze the received sentiment inputs from the group of participants and generate a background image for the artwork based on the analysis. For example, the background image for the artwork may be generated based on analysis of the sentiment inputs received prior to the interactive period, sentiment inputs received after the interactive period, and/or sentiment inputs during the interactive period. In some embodiments, sentiment information may be provided as input to a machine learning model or statistical model. The machine learning model or statistical model may process the received input to generate as output the background image for the artwork. In some embodiments, the background image for the artwork may be a heatmap image that visualizes the emotional journey of the participants during the collaborative session.

In some embodiments, analyzing the sentiment inputs may include determining, for each sentiment type, a total number of times it was selected during the collaborative session. In some embodiments, analyzing the sentiment inputs may include determining, for each sentiment type, a number of times it was selected for a particular story shared during the collaborative session. In some embodiments, analyzing the sentiment inputs may include determining whether participants selected one or more common sentiment types for the same story.

In some embodiments, the collaborative platform 150 may generate sentiment scores based on the sentiment inputs and/or analysis of the sentiment inputs. In some embodiments, a sentiment score may be generated for each sentiment type. For example, a first sentiment score may be generated by aggregating or averaging the number of times a first sentiment (e.g., gratitude) was selected during the collaborative session and a second sentiment score may be generated by aggregating or averaging the number of times a second sentiment (e.g., connection) was selected during the collaborative session. In some embodiments, a sentiment score may be generated for each participant that indicates an overall sentiment (e.g., sad, happy, etc.) of the participant during the collaborative session. In some embodiments, a sentiment score may be generated based on collective sentiment inputs received from all participants of the collaborative session.

In some embodiments, one or more sentiment scores may be generated based on the sentiment inputs. In some embodiments, sentiment scores may be generated in three parts: pre_session_sentiment generated based on sentiment inputs received prior to the interactive period of the collaborative session, in_session_sentiment generated based on sentiment inputs received during the interactive period of the collaborative session, and post_session_sentiment generated based on sentiment inputs received after the interactive period of the collaborative session. The pre-session sentiment may be an average of all emoji responses inputted by participants before the interactive period of the collaborative session. These emojis may be stored as a numeric value from 1 to 5, where 1 is very sad, and 5 is very happy. The post-session sentiment may be an average of all emoji responses inputted by participants after the interactive period of the collaborative session. These emojis may be stored as a numeric value from 1 to 5, where 1 is very sad, and 5 is very happy. The in_session_sentiment may be calculated with an algorithm that attempts to quantify engagement levels during the collaborative session. During the collaborative session, participants can input emoji reactions to all drawings completed by other participants. For example, there are 5 (or other number) emoji reactions to choose from, and participants can select from 0 to 5 emoji reactions per drawing. The maximum number of possible reactions in a collaborative session may be calculated based on the number of players in that collaborative session and the number of drawings for that collaborative session. An average in_session_sentiment may be calculated by dividing the actual number of reactions in the collaborative session by the maximum number of possible reactions and scaling it by 5. Thus, the pre_session_sentiment, in_session_sentiment, and post_session_sentiment are numeric values between 1 and 5. Those numeric sentiment values are then converted into feeling descriptors such that values less than 2 may be equivalent to "very sad," and values greater than 4 may equate to "very happy."

Figure 12A:
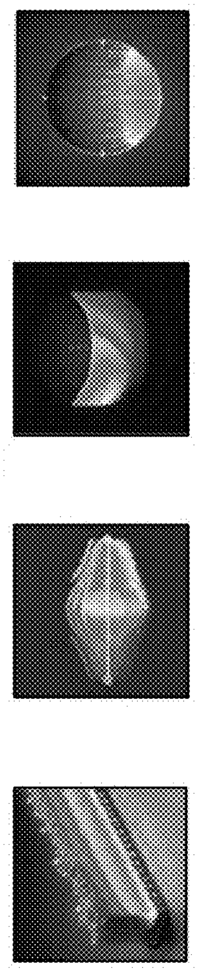
FIGS. 12A-12C illustrate example visualizations generated by the collaborative platform of FIG. 2, in accordance with some embodiments of the technology described herein.
Figure 12B:
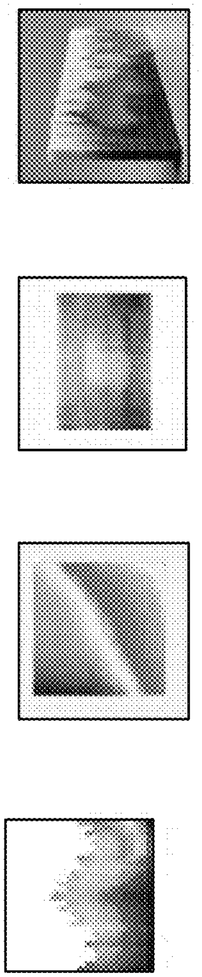
Figure 12C:
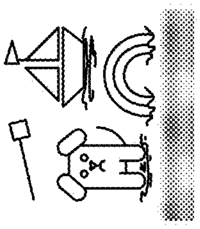

In some embodiments, an artificial intelligence (AI) model may be used to analyze the participants' sentiment before and after multiple drawings by generating a dynamic visualization (for example, a heatmap or color gradient) that showcases the emotional journey. The visualization can evolve, and change based on the sentiment data. In some embodiments, the generated sentiment scores may be provided as input to a generative AI model. The generated sentiment scores may be provided as a natural-language prompt to the AI model that generates a background image for the artwork based on the natural-language prompt. Example visualizations of background images generated based on sentiment analysis are shown in FIGS. 12A-12B. FIG. 12A illustrates examples of a dynamic gradient visualization where the gradients transition between different colors or shades of colors representing different sentiments or transitions between sentiments, such as transitioning from a darker shade representing a sentiment score of sad to a lighter shade representing a sentiment score of happy. FIG. 12B illustrates examples of a heatmap visualization where the heatmaps transition between different colors or shades of colors, such as transitioning from a first color representing a sentiment score of sad to second color representing a sentiment score of happy. In some embodiment, a collage of the participants' drawings may be combined along with the visualization, such as a heatmap as shown in FIG. 12C.

In some embodiments, sentiment scores may be input into a machine learning model using a natural-language prompt. In some embodiments, the sentiment scores are inputted into the following example prompt where pre_session_sentiment, in_session_sentiment, and post_session_sentiment correspond to feeling descriptors calculated for each specific collaborative session: "Depict an abstract artistic representation of a heatmap, with gradients of color intensity representing a range of sentiments during a session. The initial sentiment is {pre_session_sentiment}. Then, a sentiment of {in_session_sentiment} and ends with a sentiment of {post-_session_sentiment}. There should be no text, no numbers, no axes. The heatmap should cover the entire image." In some embodiments, the machine learning model comprises a generative machine learning model described in Betker, James et al., "Improving Image Generation with Better Captions," url=(https://cdn.openai.com/papers/dall-e-3.pdf), which is incorporated by reference herein in its entirety. In some embodiments, the machine learning model was trained using a large set of images with captions that described those images. The machine learning model learned how to generate realistic images based on a text prompt. The natural-language text prompt is input into the machine learning model. The machine learning model determines the colors to be used for the background heatmap image and generates and outputs the background heatmap image.

In some embodiments, the collaborative platform 150 may generate the artwork by overlaying the participants' drawings onto the generated background image. In some embodiments, the platform 150 may determine a placement of the participants' drawings onto the generated background image. For example, the platform 150 may determine where each drawing may be placed relative to the colors depicted in the background image. In some embodiments, placement may be determined based on the sentiment inputs received for a shared drawing and colors mapped to the sentiment inputs. For example, if multiple selections of "gratitude" sentiment were received for a shared drawing, a determination may be made to place the drawing in an area of the background image with a color representative of the "gratitude" sentiment. In some embodiments, placement may be determined based on the drawing inputs. For example, drawings may be scaled based on the number of drawings received. As another example, drawings may be spread with even or random spacing between them. In some embodiments, placement may be determined based on the sentiment inputs and/or the drawings. For example, the sentiment inputs, the drawings, and/or the background image may be provided as input to one or more machine learning models that process these inputs and output a proposed placement of the drawings on the background image. For example, a machine learning model may process the inputs and determine which drawings can be placed together based on sentiment selections for each. If two drawings received similar sentiment selections, they could be placed closer to one another on the background image. As another example, a machine learning model may recognize what the drawings represent (e.g., a book, a stick figure, an airplane, etc.). If two drawings relate to one another, such as a drawing of a book and a drawing of a stick figure representing a person, the two drawings could be placed in such a way that the stick figure is holding the book.

Figure 13A:
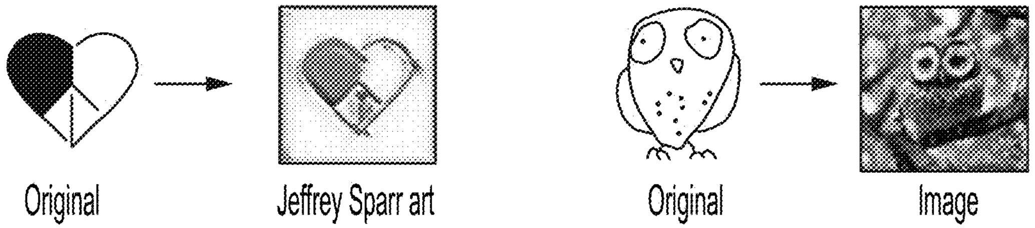
FIGS. 13A-13B illustrate examples of artwork generated by creating variations of drawings, in accordance with some embodiments of the technology described herein.
Figure 13B:
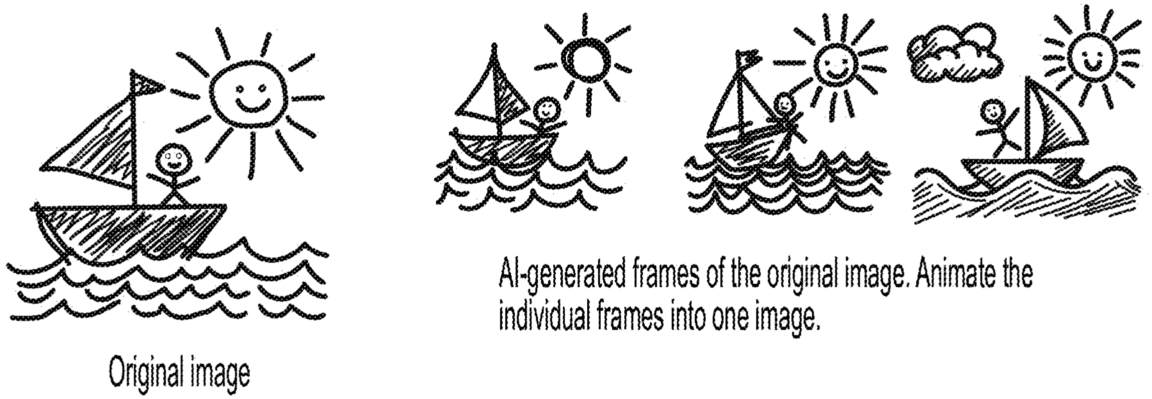

In some embodiments, the collaborative platform 150 may generate the artwork by creating variations of the drawings, for example, by altering a style of the drawing or animating the drawings. Machine learning models may be used to generate such variations. In some embodiments, these variations may be placed on the background image. Example visualizations of such variations of the drawings are shown in FIGS. 13A and 13B. FIG. 13A shows an example of altering an artistic style of a drawing, for example, making it look like it was created by a famous artist, a specific art movement, or in a unique style. FIG. 13B shows an example of generating an animation of the drawings. In some embodiments, the participants' drawings may be animated using an AI model. For example, if a player draws a boat, the AI model may generate a short animation of the boat flowing on the ocean or the individual frames for an animation, all based on the original drawings' style.

Figure 14A:
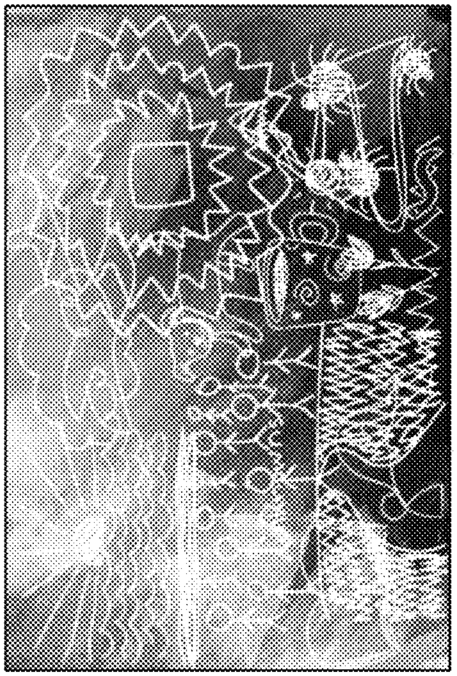
FIGS. 14A-14D illustrate examples of artwork generated by the collaborative platform of FIG. 2, in accordance with some embodiments of the technology described herein.
Figure 14B:
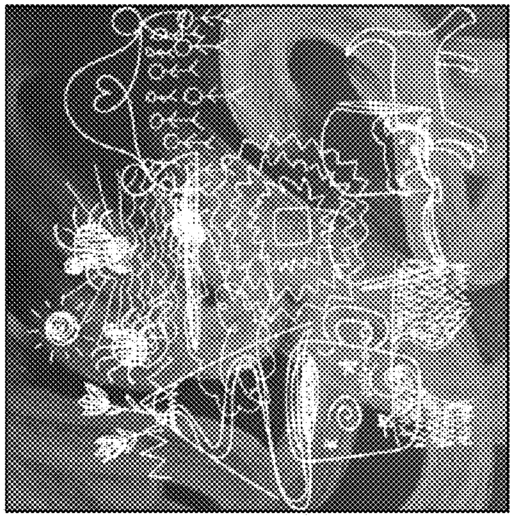
Figure 14C:
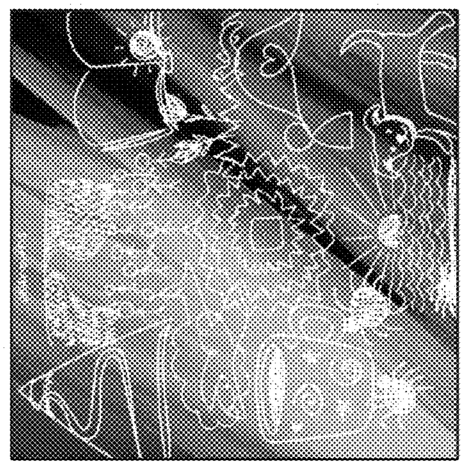

In some embodiments, the collaborative platform 150 may communicate the generated artwork to each of the participant computing devices. The generated artwork may be shared using different communication channels, such as via emails, chats, blogs, social media, video conferencing, and/or other communication channels. The generated artwork may be downloadable and include a title. The generated artwork may be printed, and hardcopies may be shared. Examples of artwork generated by the platform 150 are shown in FIGS. 14A-14C.

Figure 2:
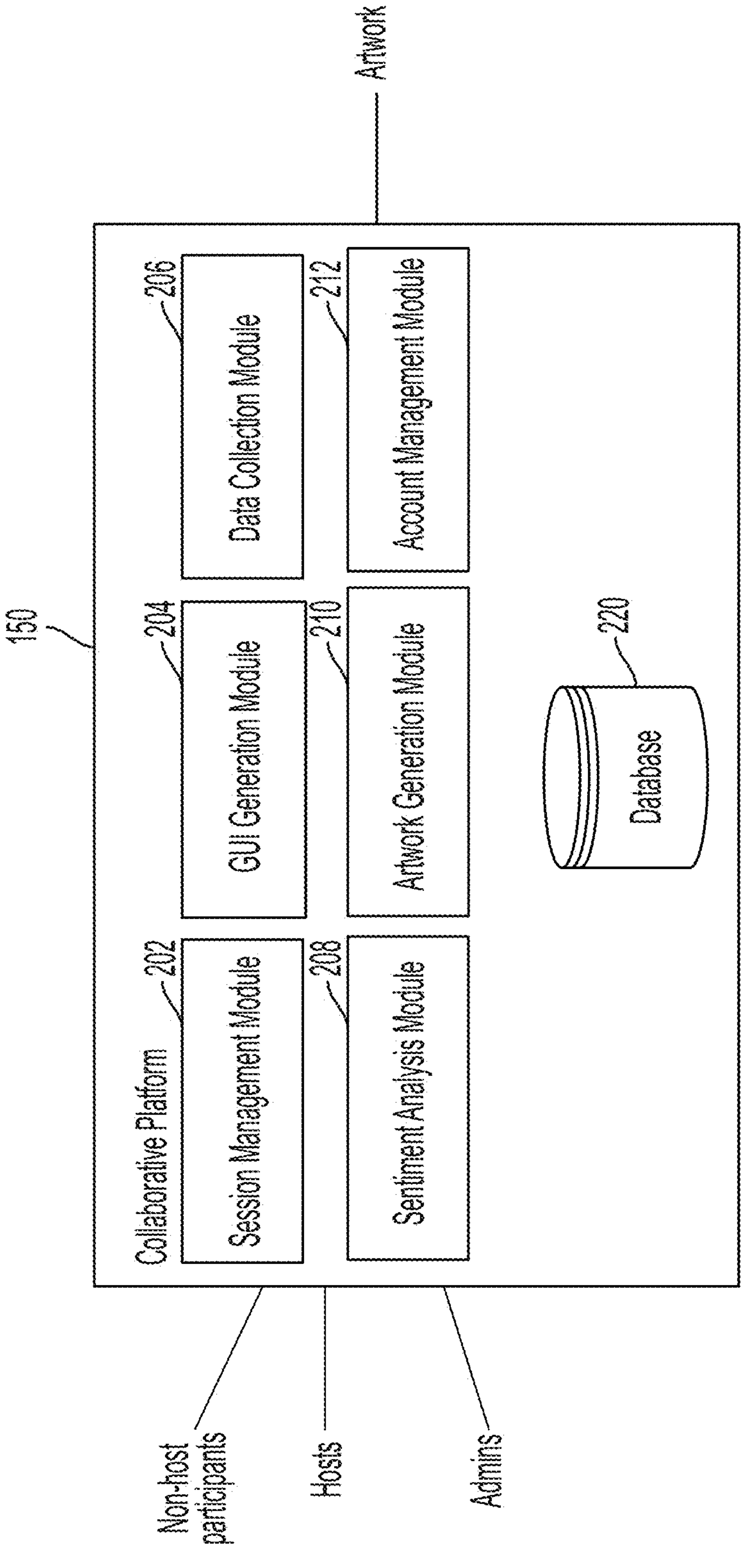
FIG. 2 is a block diagram of an illustrative collaborative platform, in accordance with some embodiments of the technology described herein.

FIG. 2 shows various modules of the collaborative platform 150 of FIG. 1, according to some embodiments of the technology described herein. As shown in FIG. 2, the collaborative platform 150 includes a session management module 202, a GUI generation module 204, a data collection module 206, a sentiment analysis module 208, an artwork generation module 210, and an account management module 212. The collaborative platform 150 further includes a database 220 that stores data associated with the accounts managed by the platform 150 and data collected across various collaborative sessions managed and hosted by the platform 150.

The session management module 202 manages collaborative sessions hosted by the platform 150. The session management module 202 may launch a collaborative session between a group of participants (e.g., hosts and other participants). Each participant may join the collaborative session using his/her computing device, for example, a smartphone. In some embodiments, the collaborative session may be a game session that each participant may join by scanning a QR code (encoded with a relevant website or app associated with the game) using the camera of the smartphone. Tapping the notification that appears on the screen when QR code is scanned causes the participant computing device to join the game session. In some embodiments, the session management module 202 may end the game session in response to a request to end the game.

The GUI generation module 204 generates user interfaces for the participant computing devices. In some embodiments, the GUI generation module 204 generates user interfaces to obtain drawing inputs from the participants. For example, these interfaces may include a drawing canvas that allows participants to provide drawing inputs. In some embodiments, the GUI generation module 204 generates user interfaces to obtain sentiment inputs from the participants. For example, these interfaces may be presented prior to an interactive period of the session, during the interactive period of the session, and after the interactive period of the session. Examples interfaces generated for participants as part of a game session are shown in FIGS. 15A-15K.

The GUI generation module 204 generates user interfaces for the host computing devices. In some embodiments, the GUI generation module 204 generates user interfaces to obtain input from the host participant. Example inputs obtained from a host participant device may be a request to launch the game session, a selection of a previously curated prompt or input of a new prompt for the game, a selection of the participants of the game, a request to start the game, a selection highlighting which participant is to share his/or story next (either by selecting a name of the participant in the list of participants or selecting a randomize button that randomly selects a participant), a request to end the game, and/or other inputs. Example interfaces generated for hosts as part of a game session are shown in FIGS. 16A-16K.

Figure 6A:
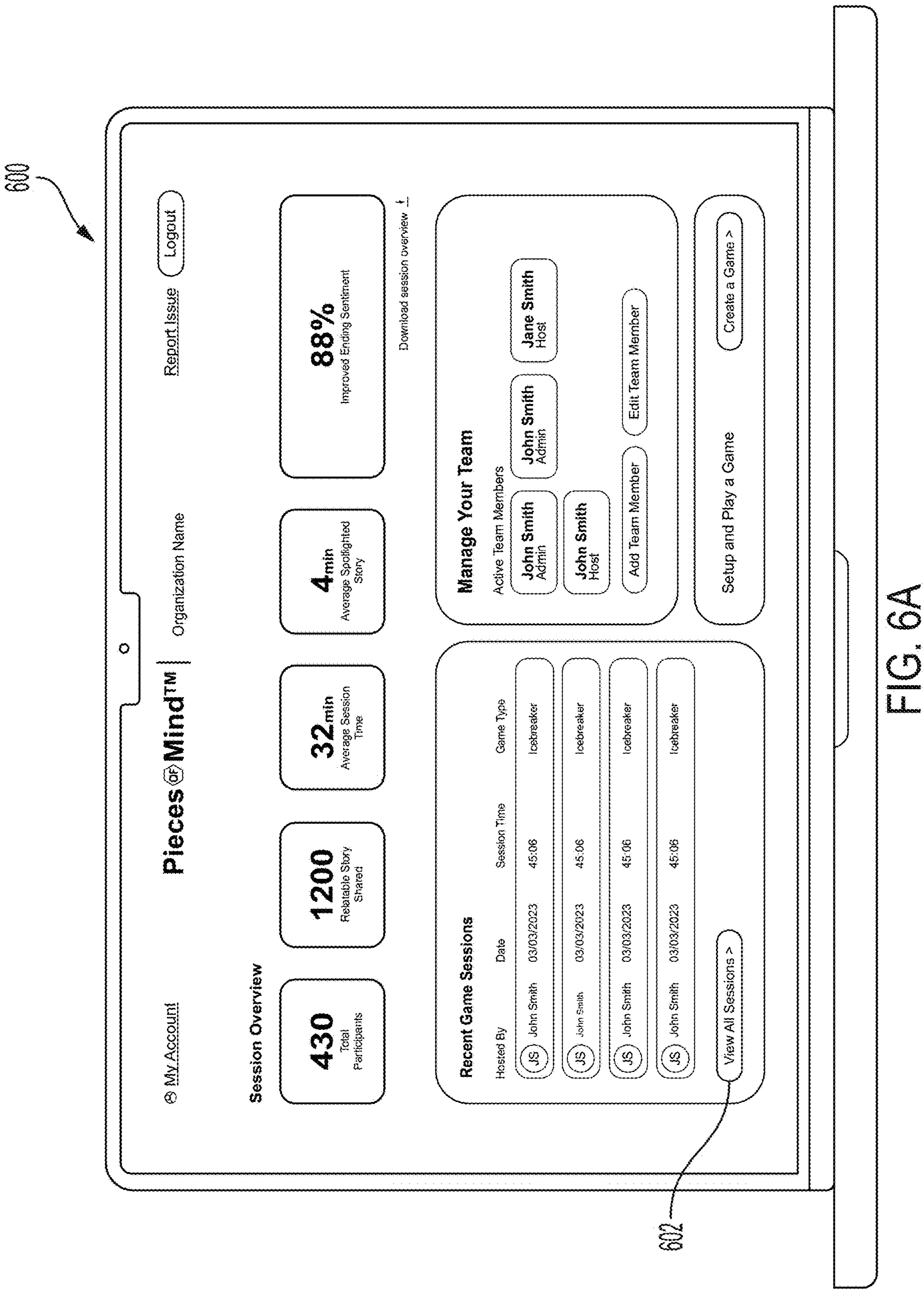
FIGS. 6A-6B are screenshots of example user interfaces presented to a corporate admin user of the collaborative platform of FIG. 2, in accordance with some embodiments of the technology described herein.
Figure 6B:
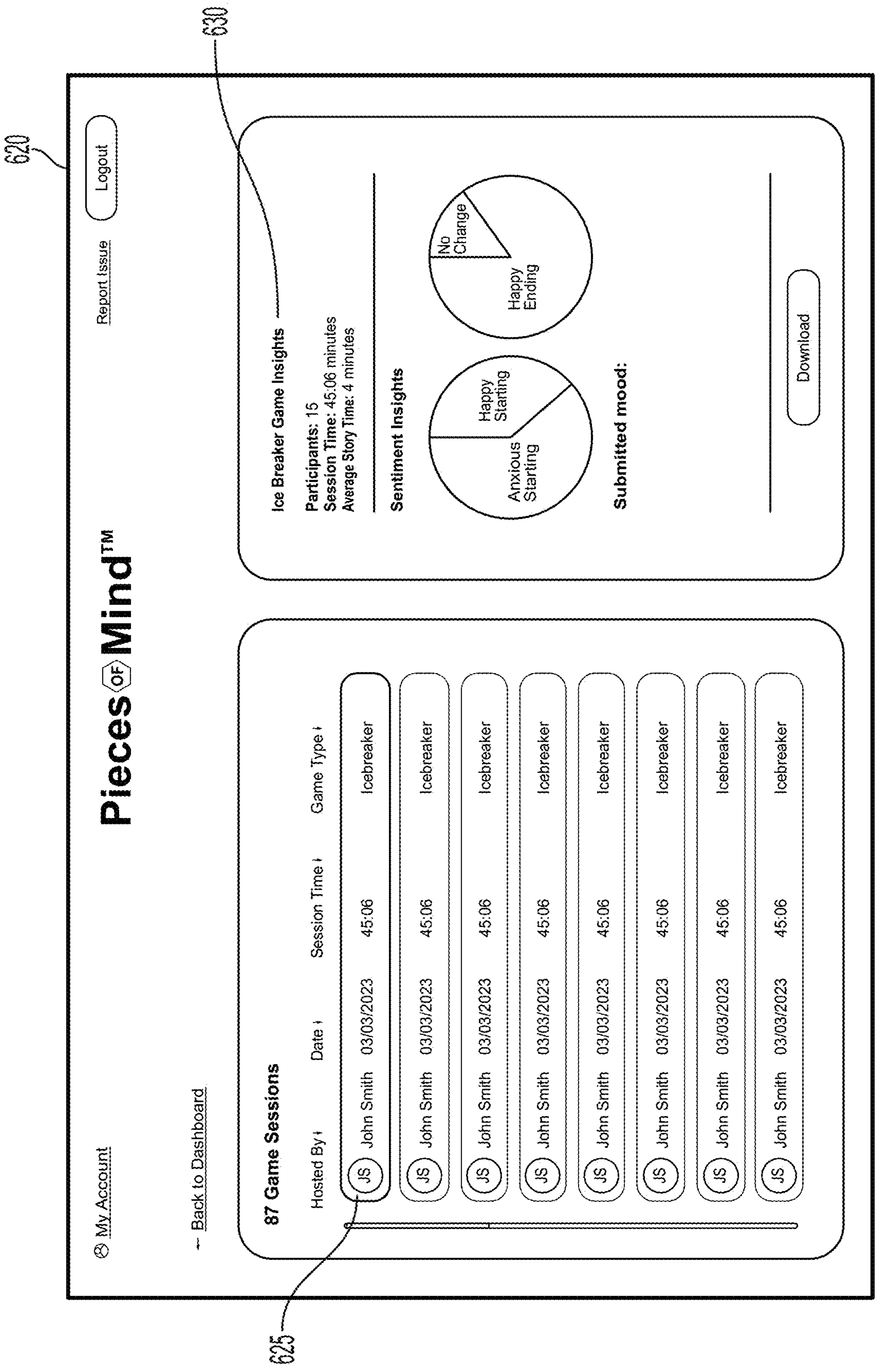

The GUI generation module 204 generates user interfaces for the admin computing devices. The user interfaces allow corporate admins of an organization to view statistics relating to the collaborative sessions (e.g., game sessions) hosted for the organization. An example user interface or dashboard 600 presented to a corporate admin is shown in FIG. 6A. For example, the statistics may include information regarding a total number of game sessions hosted, a total number of participants across the game sessions, an average session time, a number of times a relatable story was shared, an average time for which stories were spotlighted (i.e., average time taken by participants to share their story), a percentage indicative of improved mood after participating in a game session, and/or other statistics. In some embodiments, the user interfaces allow corporate admins to review details regarding each of the sessions. For example, as shown in FIG. 6B, each of the game sessions may be presented in a user interface 620 and selection of a particular session 625 may provide insights 630 regarding the game session. The interface 620 may be presented in response to selection of the "View All Sessions" button 602 on the dashboard 600. The insights may include the type of prompt used for the game session, the number of participants, the session time, an average story time, and sentiment insights. In some embodiments, the user interfaces allow corporate admins to create prompt decks for an organization, such as an icebreaker prompt deck that may include a number of prompts, for example, questions designed to help the group feel comfortable and connected, spark conversations that set a tone of sharing, creativity, and understanding; a team building prompt deck that may include a number of prompts, for example, questions designed to uncover shared experiences and interests, and foster a sense of connectedness and collaboration hard to achieve in a remote/hybrid work environment; an emotional intelligence prompt deck that may include a number of prompts, for example, questions designed to improve the ability to perceive, user, understand, and manage emotions; and/or other prompt decks. The prompt decks may be stored in database 220. In some embodiments, the user interfaces allow corporate admins to manage a team by adding, modifying, and/or deleting team members. In some embodiments, the user interfaces allow corporate admins to setup and initiate a collaborative session.

Figure 7:
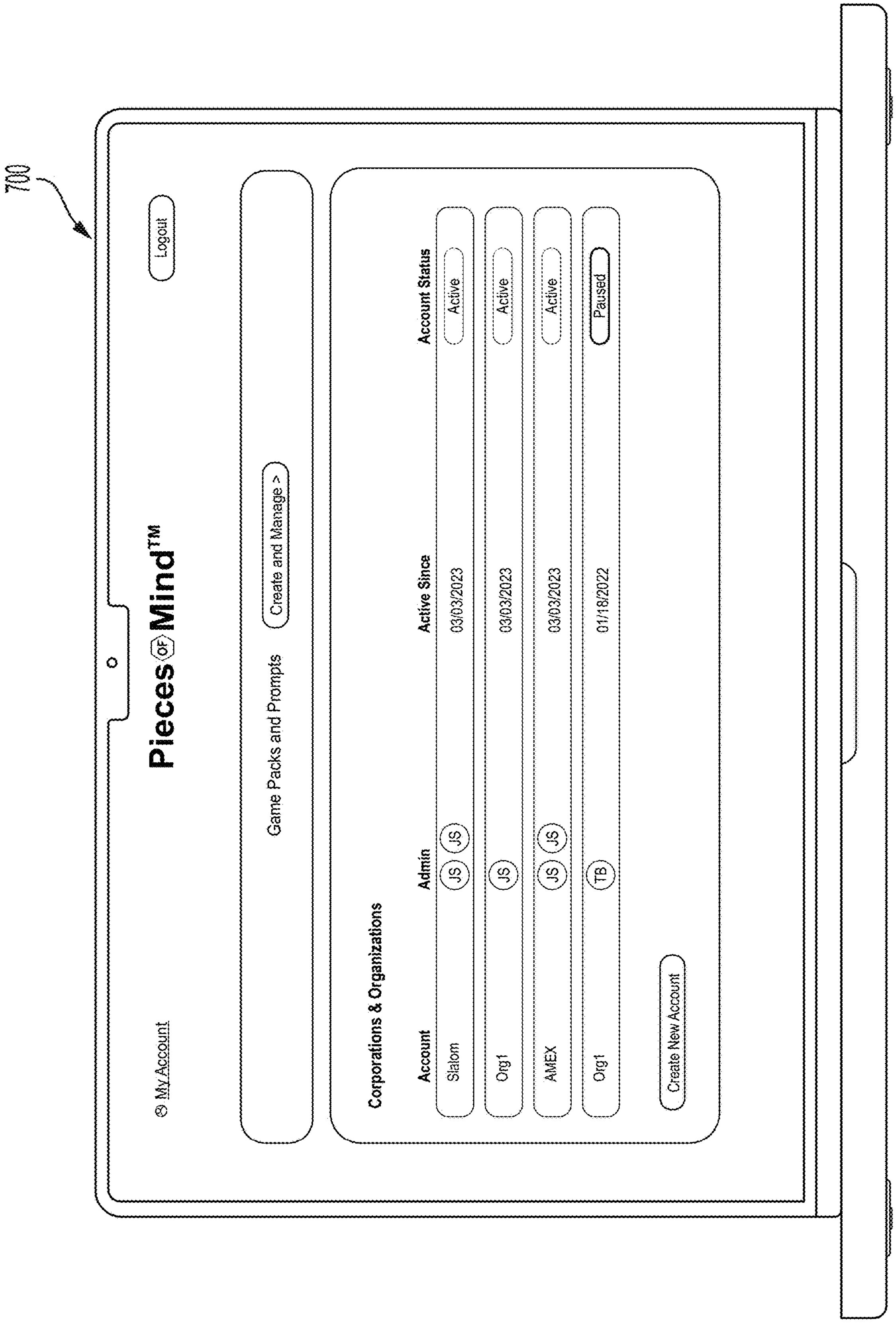
FIG. 7 is a screenshot of an example user interface presented to a global admin user of the collaborative platform of FIG. 2, in accordance with some embodiments of the technology described herein.

In some embodiments, the user interfaces generated for admin computing devices include user interfaces for a global admin of the platform 150. An example user interface or dashboard 700 presented to a global admin is shown in FIG. 7. In some embodiments, the user interfaces allow a global admin to curate prompt decks that can be used across different organizations, such as an icebreaker prompt deck, a team building prompt deck, an emotional intelligence prompt deck, and/or other prompt decks. The prompt decks may be stored in database 220. In some embodiments, the user interfaces may be used by the global admin to designate one or more employees of an organization as corporate admins for the organization, obtain account information for the organizations (e.g., account status, time since account is active, number of corporate admins for an organization and their user ids and passwords), and/or other perform other tasks relating to account management for organizations.

Additional examples of various user interfaces generated by the GUI generation module 204 are shown in FIGS. 18-38, 39A-C, and 42-47.

The data collection module 206 collects and tracks data across multiple collaborative sessions (e.g., game sessions) within an organization and across different organizations. The collected data may be stored in database 220. The data collected and tracked may include session data, for example, game session id, information associated with a host participant who launched the game session, title of the game, participant information (e.g., participant id, drawing inputs, sentiment inputs), state of the game session (e.g., created state (e.g., when game session is created), lobby state (e.g., when waiting for all participants to join), drawing state (e.g., when participants are drawing), sharing state (e.g., when participants are sharing their stories), transition state (when transitioning between states), and ended state (e.g., when game session is ended)), information regarding the organization for which the game session is hosted (e.g., organization name, members of the organization allowed to host the game session), and/or prompts used during the game session.

The sentiment analysis module 208 analyzes the received sentiment inputs (e.g., the sentiment inputs received prior to and after the interactive period of session and the sentiment inputs received during the interactive period of the session) from the participants of the collaborative session and generates sentiment scores for the session. In some embodiments, one or more sentiment scores may be generated for each participant. In some embodiments, one or more sentiment scores may be generated for each sentiment type. In some embodiments, the sentiment scores may be generated based on the sentiment inputs and one or more session parameters (e.g., number of participants, the type of prompt used, and/or other session parameters).

The artwork generation module 210 generates the artwork using the drawing inputs and sentiment inputs (e.g., the sentiment inputs received prior to and after the interactive period of session and the sentiment inputs received during the interactive period of the session) from the participants of the collaboration session. In some embodiments, the sentiment inputs may be used to generate a background image of the artwork.

In some embodiments, sentiment information may be provided as input to a machine learning model or statistical model. The machine learning model or statistical model may process the received input to generate as output the background image for the artwork. In some embodiments, the background image for the artwork may be a heatmap image that visualizes the emotional journey of the participants during the collaborative session.

In some embodiments, one or more sentiment scores may be provided as input to a generative artificial intelligence (AI) model. The generated sentiment scores may be provided as a natural-language prompt to the AI model that generates a background image for the artwork based on the natural-language prompt.

In some embodiments, the artwork generation module 210 generates the artwork using the drawing inputs, the sentiment inputs, the background image, and/or one or more session parameters (e.g., number of participants, the type of prompt used, and/or other parameters). In some embodiments, the artwork generation module 210 generates the artwork by overlaying the participants' drawings onto the background image. In some embodiments, the sentiment inputs, the drawing inputs, the session parameters, and/or the background image may be provided as input to one or more machine learning models that process these inputs and output artwork with drawings placed on the background image.

The account management module 212 may manage accounts for various organizations using the platform 150. The account management module 212 may manage accounts for global admins, corporate admins, and hosts. The account management module 212 may manage permissions for account and data access for the different types of users of platform 150.

Figure 3:
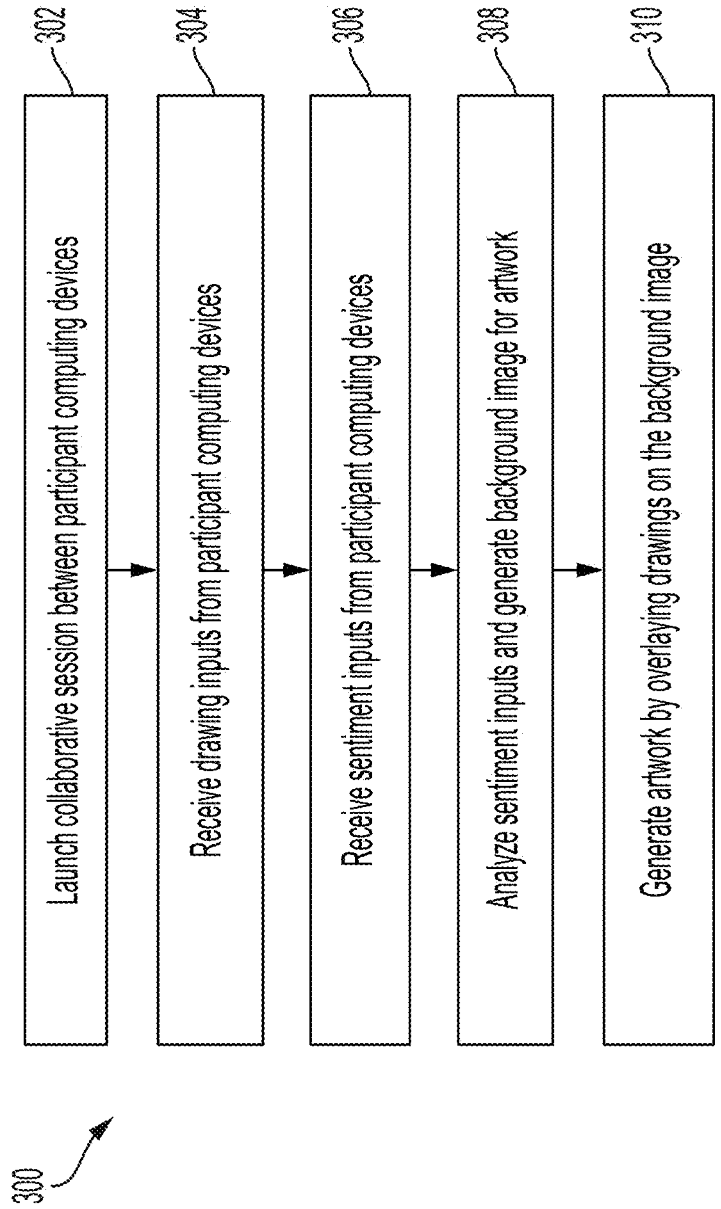
FIG. 3 is a flowchart of an example process 300 for generating artwork using drawings and sentiments collected during a collaborative session between a group of participants, in accordance with some embodiments of the technology described herein.

FIG. 3 is a flowchart of an example process 300 for generating artwork using drawings and sentiments collected during a collaborative session between a group of participants, in accordance with some embodiments of the technology described herein. Process 300 may be performed by any suitable computing device or platform. For example, process 300 may be performed by collaborative platform 150.

Process 300 beings at block 302, where the platform performing process 300 launches a collaborative session between participant computing devices. Participants joining the collaborative session using their respective computing devices, such as smartphones, may include the host who initiated the collaborative session and other participants invited to join the collaborative session.

At block 304, the platform performing the process 300 receives drawing inputs from each of the participant computing devices. The drawing inputs may include drawings drawn on a drawing canvas presented on each participant computing device. The drawing inputs may correspond to one or more prompts selected or entered by a host. At block 306, the platform performing the process 300 receives sentiment inputs from each of the participant computing devices. The sentiment inputs indicate participants' sentiments to each other's shared stories and/or drawings.

At block 308, the platform performing the process 300 analyzes the sentiment inputs and generate a background image for artwork based on the analysis. In some embodiments, the background image of the artwork is generated using a machine learning model or a statistical model. At block 310, the platform performing the process 300 generates the artwork by overlaying the drawing inputs onto the background image.

Example Use Case—Web-Based Game "Scribl"

Scribl is a web-based game designed for video meeting/conferencing applications that uses a mobile drawing canvas to build deeper connections, trust, and belonging in the hybrid workplace. Scribl is designed to improve how people connect and collaborate as teams. By harnessing the power of creative expression, a web-based game is designed that is fun, easy to use, and integrates into existing workflows.

Figure 4A:
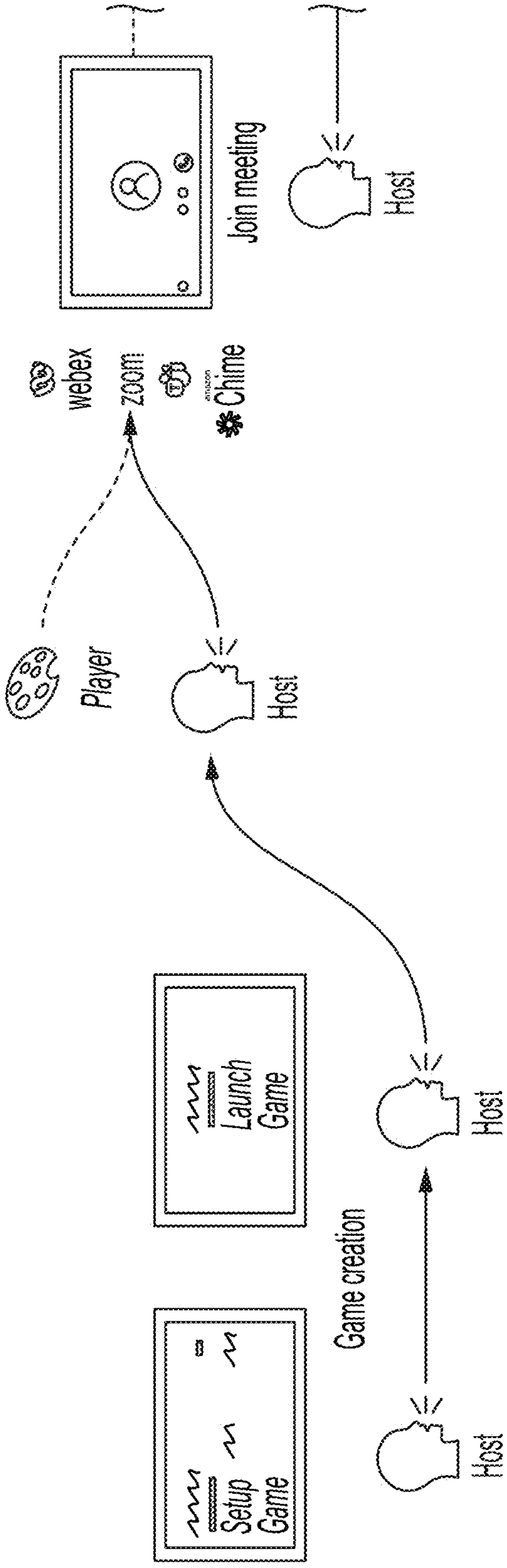
FIG. 4A-4D illustrate an example flow of a collaborative game session, in accordance with some embodiments of the technology described herein.

An example flow of the game is described with respect to FIGS. 4A-4D. As shown in FIG. 4A, a host, using his his/her computing device (e.g., a laptop), sets up a game by selecting one or more pre-existing prompts or entering one or more new prompts for the game and the participants for the game. For example, the host may select a prompt "An adventure I have been on recently is . . . ". The host, using his laptop initiates a video meeting with a group of participants using a video conferencing tool. One or more participants in the group join the video meeting using their respective computing devices (e.g., laptops). The collaborative platform 150 may present one or more user interfaces (e.g., interfaces shown in FIGS. 16A-16C) to set up and launch the game.

Figure 16A:
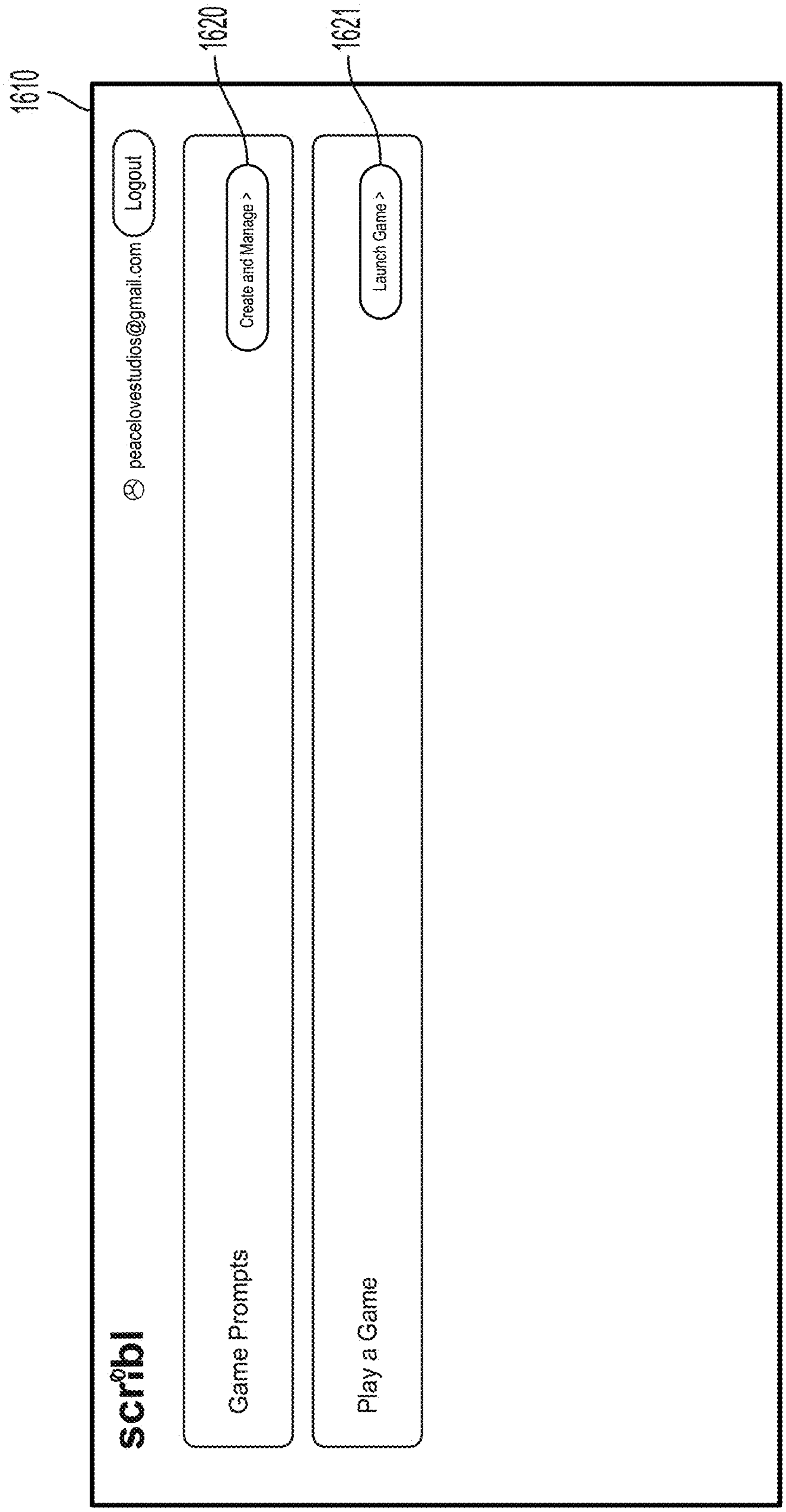
FIGS. 16A-16K are screenshots of user interfaces generated for host users as part of a collaborative game session, in accordance with some embodiments of the technology described herein.
Figure 16B:
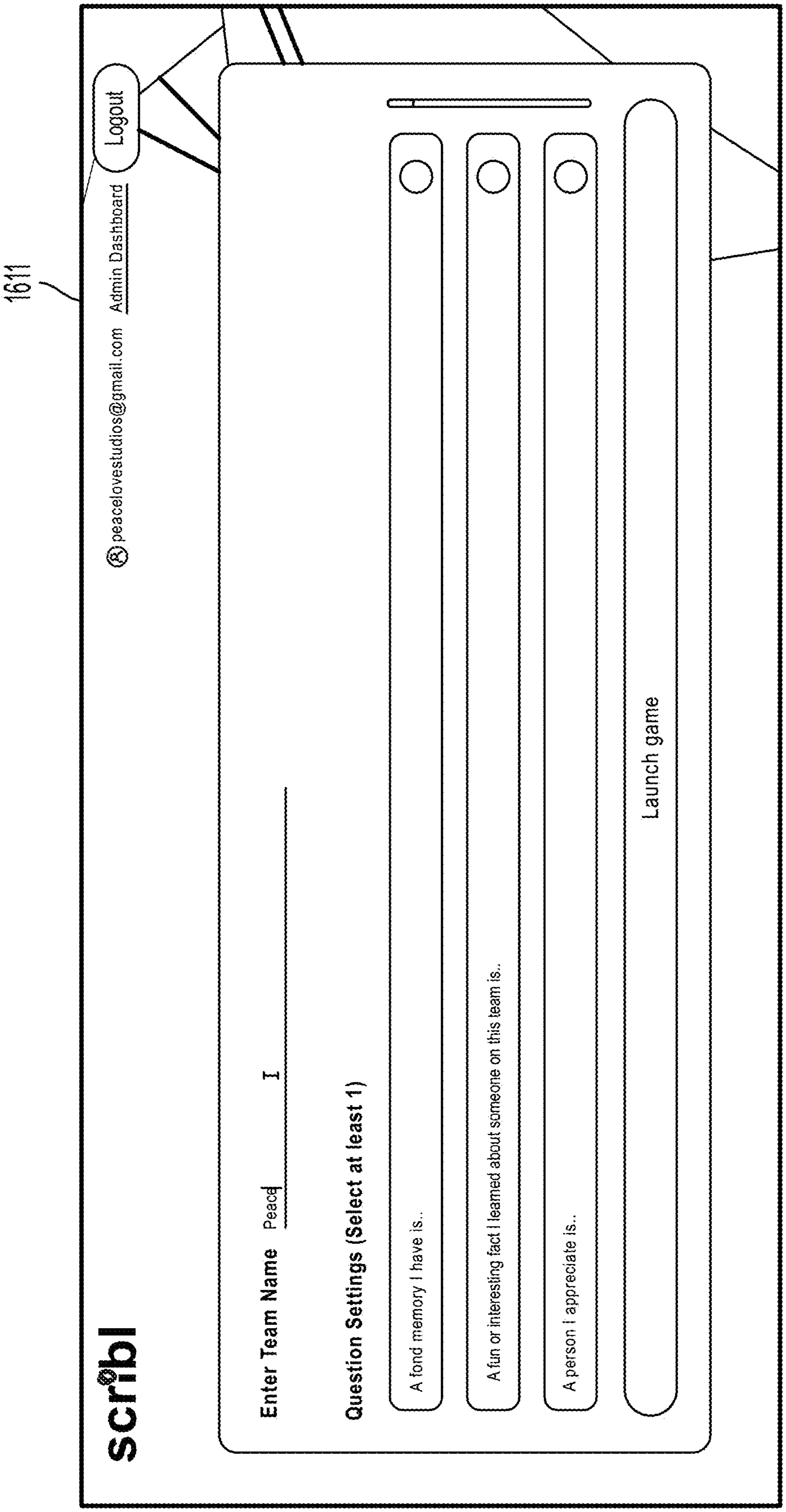
Figure 16C:
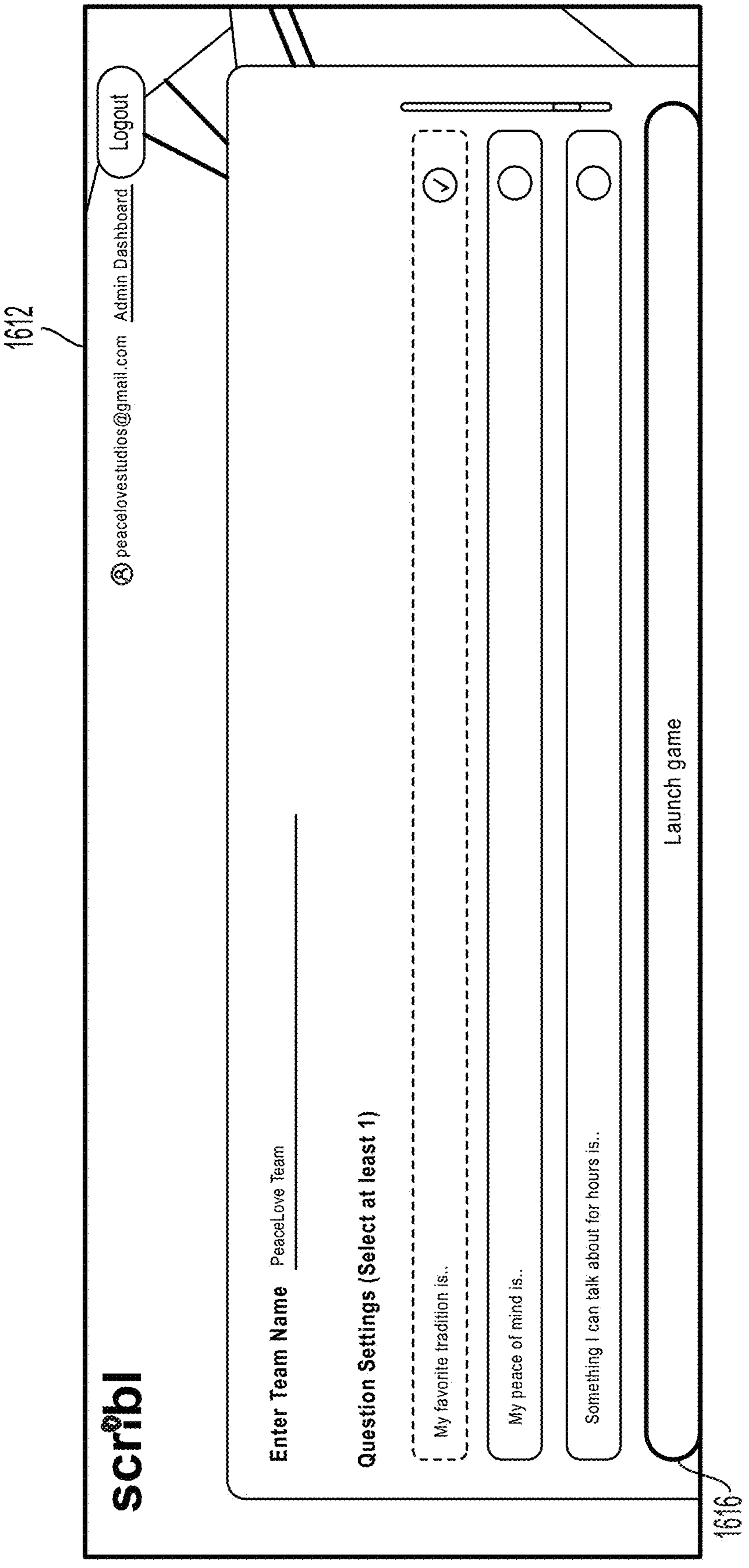
Figure 16D:
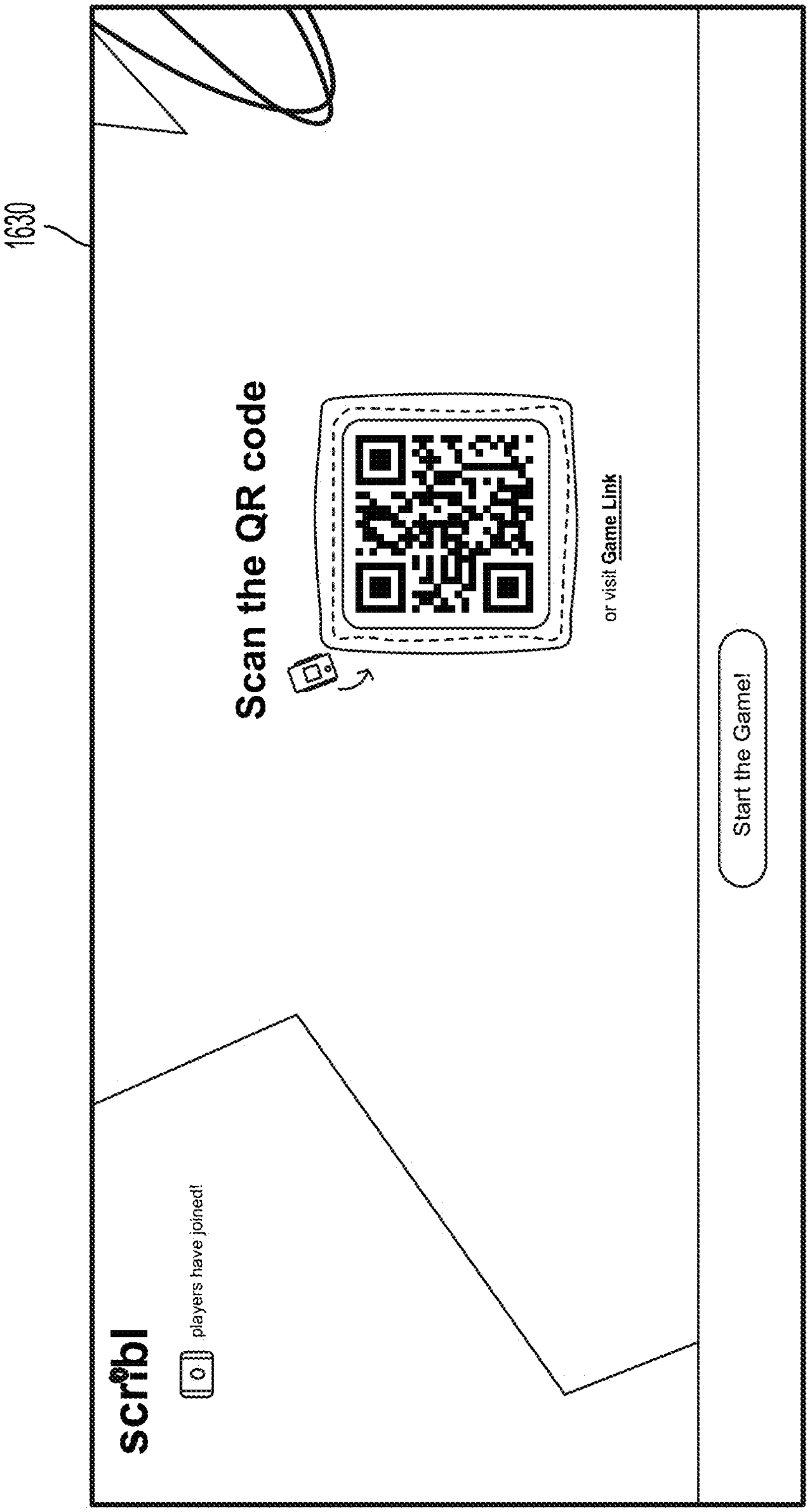

Selecting the "launch game" button 1616 in interface 1612 of FIG. 16C causes the collaborative platform 150 to generate and present a "join game" or "lobby" user interface (e.g., user interface 1630 shown in FIGS. 16D, 16E) on the host's laptop. The host shares the "lobby" user interface with the rest of the participants using the screenshare option built into the video conferencing tool.

Figure 4B:
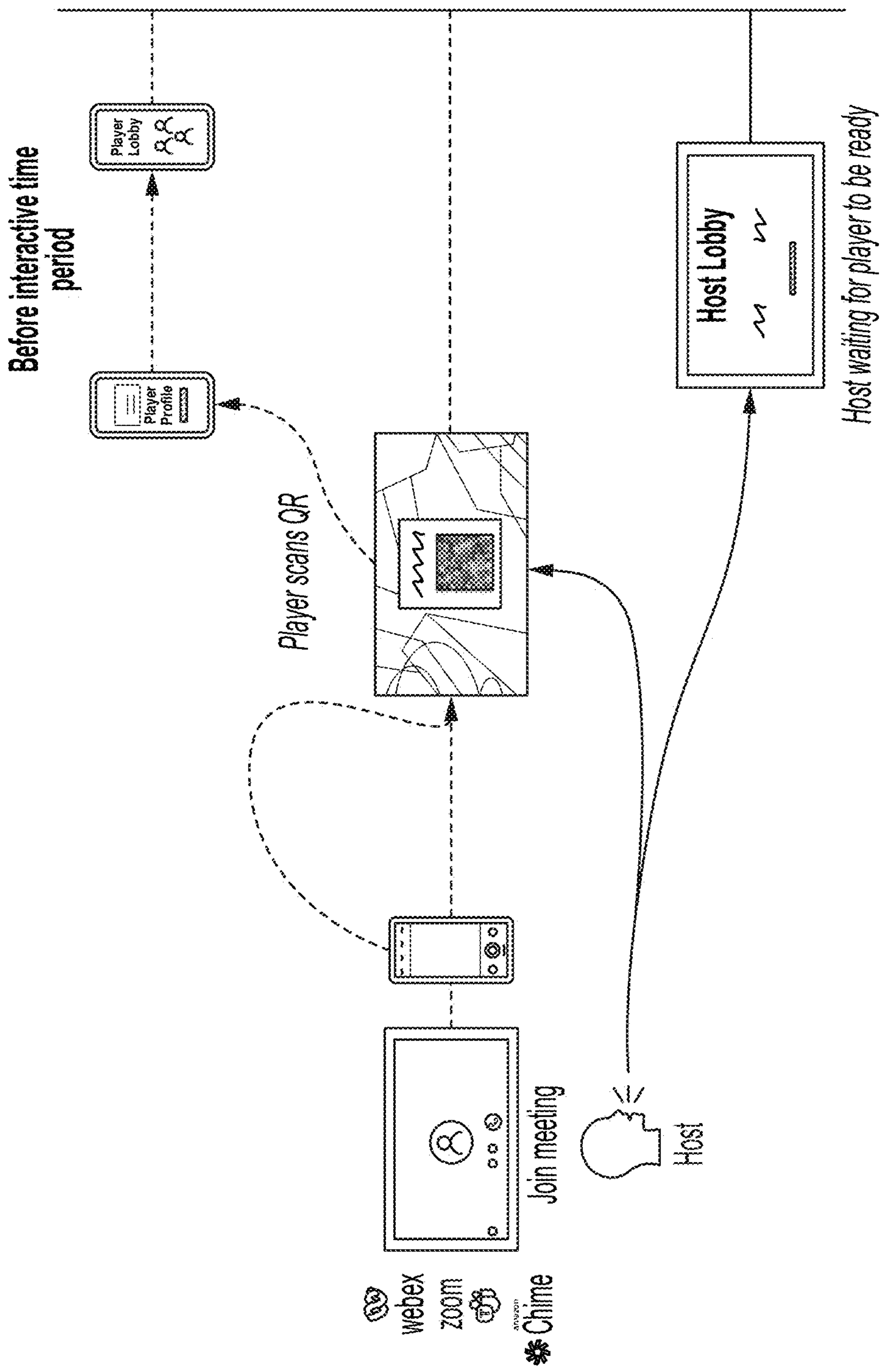
Figure 16E:
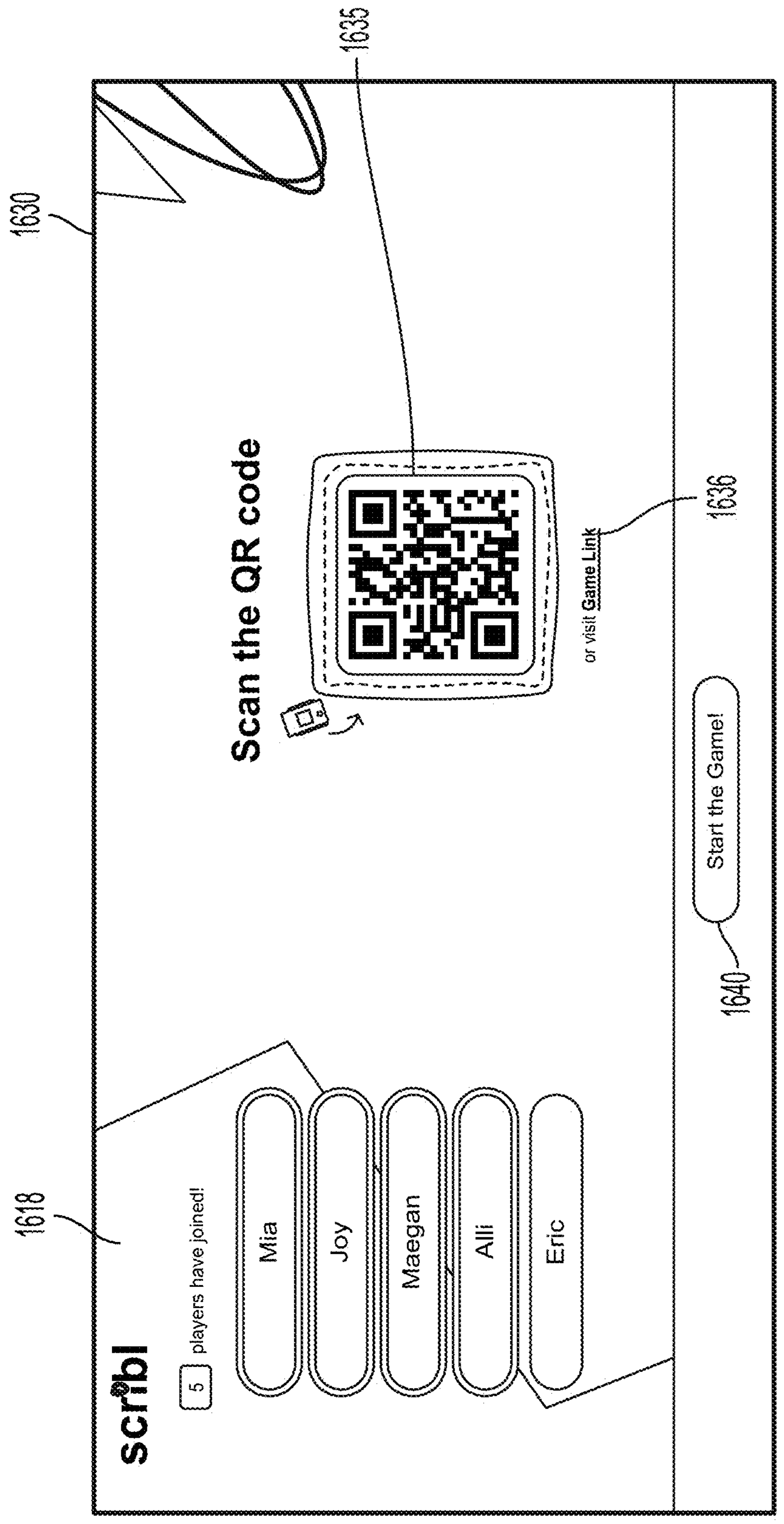

The "join game" or "lobby" user interface includes a machine-readable code, such as a QR code, for the game. As shown in FIG. 4B, each participant in the video meeting can scan the QR code presented on their respective laptops using their respective smartphones to join the game. The host can also join the game by scanning the QR code presented on his laptop. As the participants join the game, their names appear on the left side 1618 of the "lobby" screen 1630, as shown in FIG. 16E. Once all the participants (i.e., the host and the other participants) have joined the game, the host may initiate the game by selecting the "Start the Game" button 1640 on the "lobby" screen.

Figure 15A:
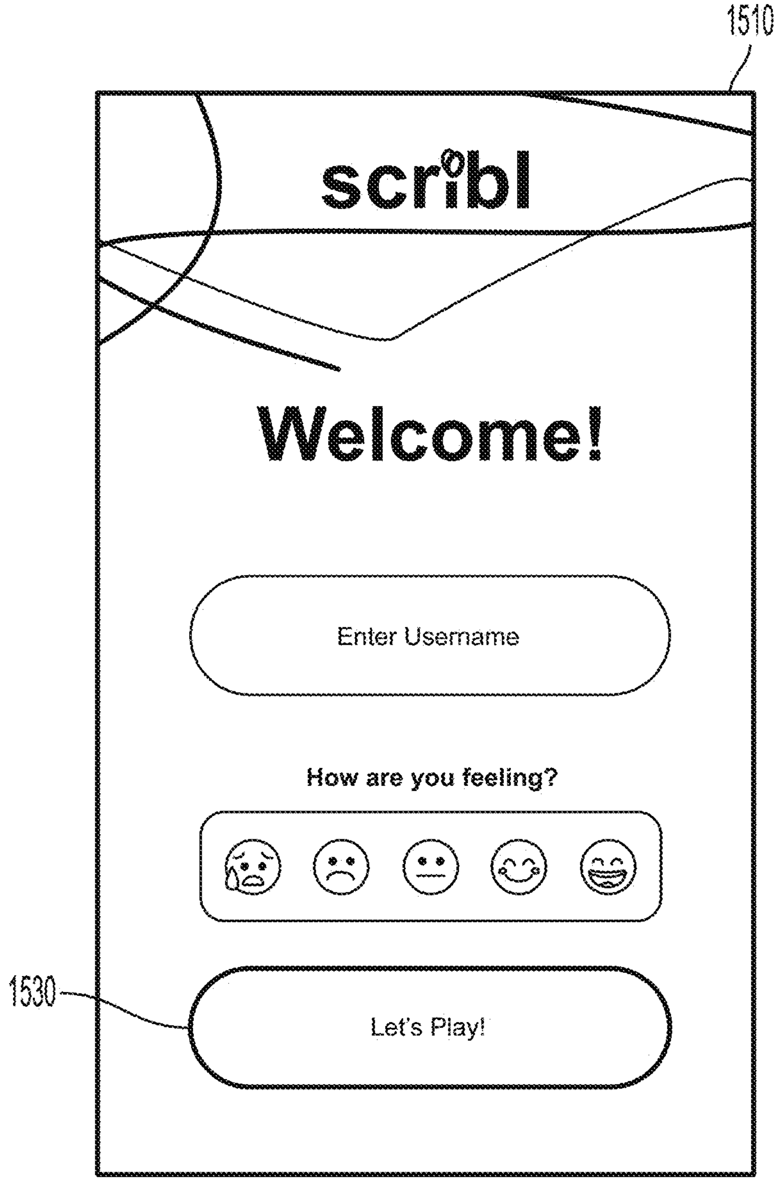
FIGS. 15A-15K are screenshots of user interfaces generated for participants as part of a collaborative game session, in accordance with some embodiments of the technology described herein.
Figure 15B:

When a participant scans the QR code using his/her smartphone, a "welcome" user interface is generated and presented on the smartphone (e.g., user interface 1510 of FIG. 15A shown on a phone). The participant is prompted to enter a username and select a sentiment indicating his/her current mood. The participant may select, from a number of presented emoticons representing different moods, one emoticon representing the participant's current mood. The participant may select the "Let's play button" 1530 to start playing the game.

Figure 15C:
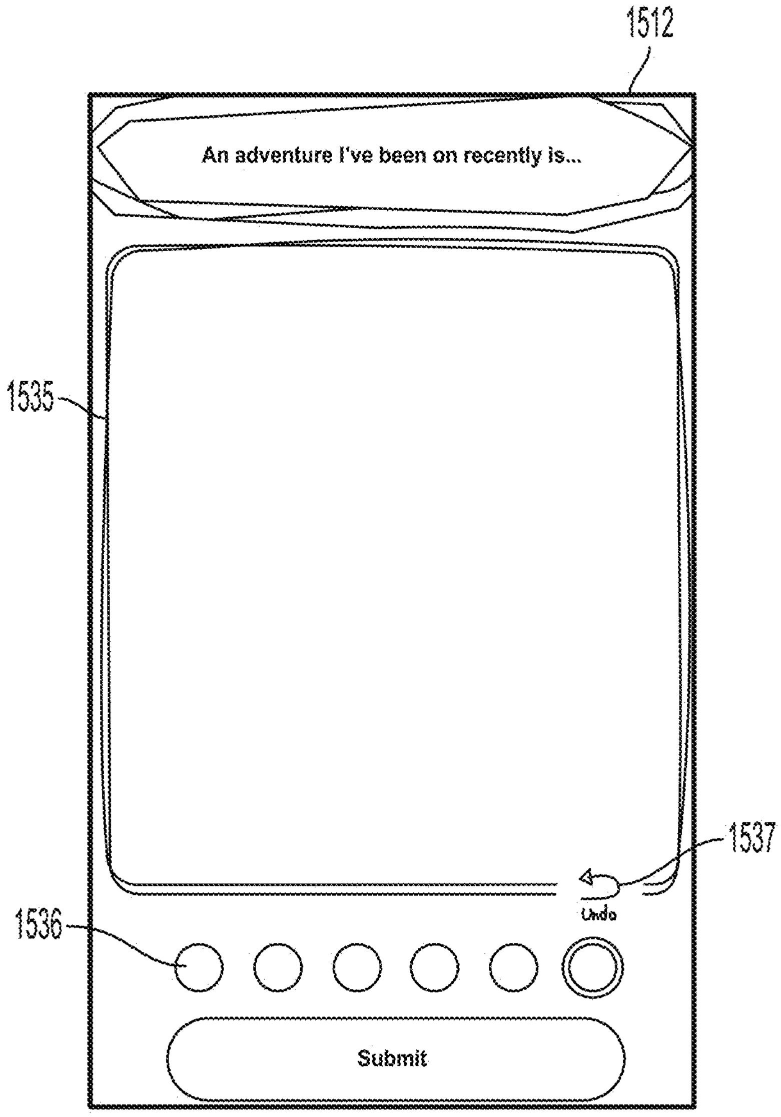
Figure 16F:
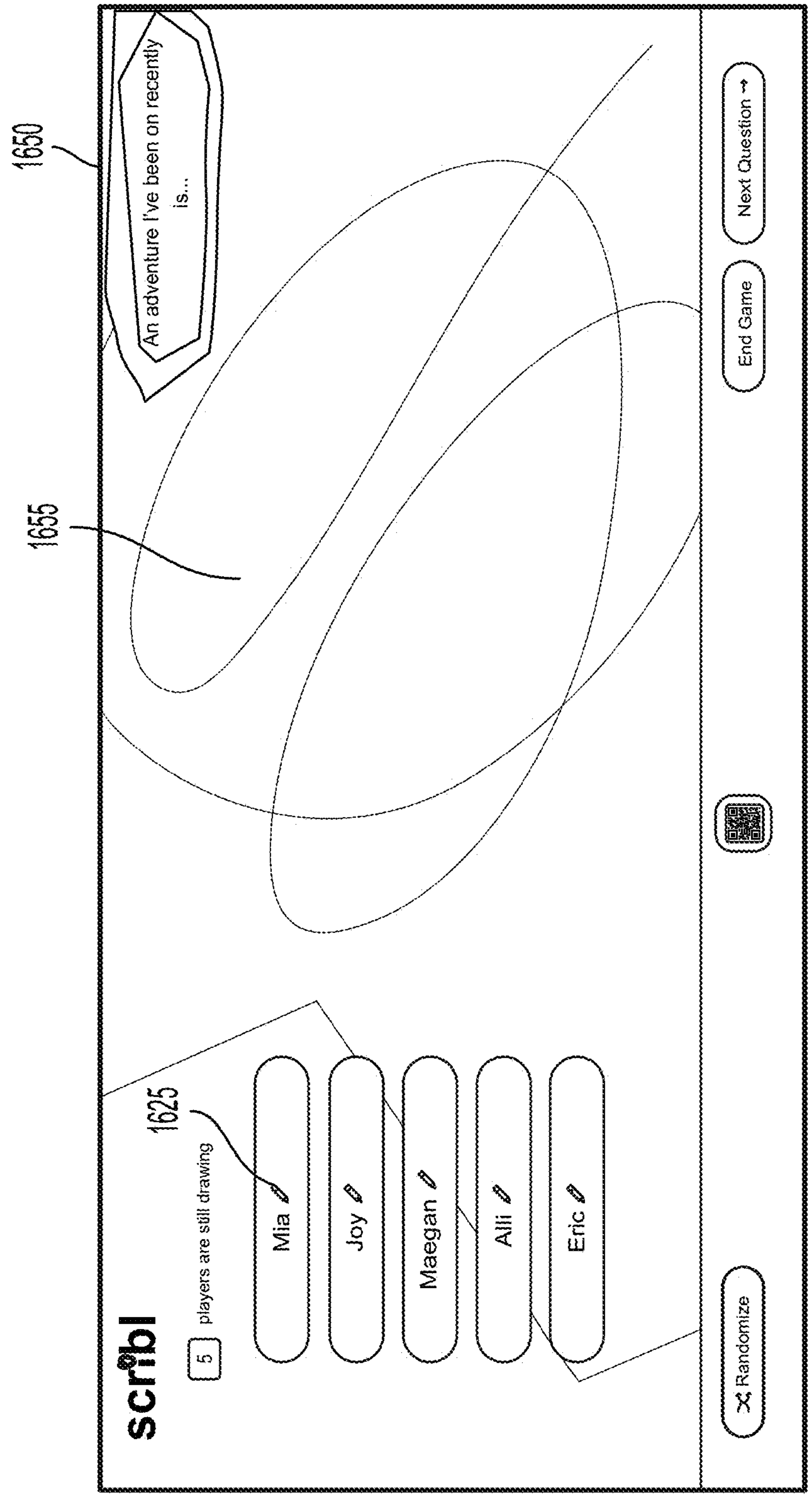
Figure 16G:
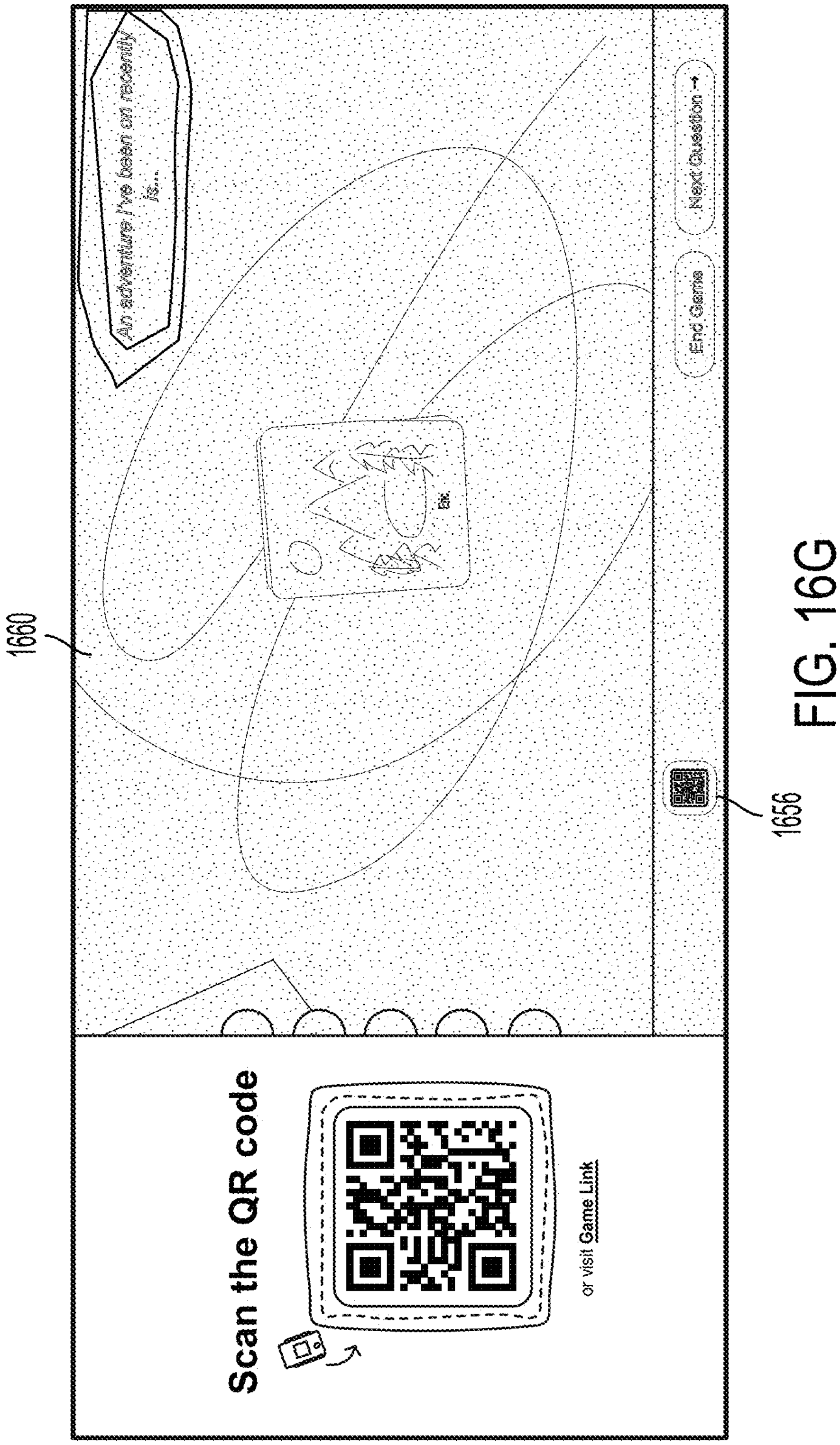

Once the game is started, a gameboard may be generated and presented on the host laptop's shared screen (i.e., the screen being shared with the other participants through the video conferencing tool). An example of this gameboard interface is shown in FIG. 16F. Participants who have yet to submit their drawing are indicated by a pencil animation 1625 next to their name. Also, a drawing phase of the game is initiated by presenting a drawing canvas 1535 on each participant's phone. Each participant draws a drawing corresponding to the prompt. For example, each participant may draw a drawing of a recent adventure. An example drawing canvas screen 1512 on a participant's phone is shown in FIG. 15C.

When all the participants have completed their drawings, the host may initiate a sharing phase where participants share their stories about the drawings they drew. During the sharing phase, the gameboard is updated to include the drawings of all the participants. An example updated gameboard screen in shown in FIG. 16H. The host may select which participant shares the story by selecting his/her name on the left side of the gameboard (as shown in FIGS. 16H and 16I where Eric and Maegan are selected) or by selecting a "randomize" button 1645 that causes a participant to be automatically selected. As a particular participant is sharing his story about his drawing, that participant's drawing may be presented on each of the other participant's phones and they will be prompted to react to the story by selecting one or more emojis representing different reactions (e.g., gratitude, connection, support, strength, and reflection). These reactions (e.g., input emoji reactions) to drawings and/or shared stories received during the interactive period may also be referred to herein as in-game reactions. An example screen 1517 presented on each of the other participant's phone is shown in FIG. 15H. Each participant may react to the story by selecting one or more emojis 1545. As shown in FIG. 15I, a participant may select emojis 1560 and 1562.

In some embodiments, the reactions of participants to the shared stories may cause the drawings on the gameboard to move to indicate connections and relationships in real-time. For example, similar reactions to two drawings may cause the gameboard to be updated such that the two drawings are moved closer to one another. The drawings on the gameboard are moved or shuffled in real-time based on the reactions. In some embodiments, the gameboard may be updated by providing visualizations, such as addition of colors or changes in color or hue, lighting changes, and/or other visualizations. In some embodiments, the movement of drawings or the visualizations on the gameboard may inform the generation of the background image and/or the artwork.

Figure 4C:
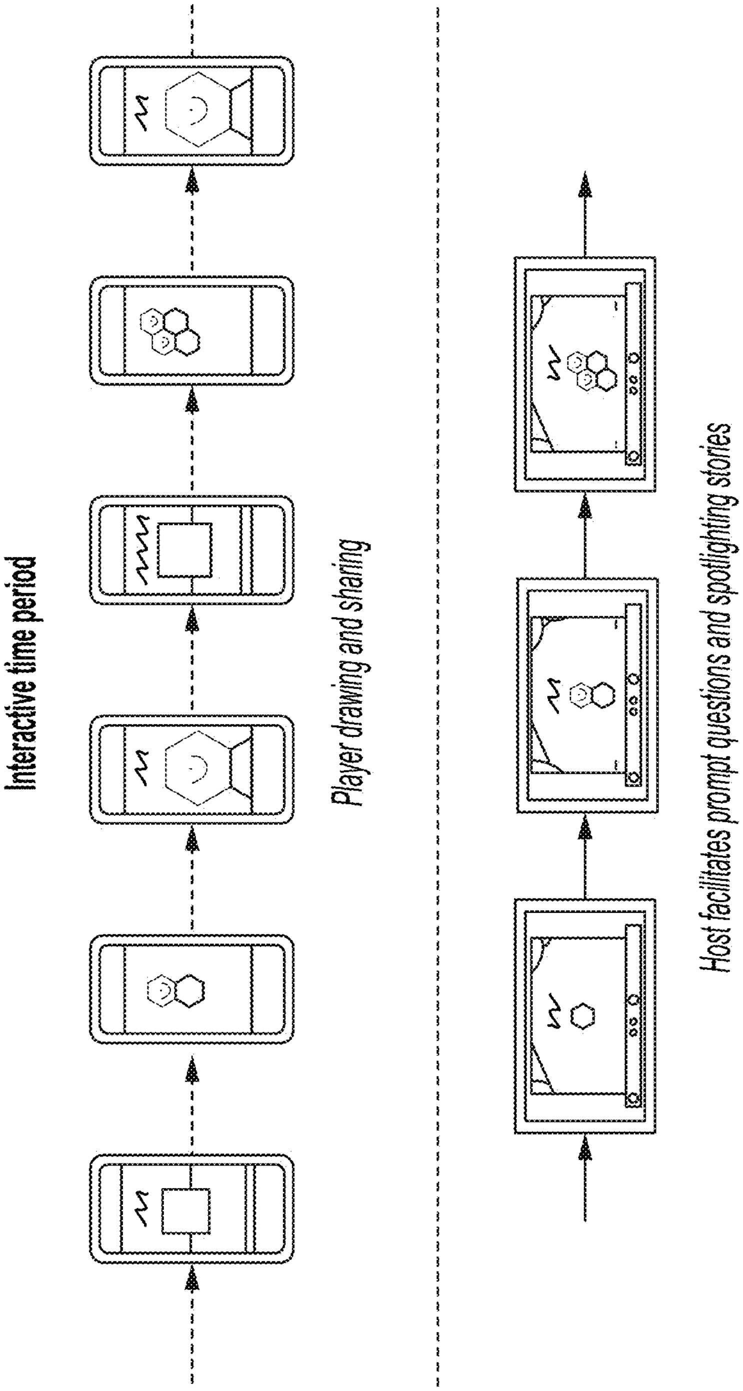

Once every participant has shared his/her story, the host may select a "next question" button 1672 if more than one prompt was selected or the "end game" button 1670 to end the game. When multiple prompts are selected, the drawing and sharing phases may be repeated for each selected prompt. The drawing and sharing phases may be referred to as an "interactive period" of the game as shown in FIG. 4C.

When the game ends (e.g., after the interactive period of the game), each participant may be prompted to select a sentiment indicating his/her current mood (i.e., mood after playing the game). The same set of emoticons that were presented to the participants prior to the interactive period of the game may again be presented to solicit the current mood. An example interface 1520 presented on each participant's smartphone to obtain sentiment after playing the game is shown in FIG. 15K.

Figure 16H:
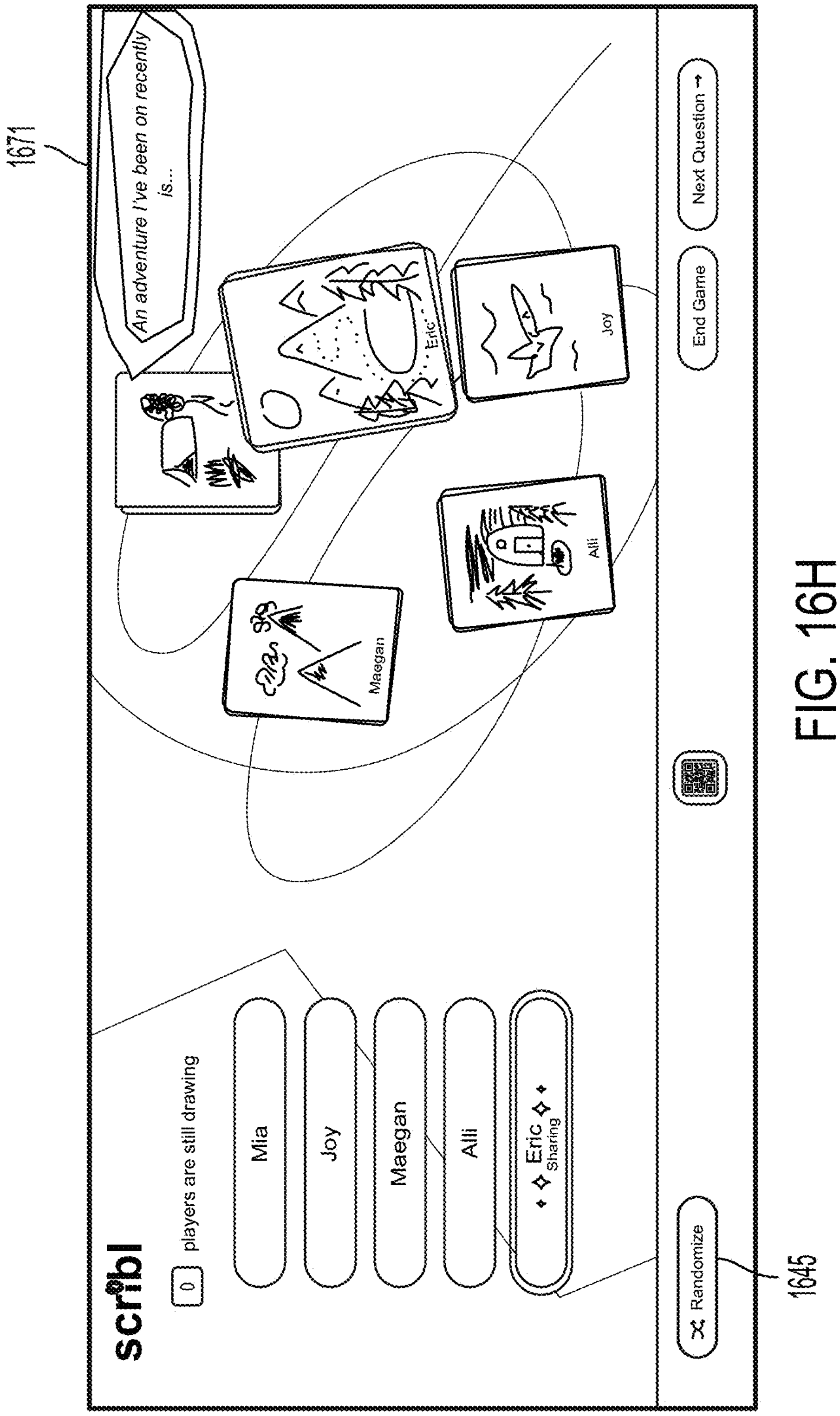
Figure 16I:
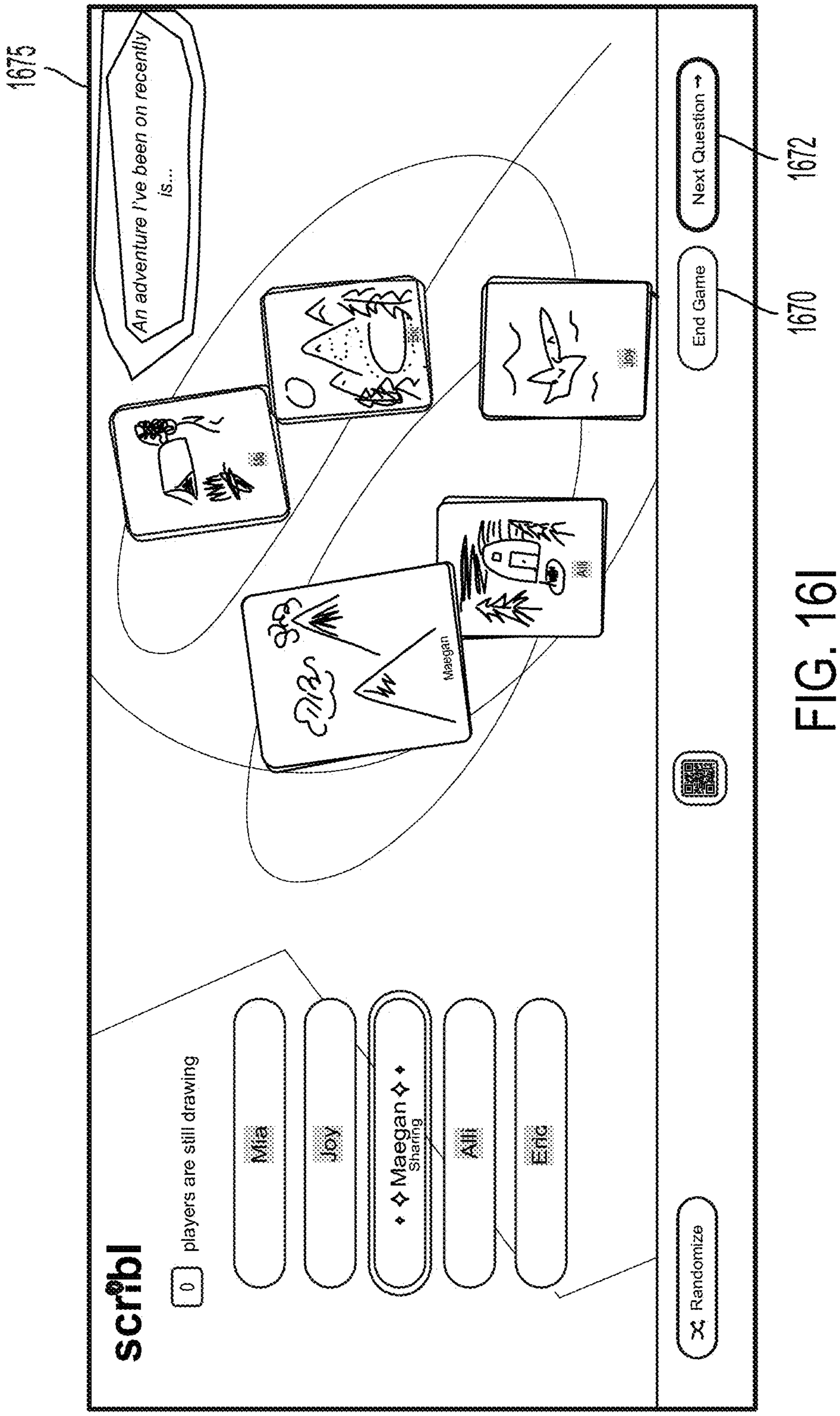

An end-game readout screen may be generated and presented on the host laptop's shared screen (i.e., the screen being shared with the other participants through the video conferencing tool). An example of an end-game screen is shown in FIG. 16K. The end-game screen displays pre-game sentiments for the group (i.e., sentiments collected prior to the interactive period of the game) and post-game sentiments (i.e., sentiments collected after the interactive period of the game). The end-game screen also displays the sentiments (e.g., reactions to the shared stories) collected during the interactive period of the game.

Figure 4D:
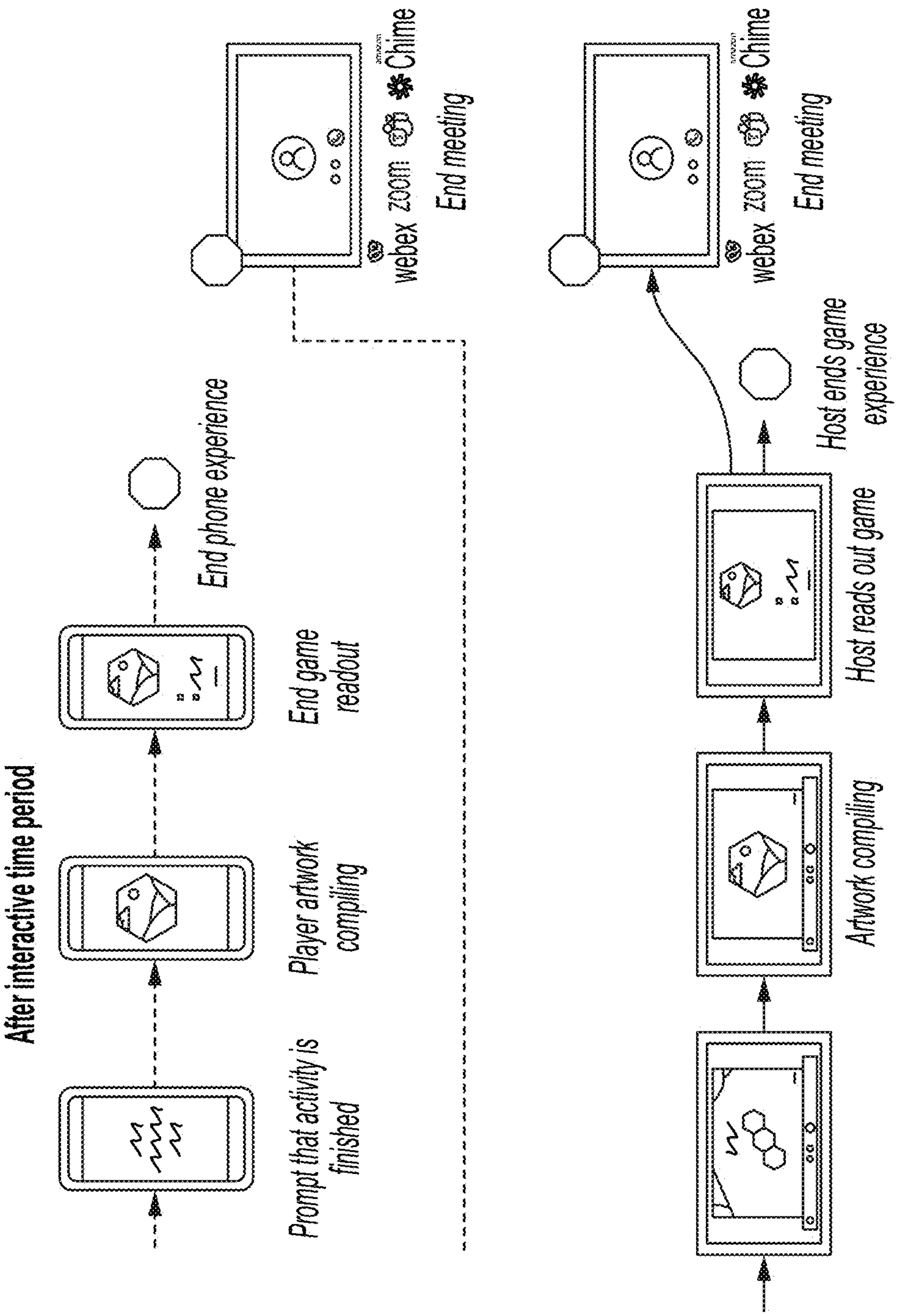

As shown in FIG. 4D, prior to ending the meeting, artwork may be generated using the drawings and the sentiments received from all the participants' phones. The generated artwork may be presented on each participant's phone.

Figure 17A:
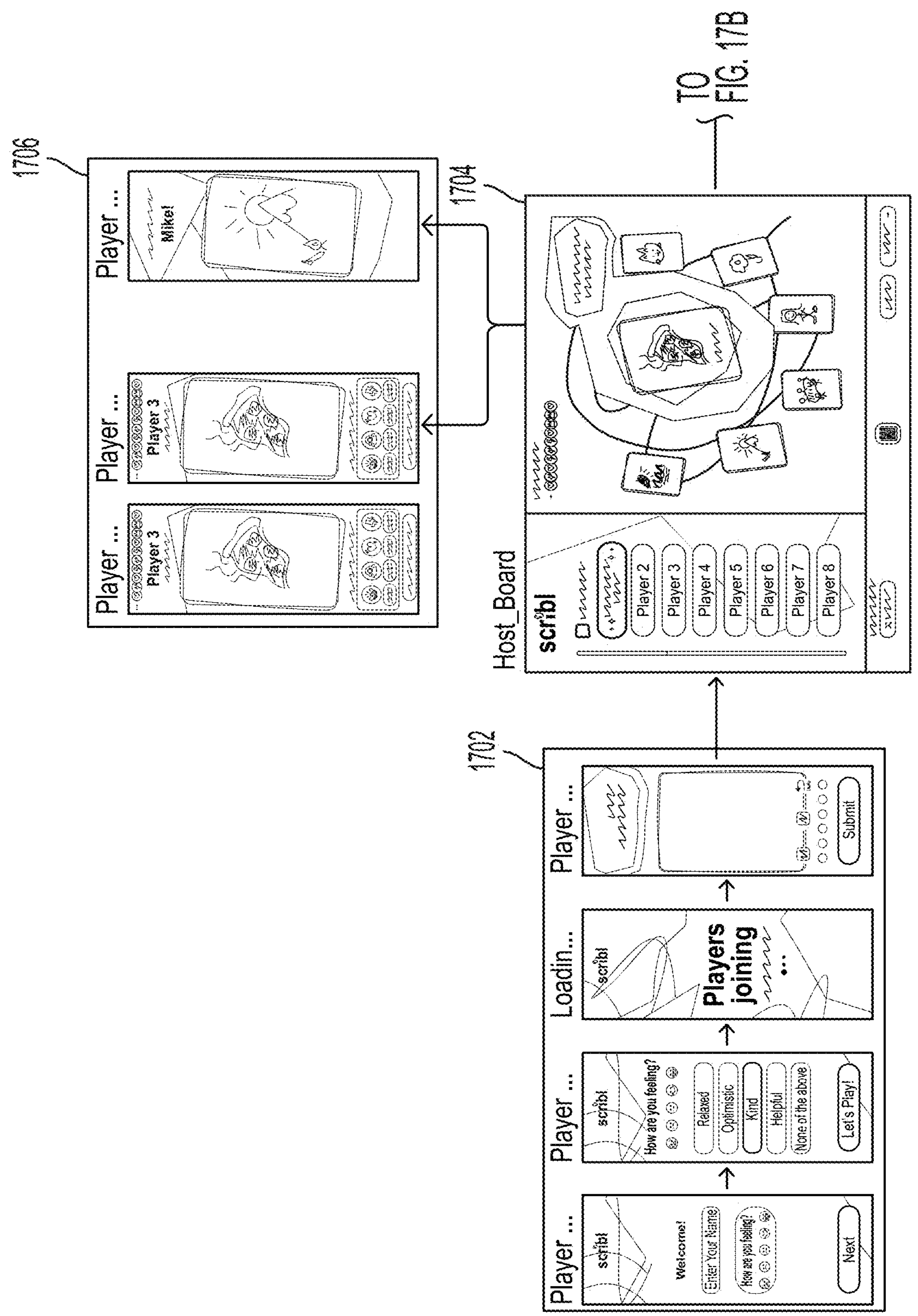
FIGS. 17A-B illustrates an example flow of a collaborative game session, in accordance with some embodiments of the technology described herein.
Figure 17B:
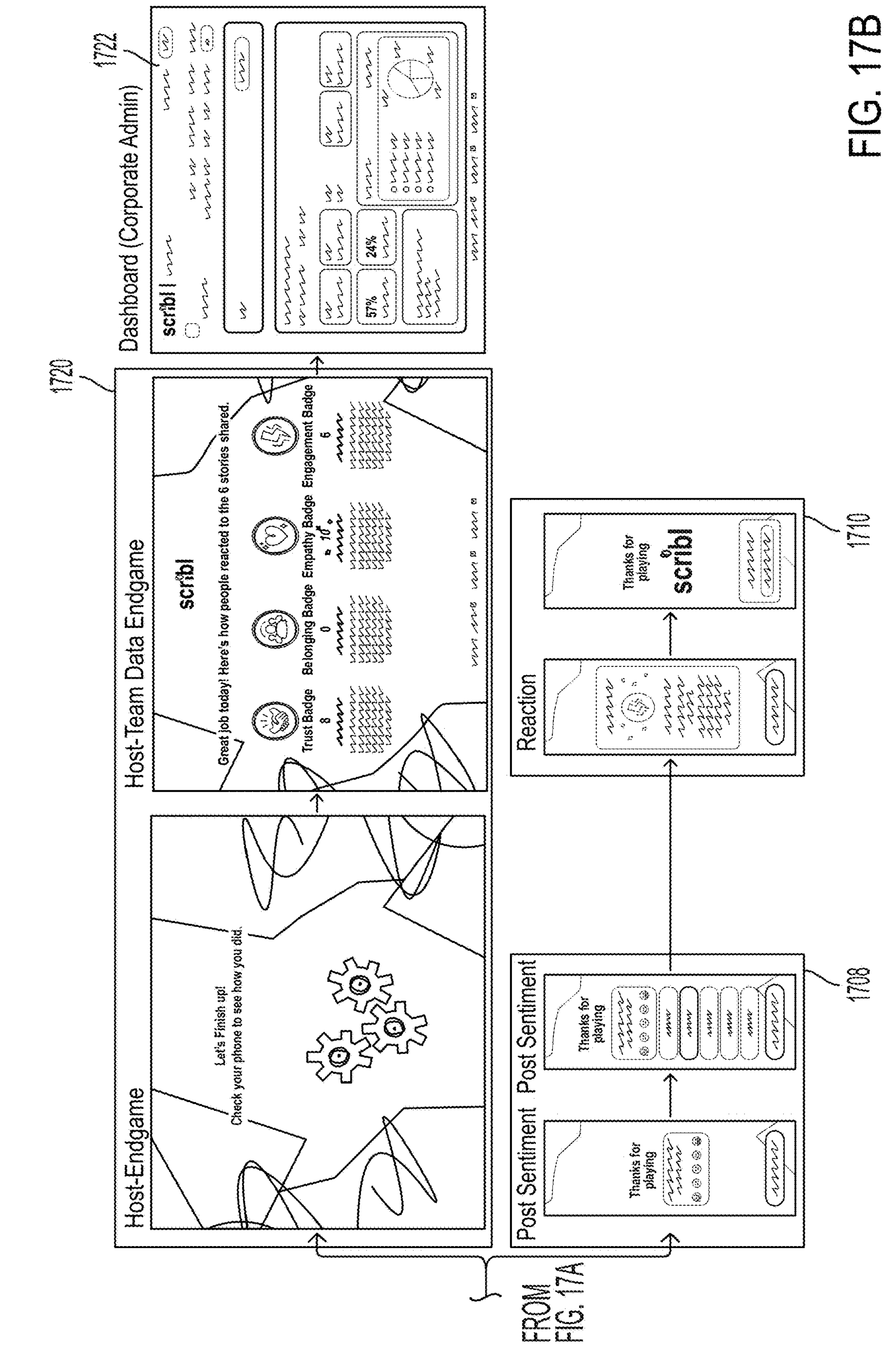

FIGS. 17A-B illustrates an example flow of a collaborative game session, in accordance with some embodiments of the technology described herein. Participants may via user interfaces shown in portion 1702 of FIG. 17A join a game, provide pre-sentiment inputs, and draw their drawings on a drawing canvas. A gameboard 1704 may be presented on the host user's device. The gameboard 1704 includes a list of participants on the left-hand side and their drawings on the right-hand side. The host initiates a sharing phase where the participants share their stories via interfaces shown in portion 1706 of FIG. 17A. When the game ends (e.g., after the drawing and sharing period of the game), the flow moves to FIG. 17B where each participant may be prompted to provide post-sentiment inputs via interfaces shown in portion 1708 of FIG. 17B. End game screens shown in portion 1710 of FIG. 17B may be presented to the participants. End game screens shown in portion 1720 of FIG. 17B may be presented to the host user. An insights dashboard shown in portion 1722 of FIG. 17B may be presented to the admin users.

Figure 14D:
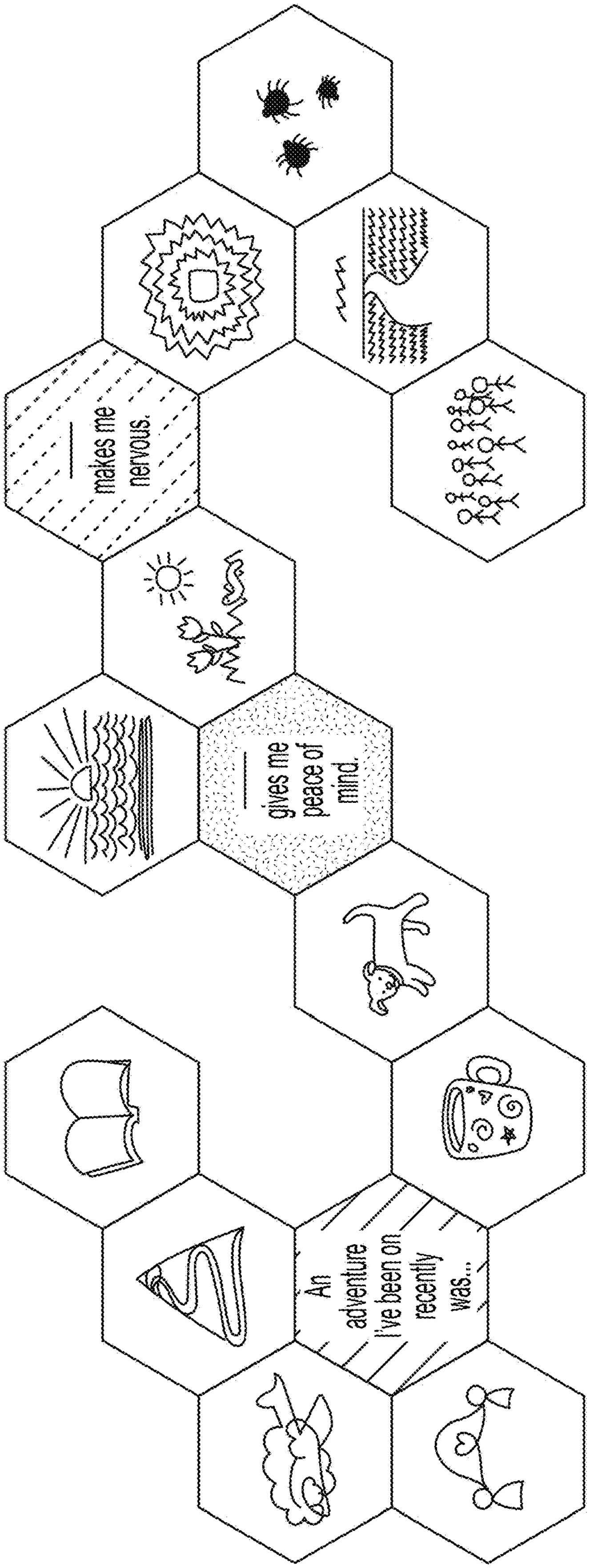

Example Collaborative Platform Functionality and Uses:

- Ability for multiple customers to run instances of the game at the same time and play in secure environments.
- Ability to administer, set up a new game, and host the game.
- Ability to set up new/individual customer and player accounts.
- Ability to select a prompt deck, invite users and select a prompt.
- Allow users to join and provide core game play capabilities.
- Ability to pull data from the game instances for reporting purposes.
- Ability to share game via email or social media.
- Ability to provide feedback during game.
- Ability to see player drawings at end of game.
- Ability to see statistics/data at the end of the game.
- Ability to share final game artwork.
- Ability for hosts to create their own prompts, i.e., to gauge sentiment, address a particular issue, or celebrate a special occasion.
- Ability of hosts to customize when choosing prompt deck or set of prompt questions.
- Themed prompt decks such as EQ (emotional quotient) and DE&I (diversity, equity, and inclusion) as well as decks created specifically for organizations with their needs and culture in mind.
- Time management features to help hosts better fit Scribl into their workflow.
- Multiple options when providing feedback.
- Dynamic Gameboard—shifting/movement as connections are made; showing connections and relationships in real-time based on participant reactions. Stories move and respond to participant reactions showing the connections and relationship in real-time. Gameboard can represent a single prompt or multiple (e.g., all) rounds of a game.
- Compressed artwork at the end of game using stitching techniques and code. An end-game mechanism that combines all the of the drawings into a single piece of art that participants can download and share. An example artwork generated by combining drawings across multiple prompts or rounds of a game is shown in FIG. 14D.
- Ability to run visualized reports with data sets at end of game.
- Device agnostic game play experience.

- Additional canvases that rotate between rounds in a game featuring different color palettes and brush styles.
- Drawing challenges to keep the game engaging and fun.
- Additional creative inputs, for example, HabLab using Scribl to teach prompt generation and other soft skills for generative AI.
- A gameboard that gives the host controls, scales across devices, and highlights the art being shared.
- "Event" mode that can engage larger audiences and gauge group sentiment.
- A dedicated dashboard for organizational leads that provides high level numbers at a glance as well as breakdowns and visualizations for each session played.
- Reactions influencing the dynamic gameboard and building the artwork background in real time; using the dynamic gameboard background to inform the generation of the background image of the artwork and/or the artwork.
- Create an original piece of art using individual drawings, and sentiment inputs prior to, after, and during the interactive period of the collaborative session; Generative AI uses this data to create an abstract and colorful background image; Participant drawings are collaged over the background image; Participants can download and share the art they created.
- Can be used to promote Corporate Wellness
  - Teambuilder, Ice breaker, Huddles, mental wellbeing
  - Decision making tool:
    - Ability to pose organizational or project specific questions,
    - Reactions act as a voting system or as a way to identify trends.
- Can be used in educational environments—equipping teachers and counselors with Scribl.
- Can be used for events/conferences or any large group format.

In some embodiments, the platform 150 may enable a single-player version of the game where a single player plays solo on his computing device. Features of the single-player version may include:

- Option to play daily where all players playing solo receive the same prompt.
- Prompt may change at one or more intervals (e.g., every 24 hours).
- Players can view and track their history.
  - See changes in mood over time,
  - Create personal artifacts based on specific data sets (dates/life events)
- Players can post and share their stories to a global feed.
  - Navigate the feed and view other players stories/drawings,
  - Show connections between other players,
  - Create artifacts based on specific data sets (e.g., demographic, location, event, etc.)
- Eventual options for local play (e.g., a family around a table could play together using their phones)

Figure 5:
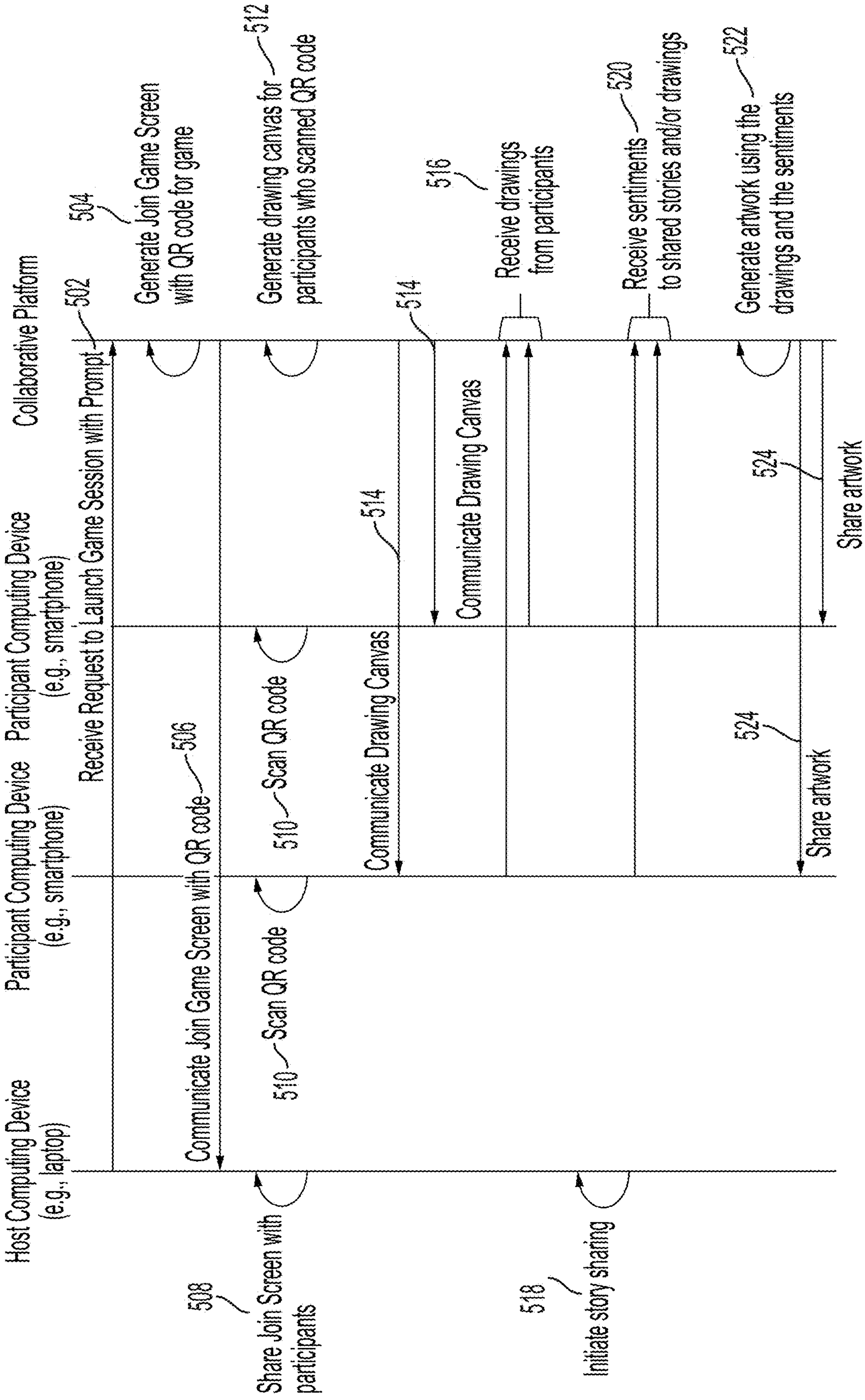
FIG. 5 is a diagram of an example flow of communications between computing devices and the collaborative platform of FIG. 2, in accordance with some embodiments of the technology described herein.

FIG. 5 illustrates an example flow of communications between the host and participant computing devices and the collaborative platform 150. At step 502, the platform 150 may receive a request, from a host computing device (e.g., laptop) to launch a game session between a group of participants. The request may include one or more prompts for the game session. At step 504, the platform 150 may generate a "join game" screen that includes a QR code for the game. At step 506, the platform 150 may communicate the "join game" screen to the host computing device. At step 508, the host may, using the host computing device, share the "join game" screen with the other participants using a video conferencing tool.

At step 510, each of the participants may, using their respective computing devices (e.g., smartphones) scan the QR code to join the game session. At step 512, the platform 150 may generate a drawing canvas for the participants who scanned the QR code. The participants who scanned the QR code may include the host and the other participants invited to the game session by the host. At step 514, the platform may communicate the drawing canvas to each of the participant computing devices. The participants may draw on the drawing canvas and the drawings may be received by the platform 150 at step 516.

At step 518, the host, using the host computing device, may initiate the story sharing phase. At step 520, the platform 150 may receive participants' sentiments to the shared stories and/or drawings. At step 522, the platform 150 may generate artwork using the participants' drawings and sentiments. The platform 150 may perform sentiment analysis and generate a background image for the artwork. The platform 150 may overlay the drawings onto the background image to generate the artwork. At step 524, the generated artwork may be shared with each of the participants.

Figure 15D:
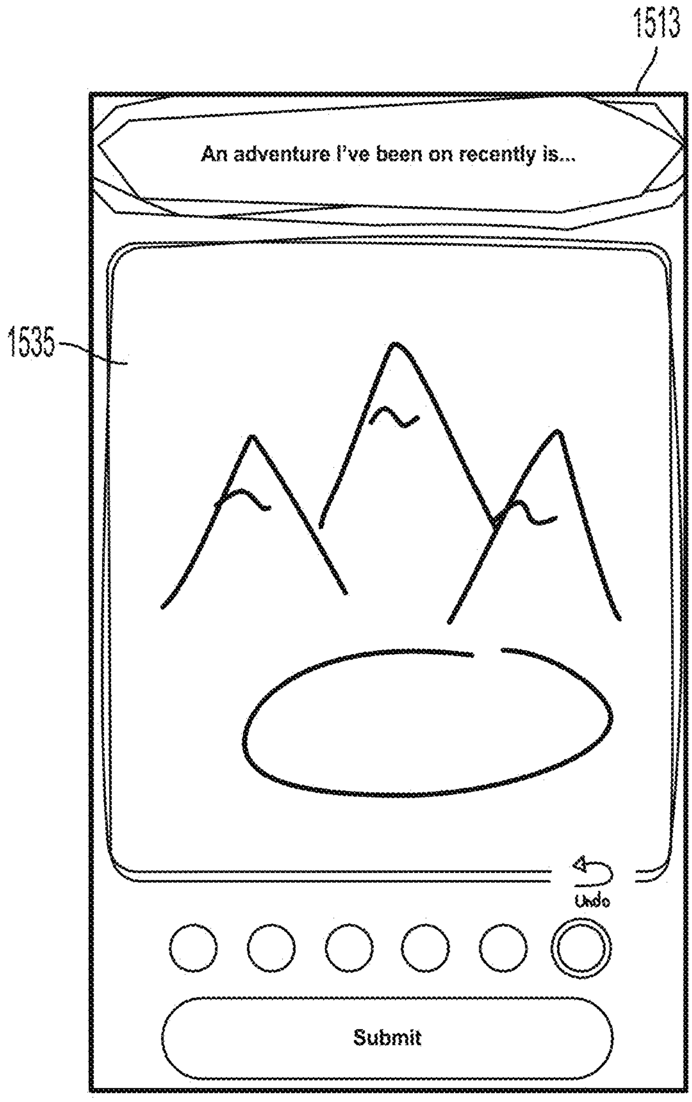
Figure 15E:
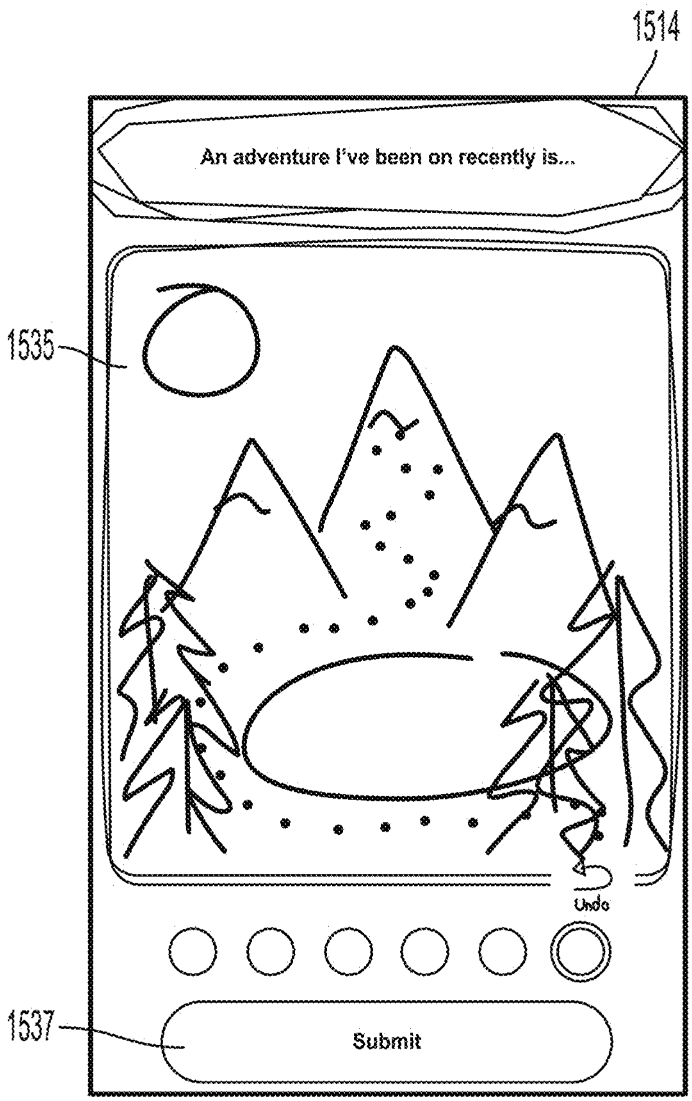
Figure 15F:
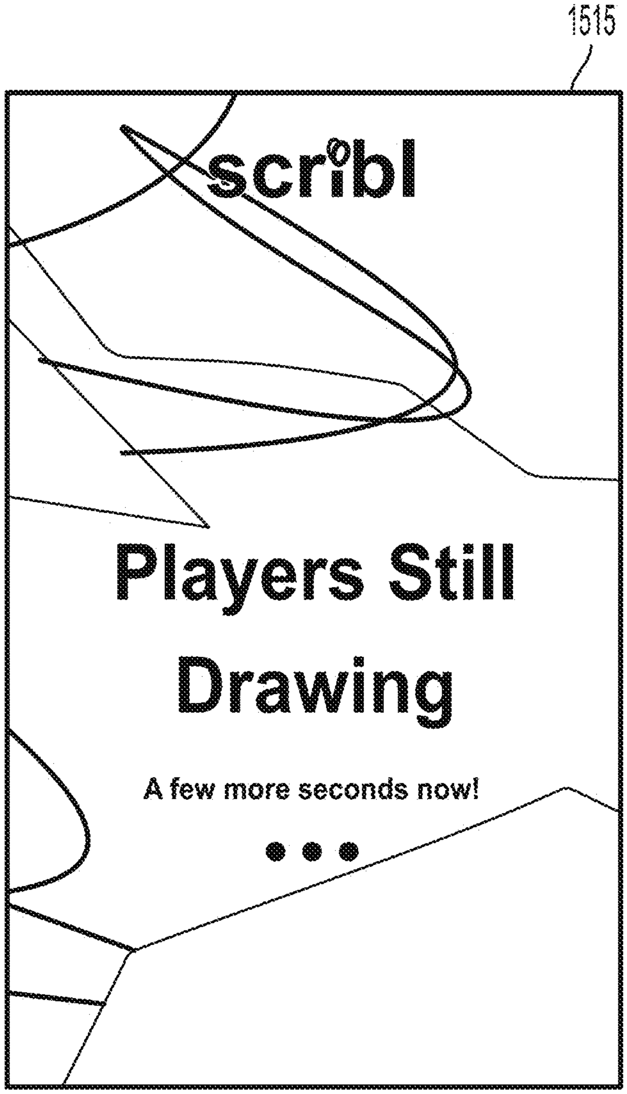
Figure 15G:
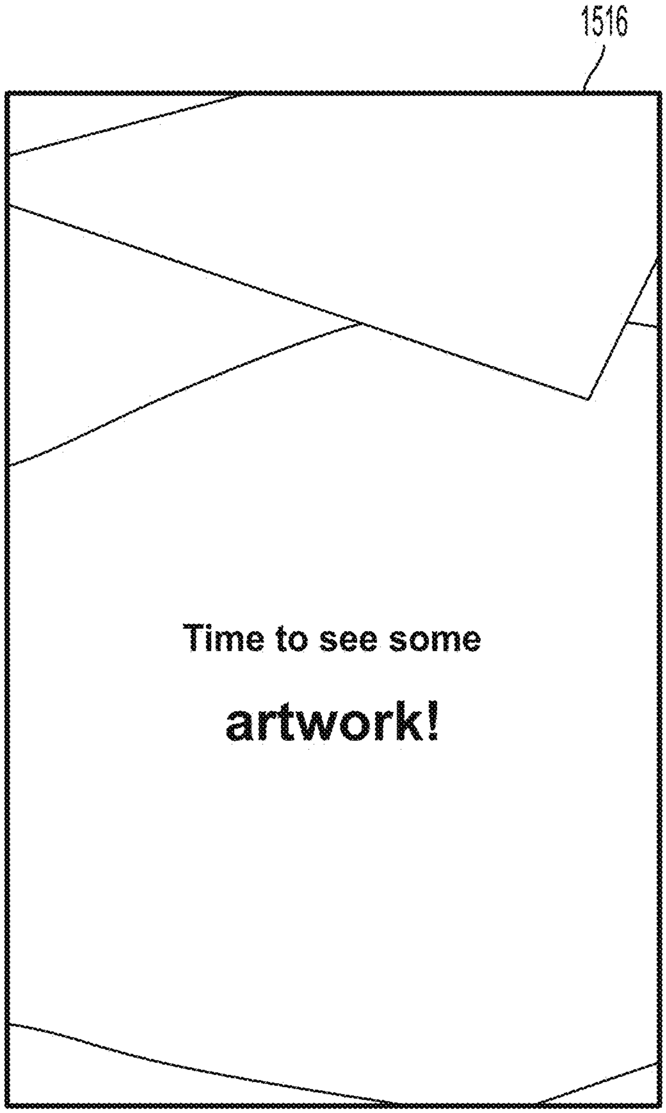
Figure 15H:
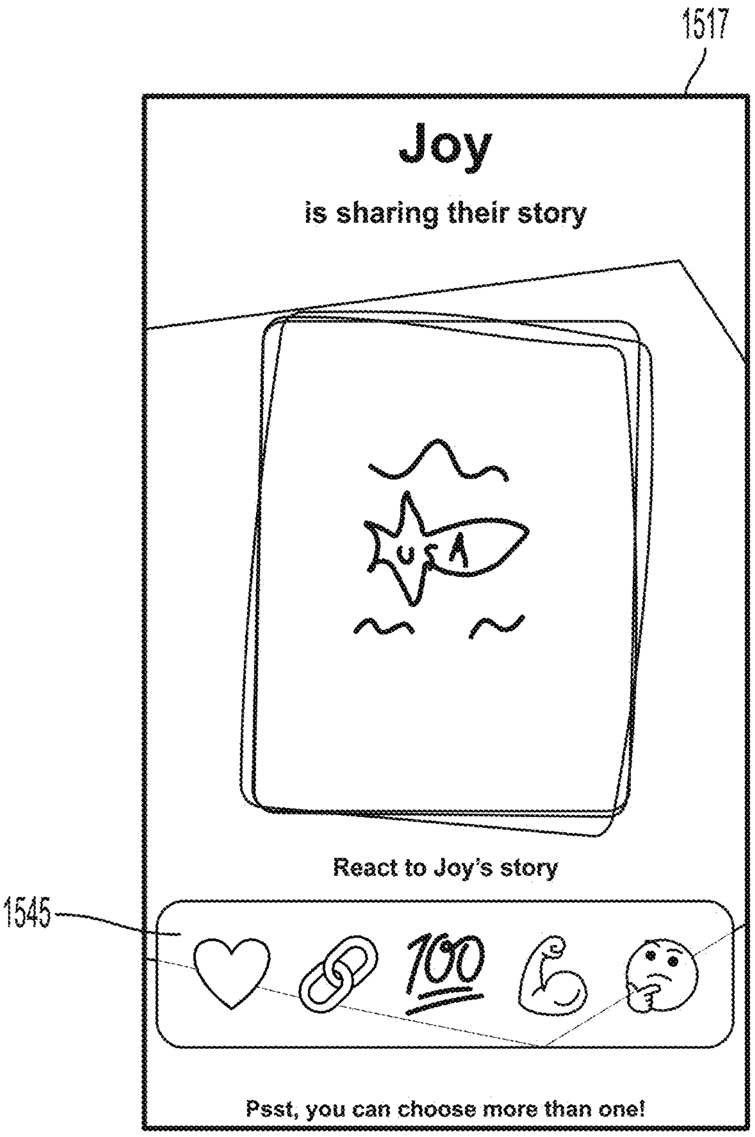
Figure 15I:
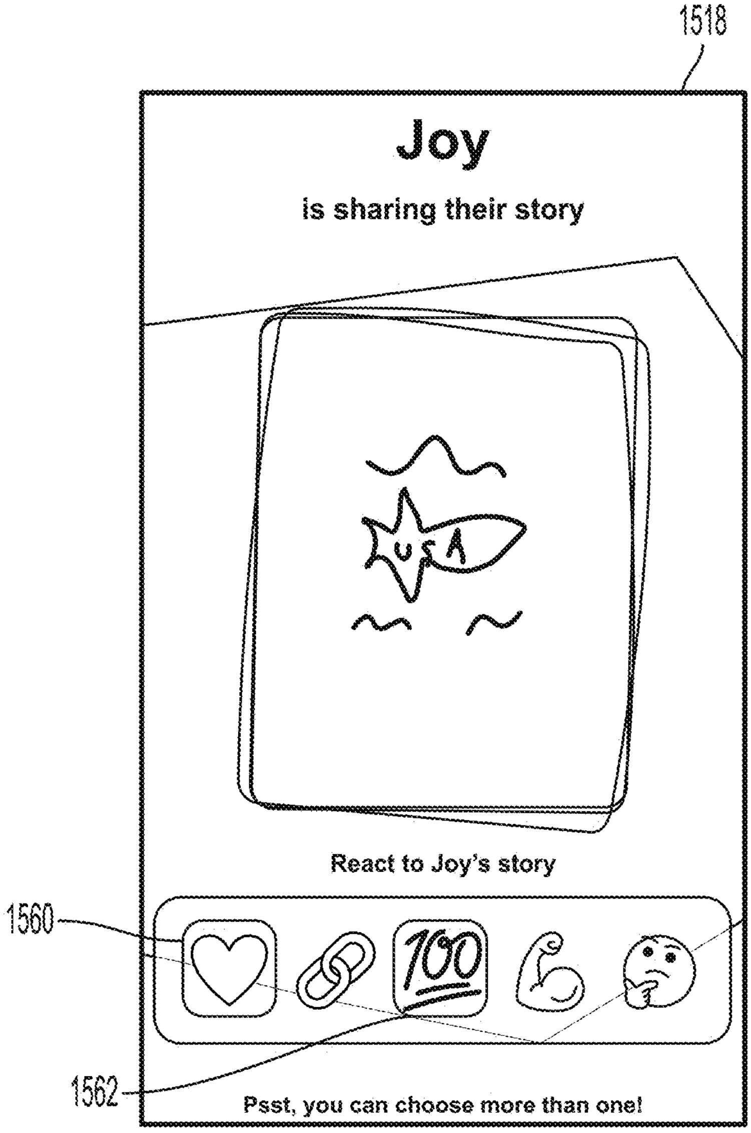
Figure 15J:
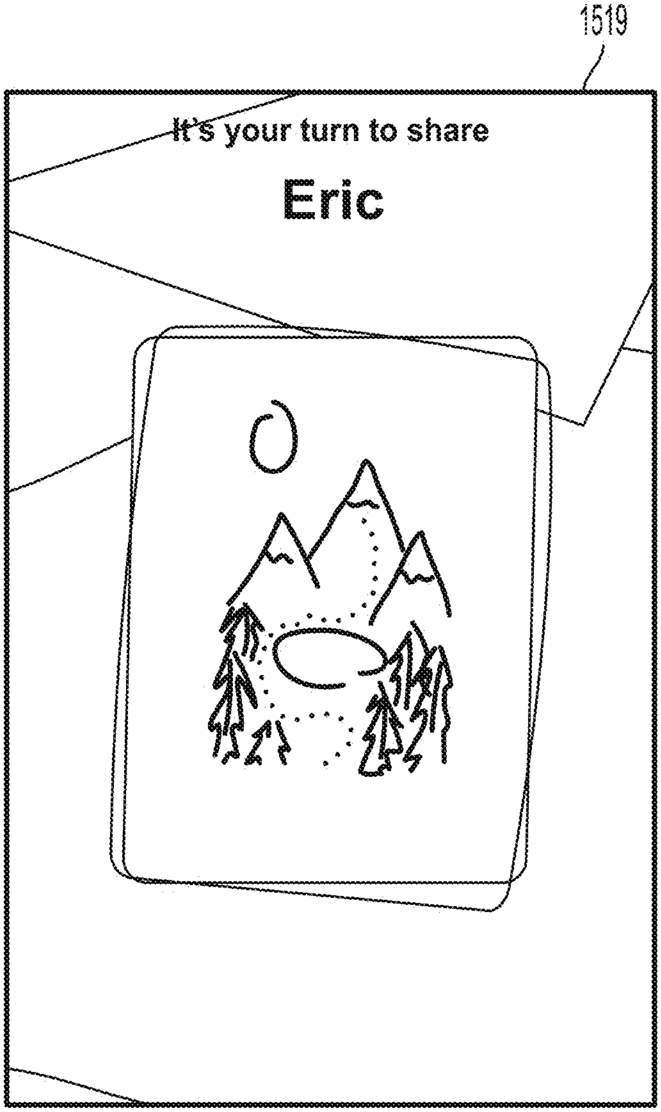
Figure 15K:

FIGS. 15A-15K show example screenshots of user interfaces presented to participants of the game. After scanning the QR code shared by the host user, the game may open in a participant's mobile browser and a welcome interface 1510 of FIG. 15A may be presented. The participant may be prompted to enter their name, choose their pre-sentiment and click the "Let's Play!" button 1530. As the other participants join, the interface 1511 of FIG. 15B may be presented until everyone has joined, and the host user clicks the "Start the Game!" button 1640 on the lobby screen 1630 of FIG. 16E. Each of the participants that join the game may see the gameboard on the host user's shared screen and the drawing canvas, for example, drawing canvas 1535 shown in FIG. 15C, on their mobile device. Participants may use their fingers or a stylus to draw their answer to the prompt using the provided color palette 1536 and the "undo" button 1537, if necessary. FIGS. 15D and 15E show interfaces 1513 and 1514, where a participant draws on the drawing canvas 1535. Once a participant has finished their drawing, they participant may click the submit button 153. As other participants draw, interface 1515 may be presented until all participants have finished their drawings. Once everyone has finished, the host user may initiate a sharing phase where participants share their stories about the drawings they drew. The host user may choose a participant to begin sharing, and interface 1516 may be displayed on the chosen participant's mobile device. As participants share, their art may be displayed on other participant's mobile devices. As the chosen participant (e.g., Joy) is sharing his story about his drawing, the drawing may be presented on each of the other participant's phones as shown in interface 1517 of FIG. 15H. Each of the other participants may be prompted to react to the story by selecting one or more emojis 1545 representing different reactions (e.g., gratitude, connection, support, strength, and reflection). These other participants have the option to react to the drawing/story by clicking any of the emojis (e.g., emojis 1560, 1562 in interface 1518 of FIG. 15I) in the lower portion the screen. In some embodiments, the participant sharing their own story may see the interface 1519 on their mobile device, with no option to react. Once all rounds have finished, participants may be asked to choose their post-sentiment as shown in interface 1520 of FIG. 15K.

Figure 16J:
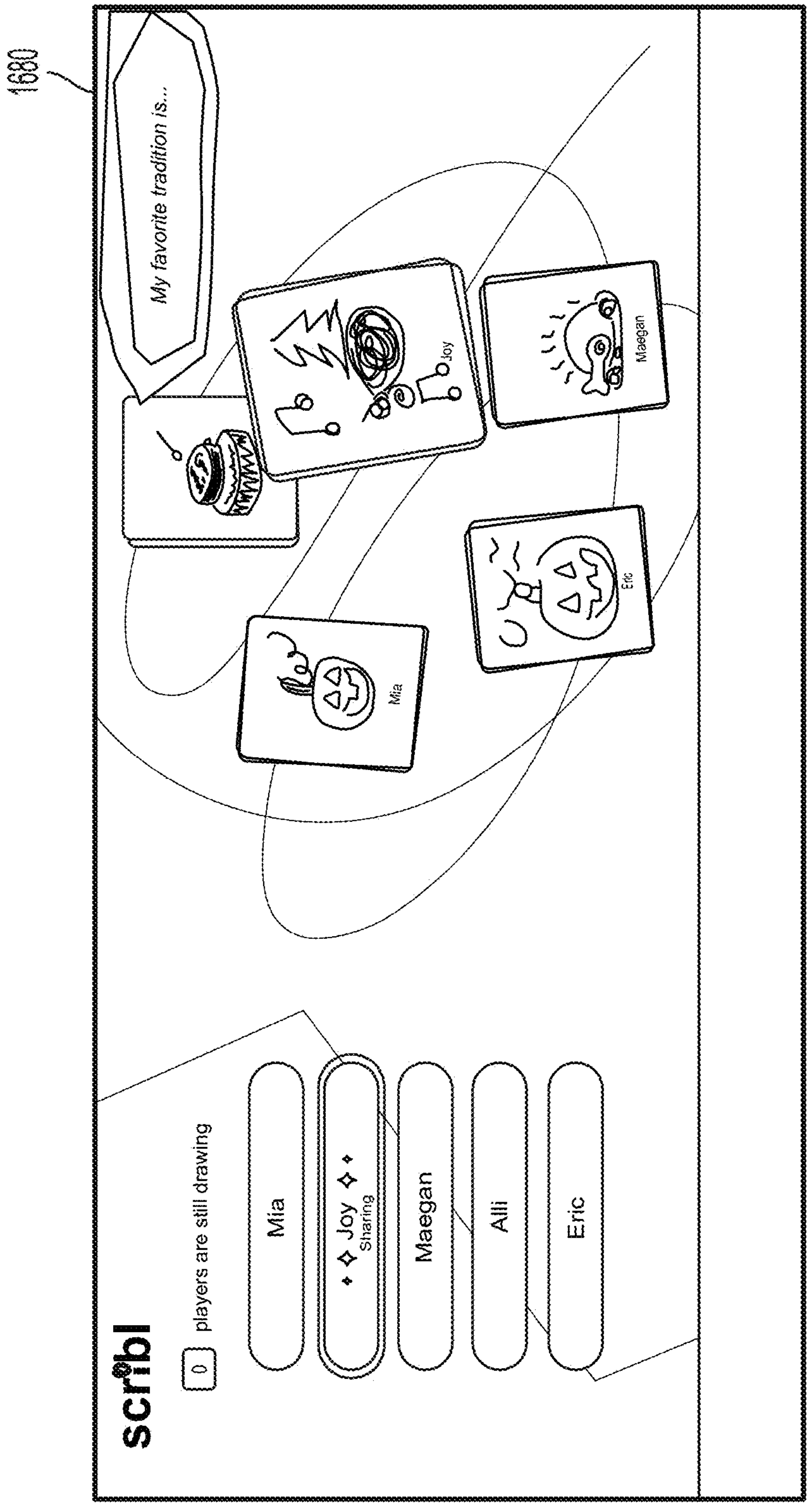
Figure 16K:
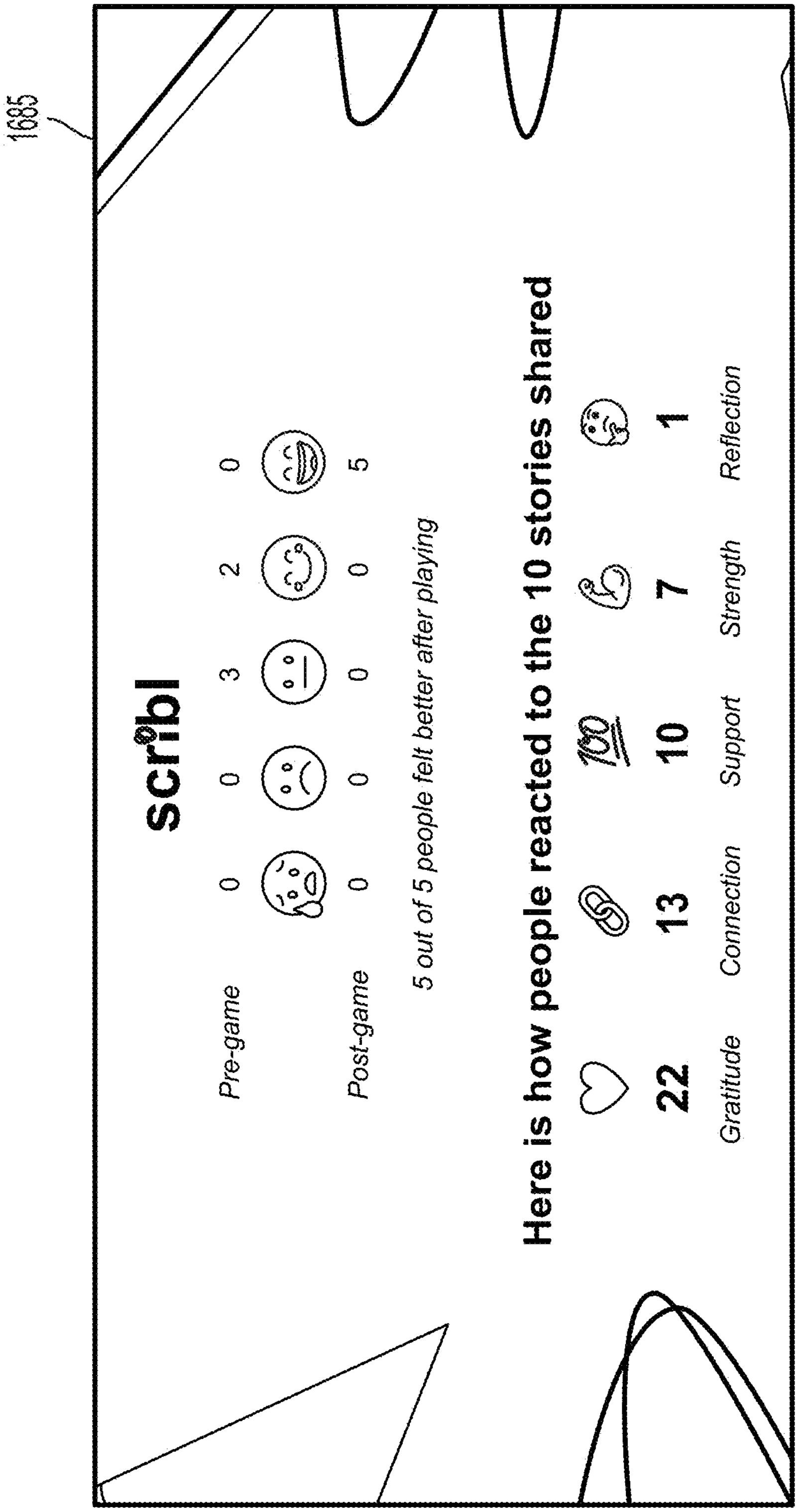

FIGS. 16A-16K show example screenshots of user interfaces presented to host users of the game. After the host user logs in, a game launch interface 1610 shown in FIG. 16A may be presented to the host user. The host user may manage or create prompts for a game by clicking on the "Create and Manage" button 1620. The host user may launch a game by clicking on the "Launch Game" button 1621. In response to selection of the "Launch Game" button 1621, interface 1611 shown in FIG. 16B may be presented to the host user. The host user may enter the team's name as shown in FIG. 16B and may select one or more questions or prompts for the game as shown in FIG. 16C. For example, as shown in interface 1612 of FIG. 16C, the prompt "My favorite tradition is . . . " is selected. Selection of the "Launch Game" button 1616, causes a join game or lobby interface 1630 shown in FIGS. 16D, 16E to be presented to the host user. Interface 1630 includes a QR code 1635 that the participants are asked to scan in order to join the game. In some embodiments, a game link 1636 may be provided for participants to access and join the game, for example, in cases where the participants are unable to scan the QR code. As participants join the game, their names appear on the left side 1618 of the "lobby" screen 1630, as shown in FIG. 16E. Once all the participants (i.e., the host and the other participants) have joined the game, the host may initiate the game by selecting the "Start the Game" button 1640 on the "lobby" screen. Once the game is started, a gameboard may be generated and presented on the host laptop's shared screen (i.e., the screen being shared with the other participants through the video conferencing tool). An example of this gameboard interface 1650 is shown in FIG. 16F. As shown in FIG. 16F, an empty gameboard 1655 is shown with the participant list on the left side 1618. As participants complete their drawings, those drawings appear on the gameboard 1655. If at any time, a participant closes his screen or loses connectivity, he can rejoin the game by rescanning the QR code as shown in interface 1660 of FIG. 16G. The QR code can be brought up by clicking on the QR code icon 1656 provided in the bottom portion of the interface 1660. Once every participant has submitted a drawing, a first participant (e.g., the host or other participant) shares their story. During the sharing phase, the gameboard is updated to include the drawings of all the participants. An example updated gameboard screen 1671 in shown in FIG. 16H. The host may select which participant shares the story by selecting his/her name on the left side of the gameboard (as shown in FIGS. 16H and 16I where Eric and Maegan are selected) or by selecting a "randomize" button 1645 that causes a participant to be automatically selected. In some embodiments, participants who have already shared their story are indicated by their name in the list and their drawings being grayed out at shown in FIG. 16I. For example, as shown in interface 1675 of FIG. 16I, while Maegan is selected and is sharing her story, the other participants Mia, Joy, Alli, and Eric have their names and corresponding drawings grayed out as they have already shared their stories. Once every participant has shared his/her story, the host may select a "next question" button 1672 if more than one prompt was selected or the "end game" button 1670 to end the game. When multiple prompts are selected, the drawing and sharing phases may be repeated for each selected prompt. For example, interfaces 1671 and 1675 depict a sharing phase for a first prompt "An adventure I've been on recently is . . . " and interface 1680 of FIG. 16J depicts a sharing phase for a second prompt "My favorite tradition is . . . " Once the "end game" button is clicked, an end-game readout screen 1685 shown in FIG. 16K may be generated and presented to the host user.

Additional User Interfaces

Figure 18:
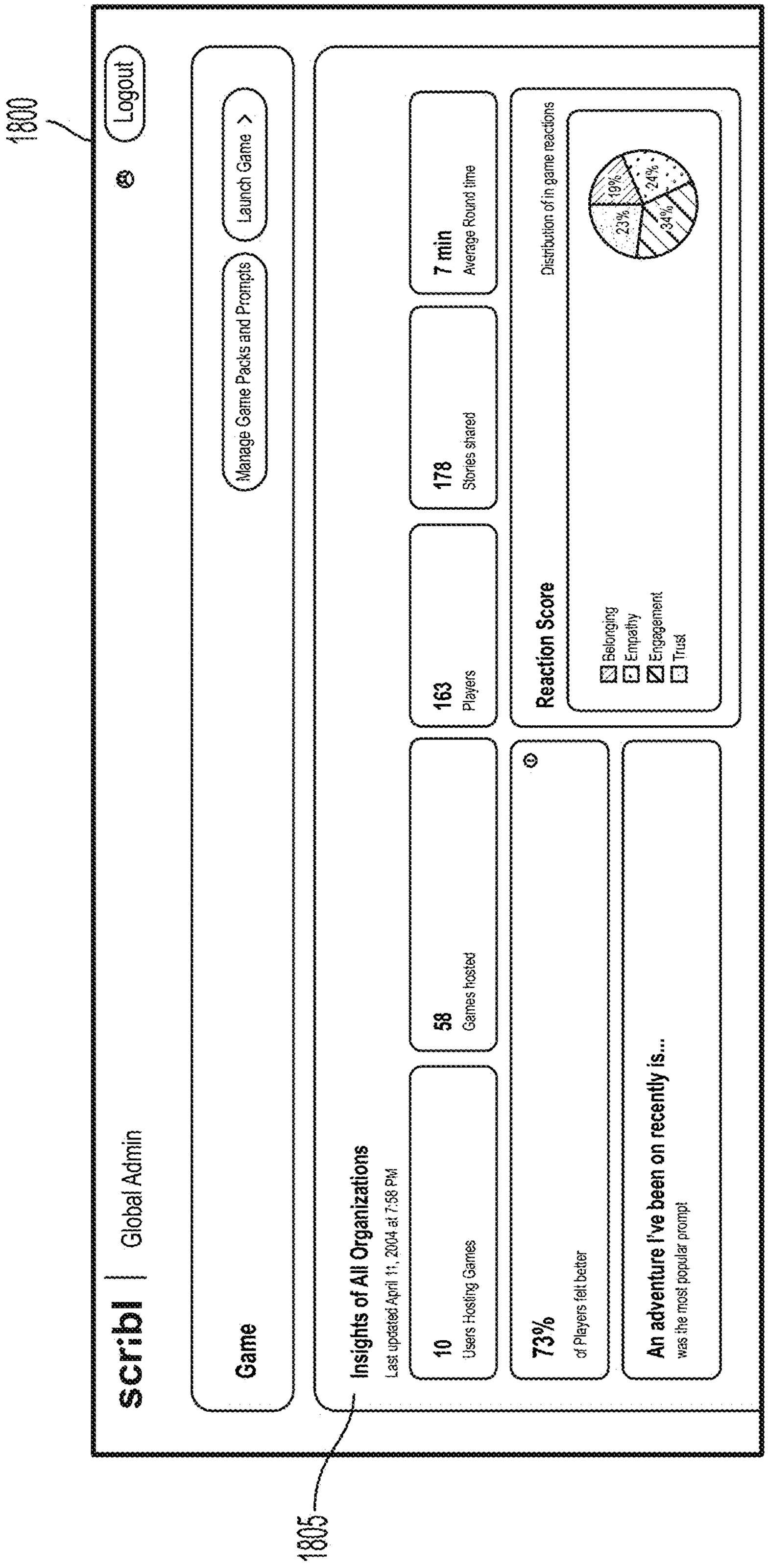
FIGS. 18 and 19 are screenshots of user interfaces presented after a global admin logs into the collaborative platform of FIG. 2, in accordance with some embodiments of the technology described herein.
Figure 19:
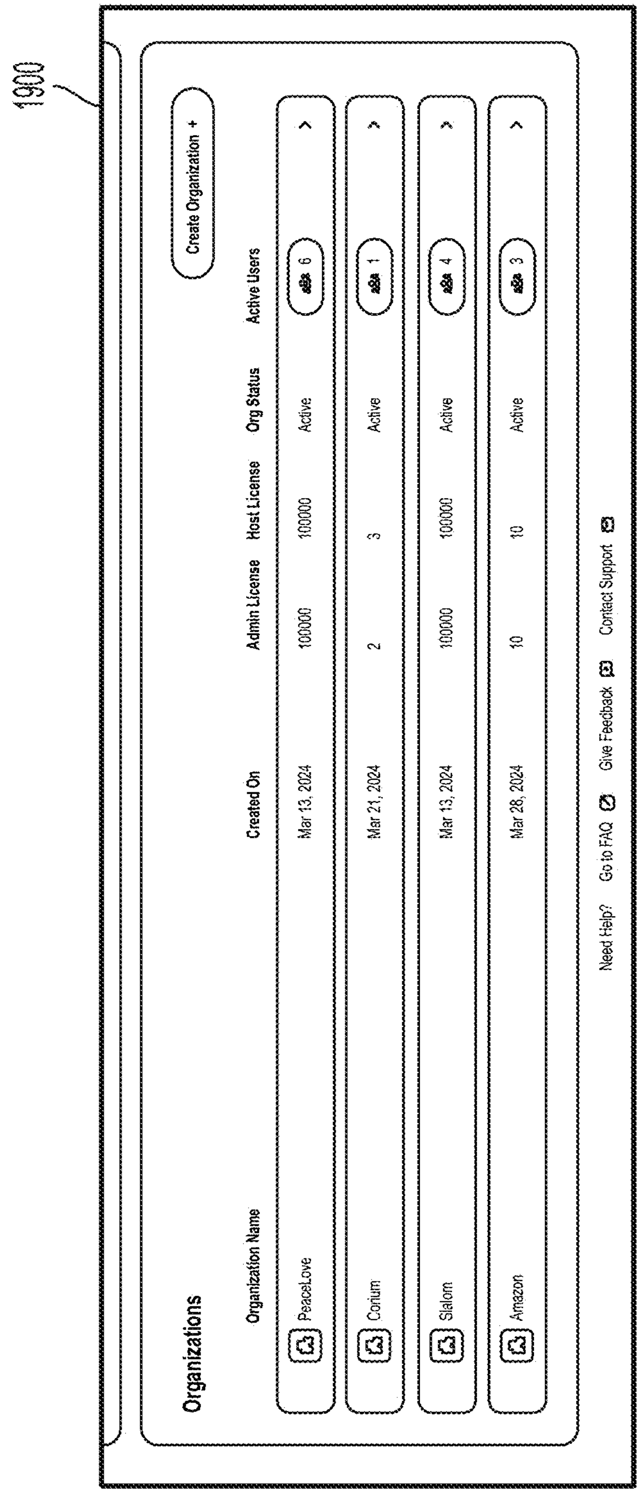

A launch screen appears to all users after logging in, examples of which are shown as FIGS. 18 and 19. In some embodiments, FIGS. 18 and 19 may be a combined screen, with FIG. 18 on the top and FIG. 19 on the bottom. In some embodiments, permissions for the launch screen change depending on one's level of access/permission.

Global Admin can perform one or more of the following tasks: launch a game; customize game decks and prompts; view the insights dashboard for all organizations; add, manage, and delete organizations, corporate admins, and hosts; access the help menu (e.g., FAQs, Give Feedback, Contact Support). A combined screen with screen 1800 on the top and screen 1900 on the bottom may illustrate an example launch screen presented to a global admin. The combined screen includes an insights dashboard 1805 including insights such as, number of host users hosting games across various organizations, number of games hosted across various organizations, number of participants/player across various organizations, number of stores shared across various organizations, an average amount of time a round of a game took, a percentage of participants who felt better after playing a game, a most popular game prompt across various organizations, a distribution of in-game reactions for games played across various organizations.

Corporate Admin can perform one or more of the following tasks: launch a game; view the insights dashboard for their organization; add, manage, and delete admins/hosts for their organization; access the help menu (e.g., FAQs, Give Feedback, Contact Support)

Host User can perform one or more of the following: launch a game; view the insights dashboard for only games they have run; access the help menu (e.g., FAQs, Give Feedback, Contact Support)

Figure 20:
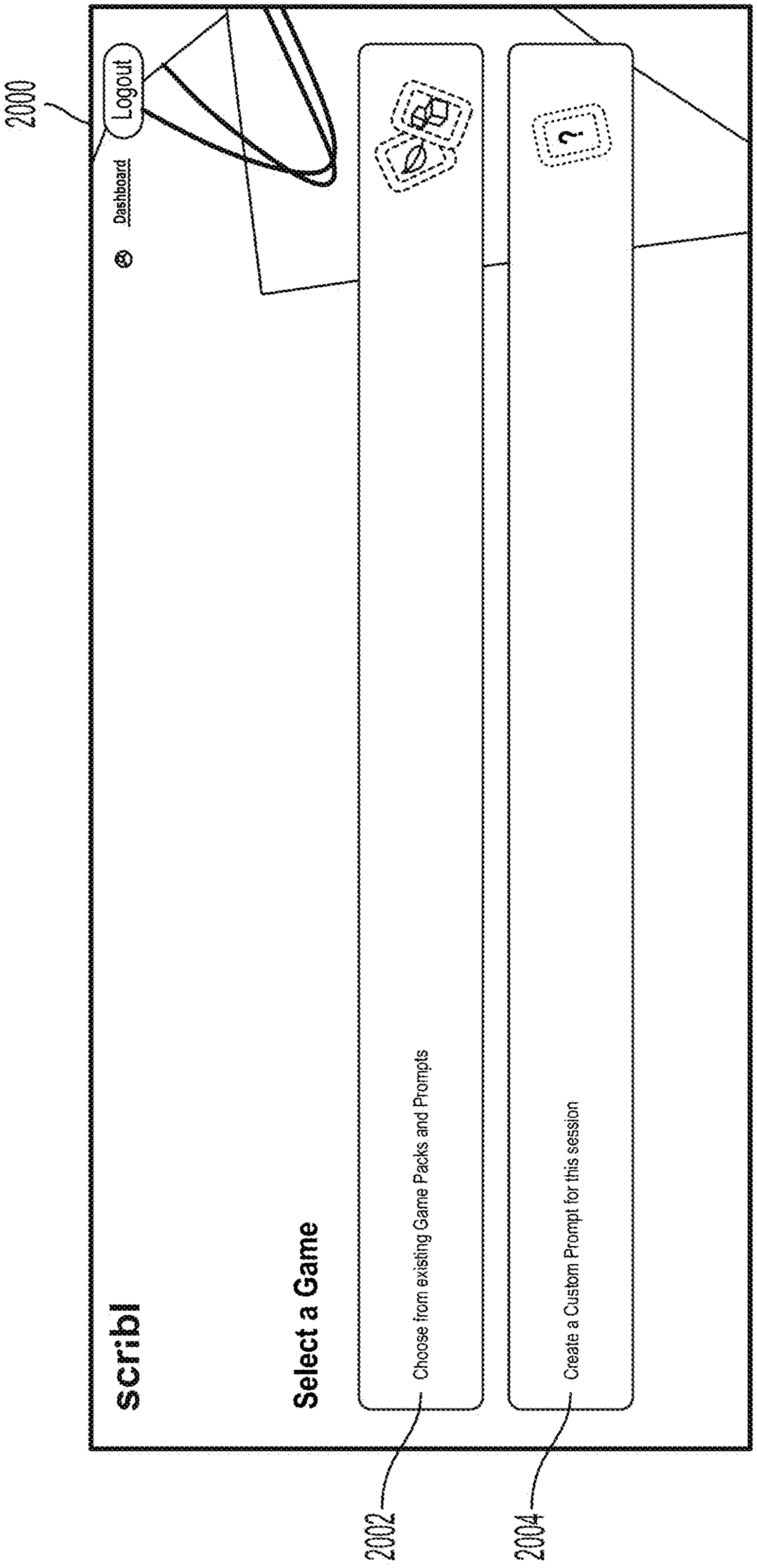
FIGS. 20, 21, and 22 are screenshots of example user interfaces through which users of the collaborative platform can launch a collaborative game session, in accordance with some embodiments of the technology described herein.
Figure 21:
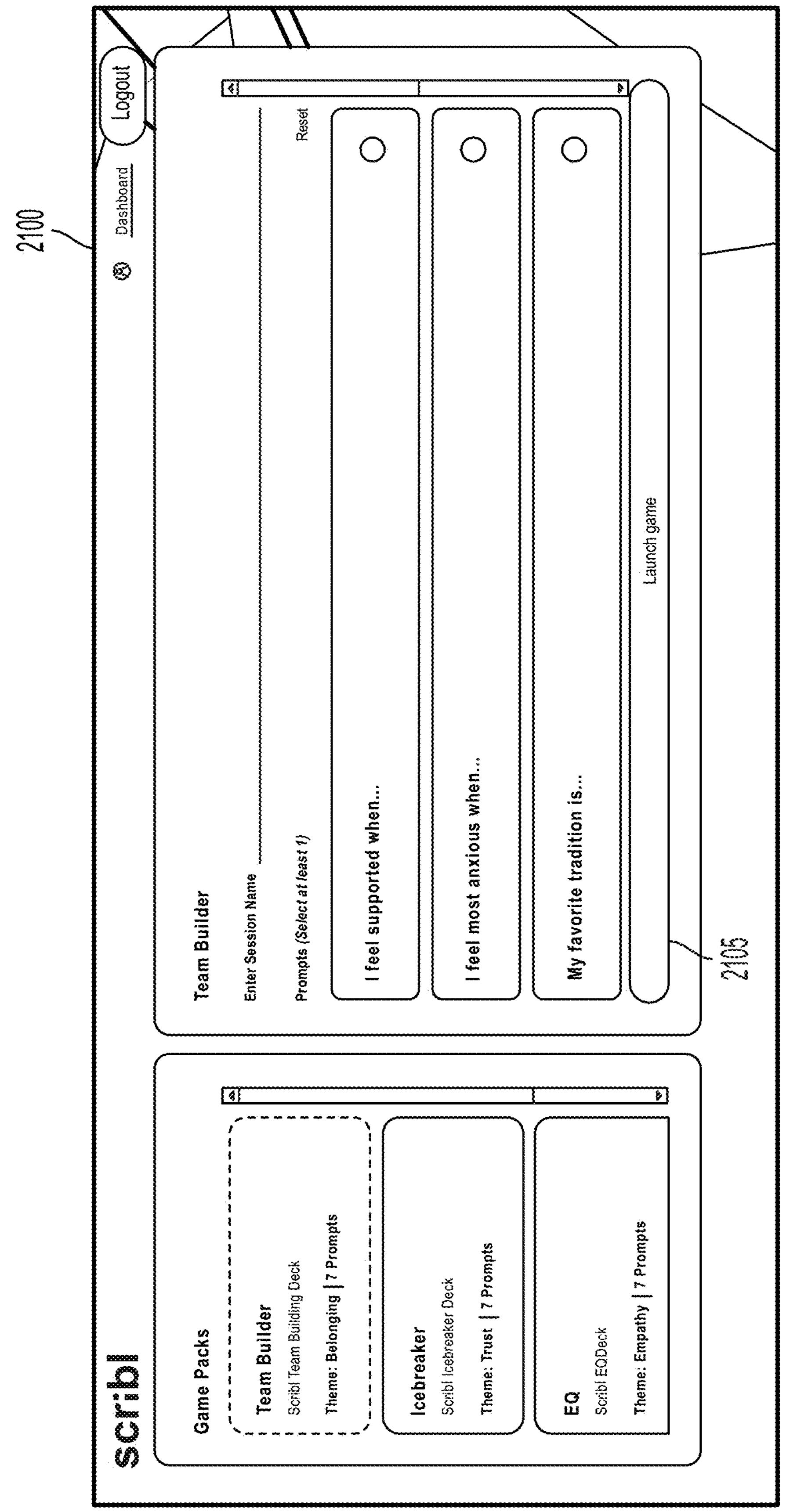

In some embodiments, a game may be launched using an existing game pack and prompt by clicking option 2002 in interface 2000 of FIG. 20. In these embodiments, game packs and prompts may be available based on an individual organization's permissions which may be set by a global admin. For example, FIG. 21 shows an interface 2100 where existing game packs and prompts are presented for selection.

Figure 22:
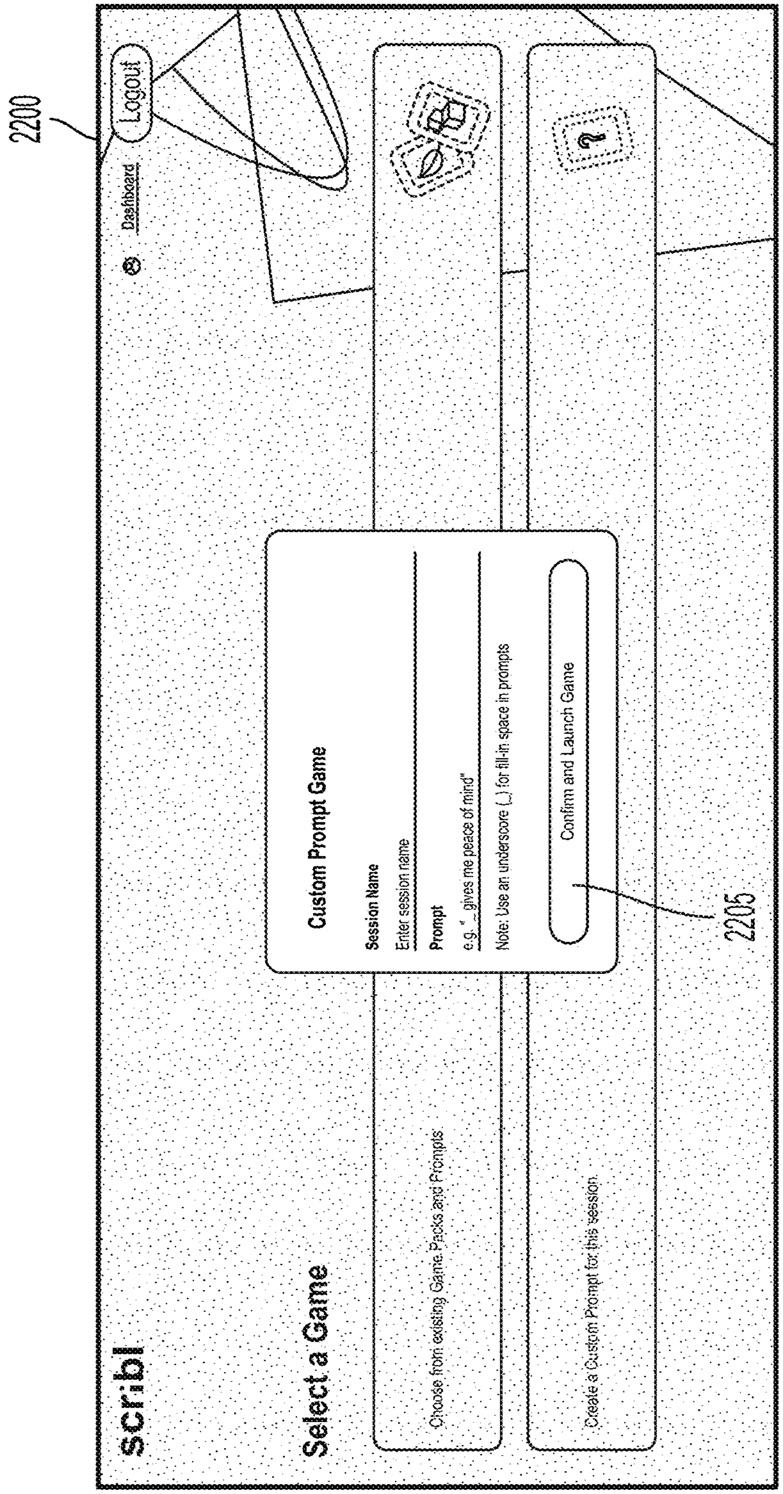
Figure 23:
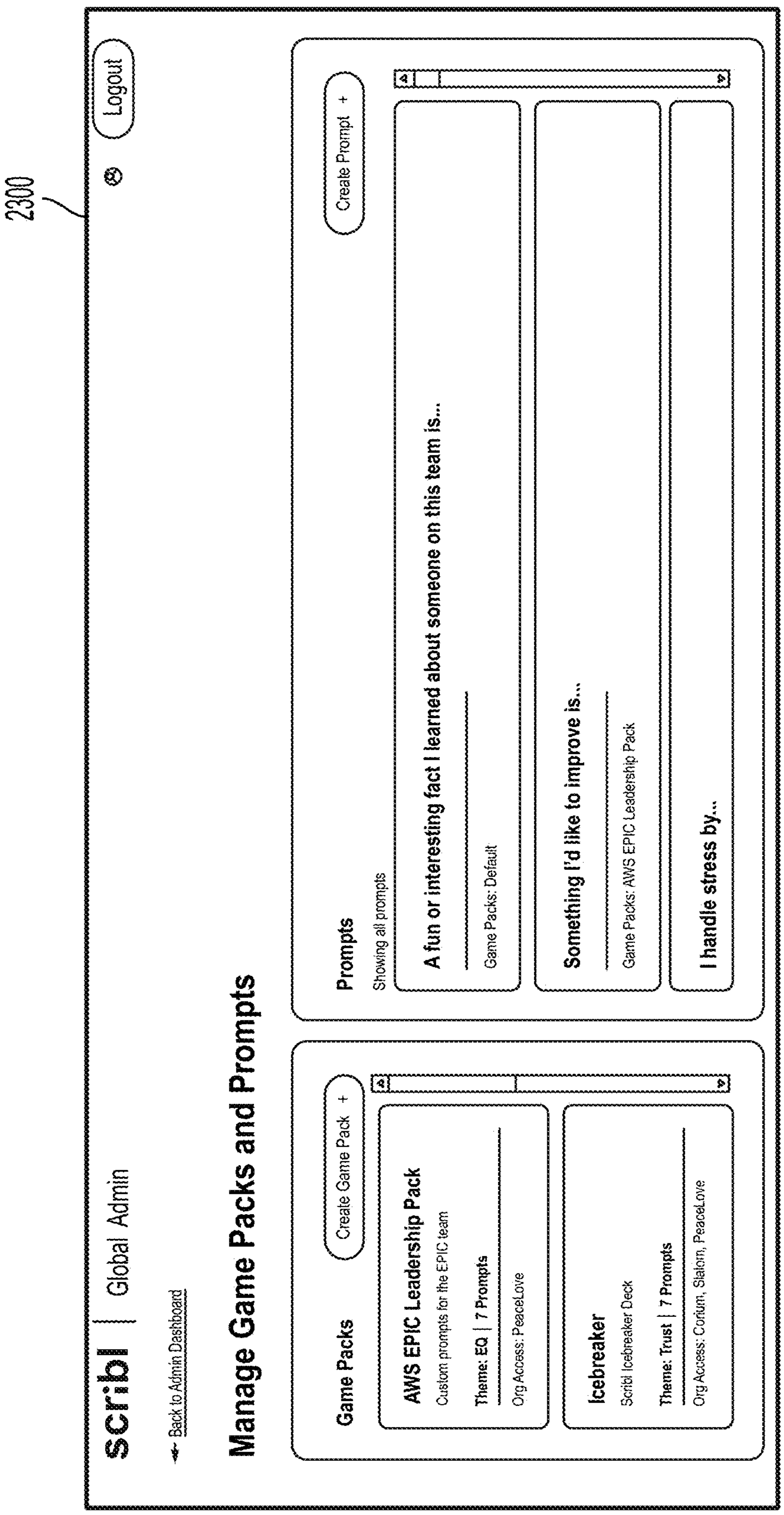
FIGS. 23, 24, 25, 26, and 27 are screenshots of example user interfaces through which global admins can manage prompts, game packs, and permissions for game pack, in accordance with some embodiments of the technology described herein.
Figure 24:
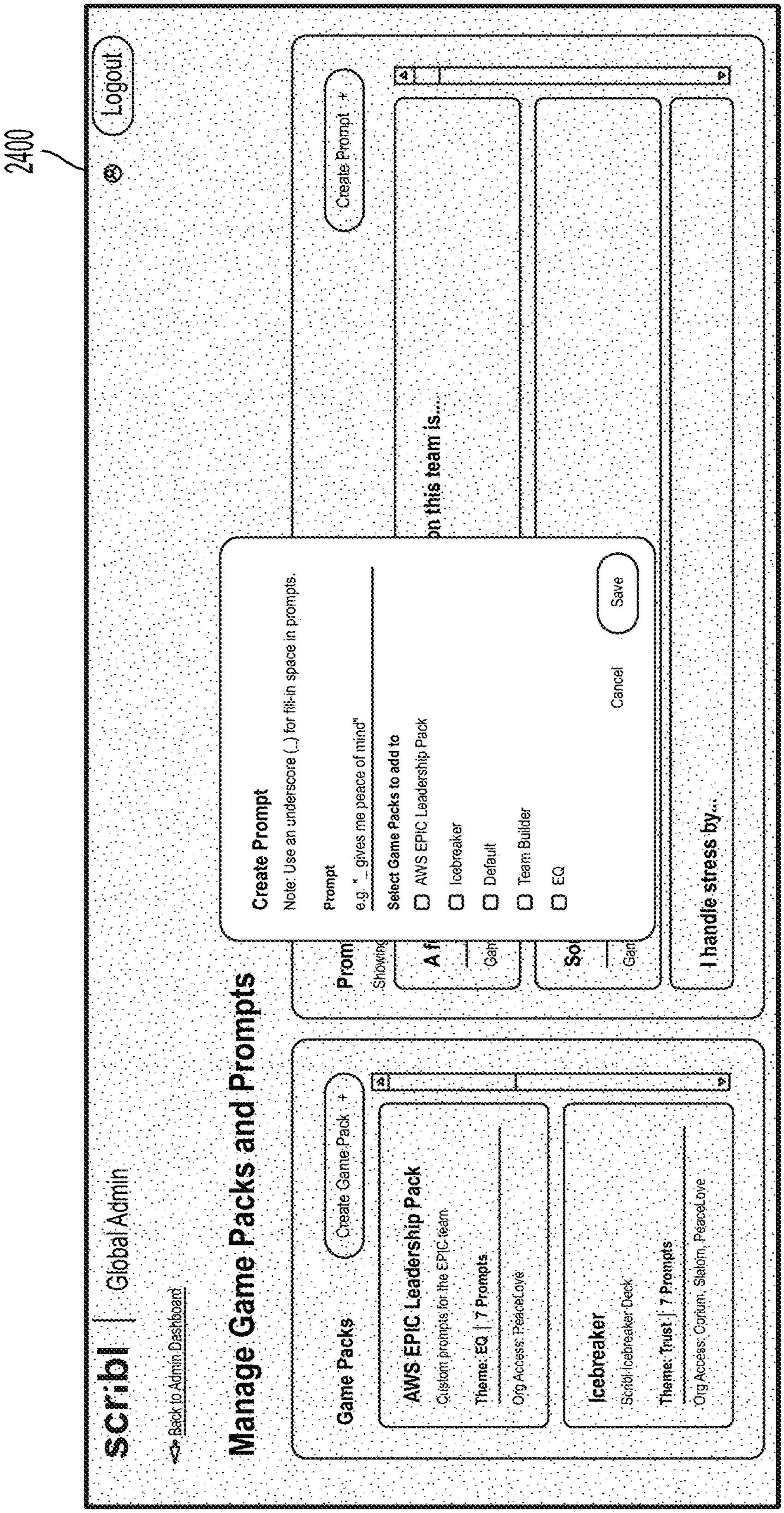
Figure 25:
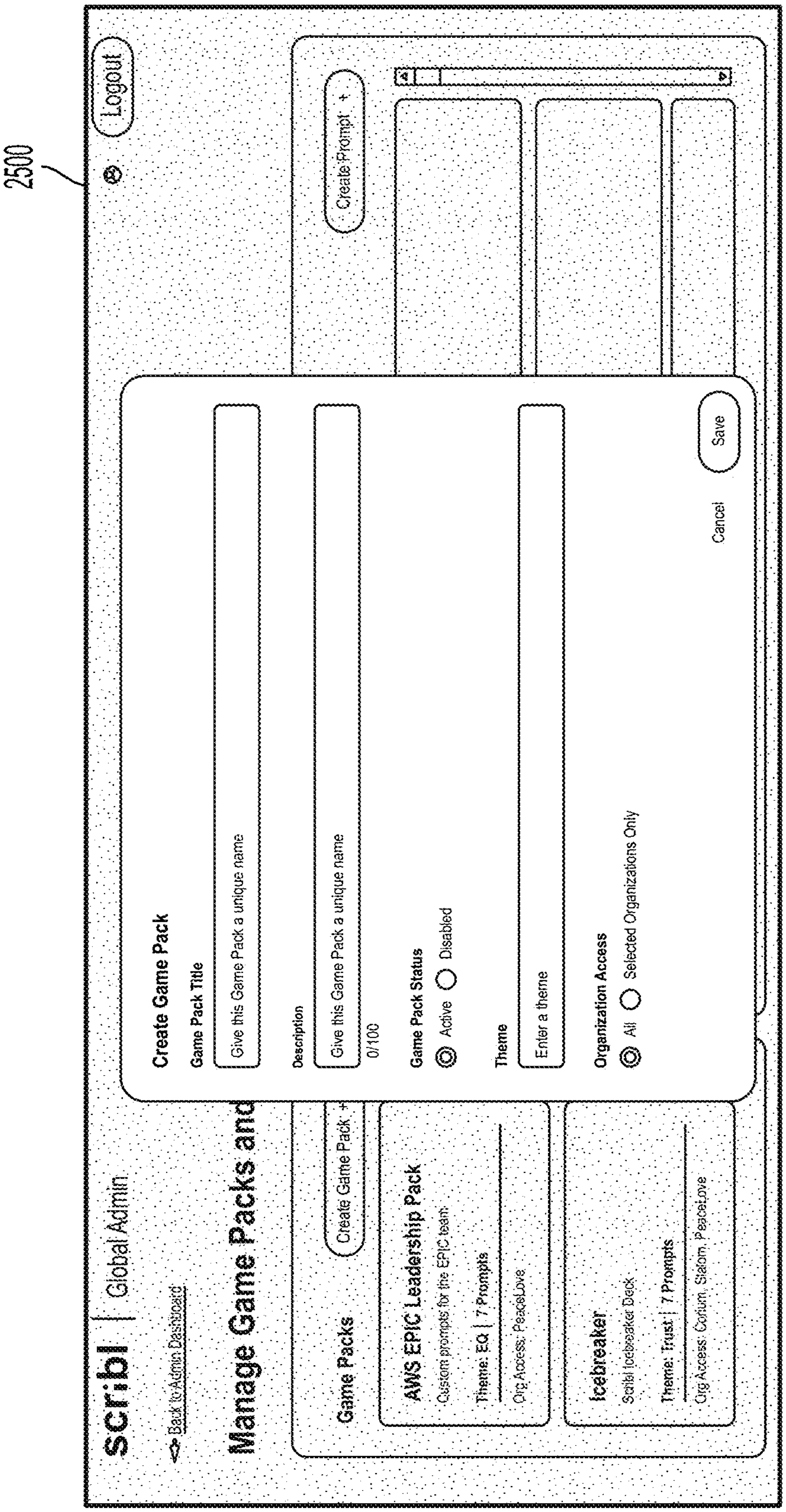
Figure 26:
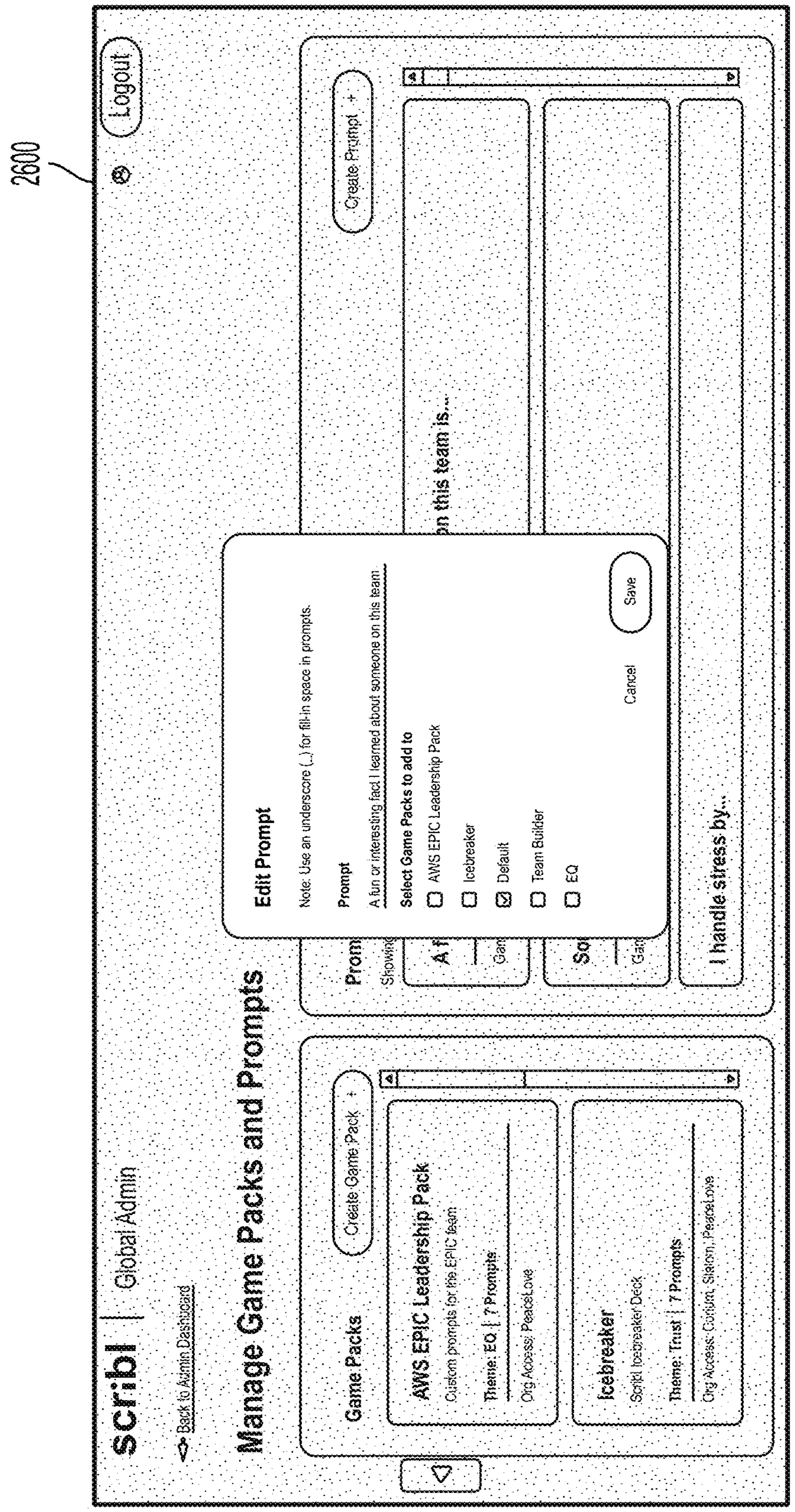
Figure 27:
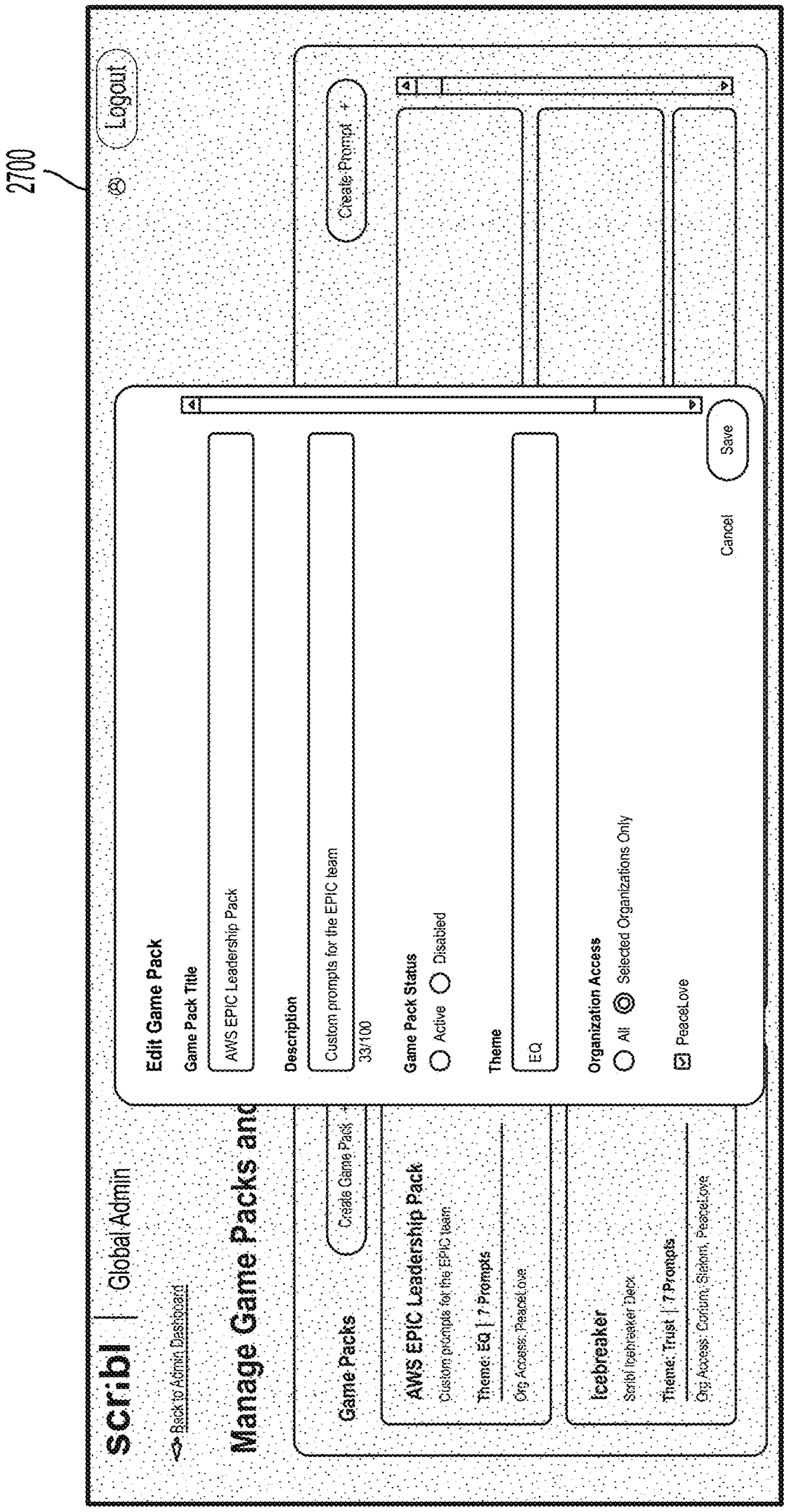

In some embodiments, a game may be launched using a custom prompt by clicking option 2004 in interface 2000 of FIG. 20. This may allow for creation of a single prompt, which may be used once for one round of a game and then discarded once the game ends. For example, FIG. 22 shows an interface 2200 where a custom prompt may be created. A game may be launched by clicking the "Launch Game" button 2105 in interface 2100 or the "Confirm and Launch Game" button 2205 in interface 2200.

In some embodiments, interfaces 2300, 2400, 2500, 2600, 2700 shown in FIGS. 23, 24, 25, 26, and 27 may allow global admins to create, edit, or delete prompts; create, edit, or delete game packs; organize prompts into game packs; and/or manage permissions for game packs by organization (e.g., a custom pack made for Amazon may be permitted for use by another organization).

Figure 28:
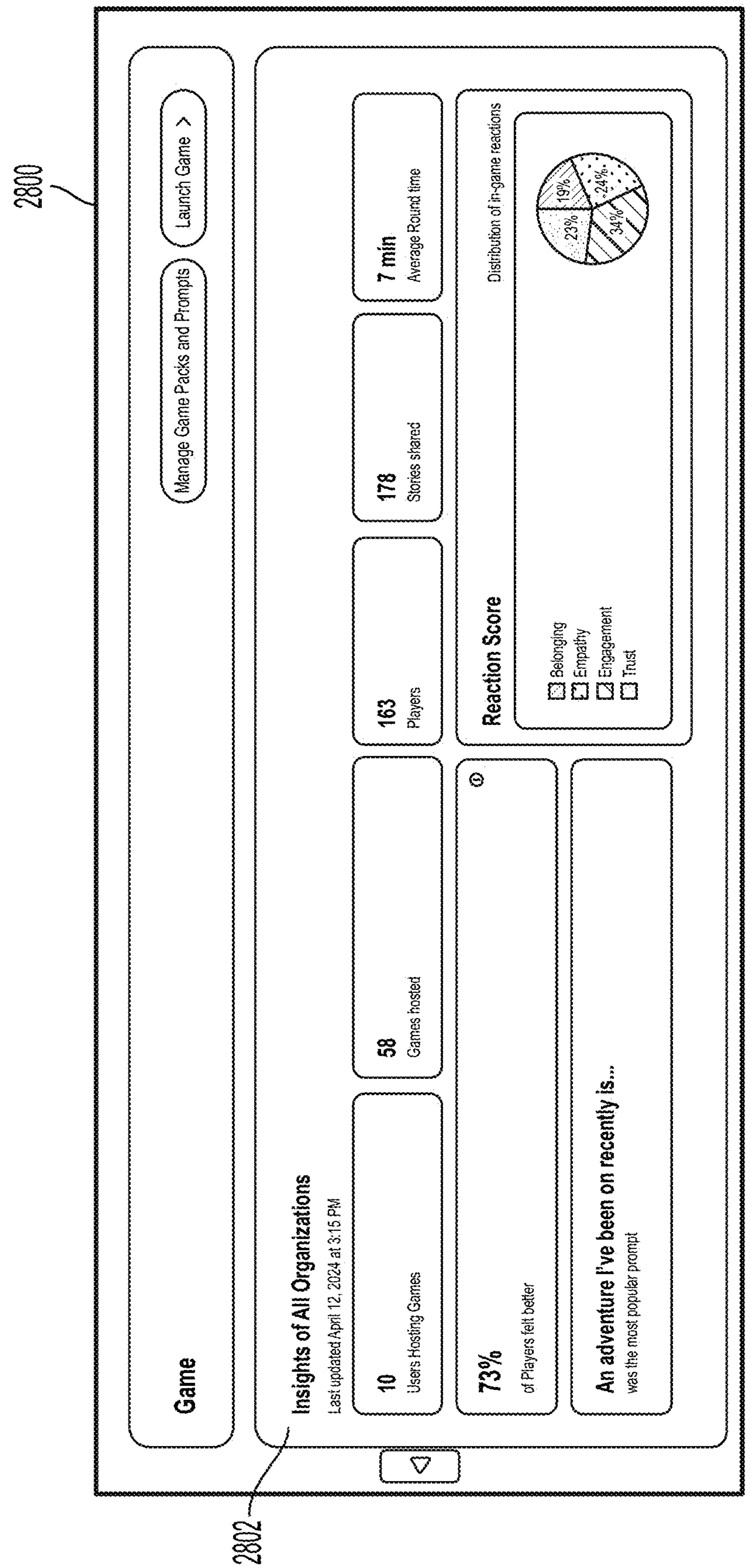
FIGS. 28 and 29 are screenshots of example user interfaces with insights dashboards, in accordance with some embodiments of the technology described herein.
Figure 29:
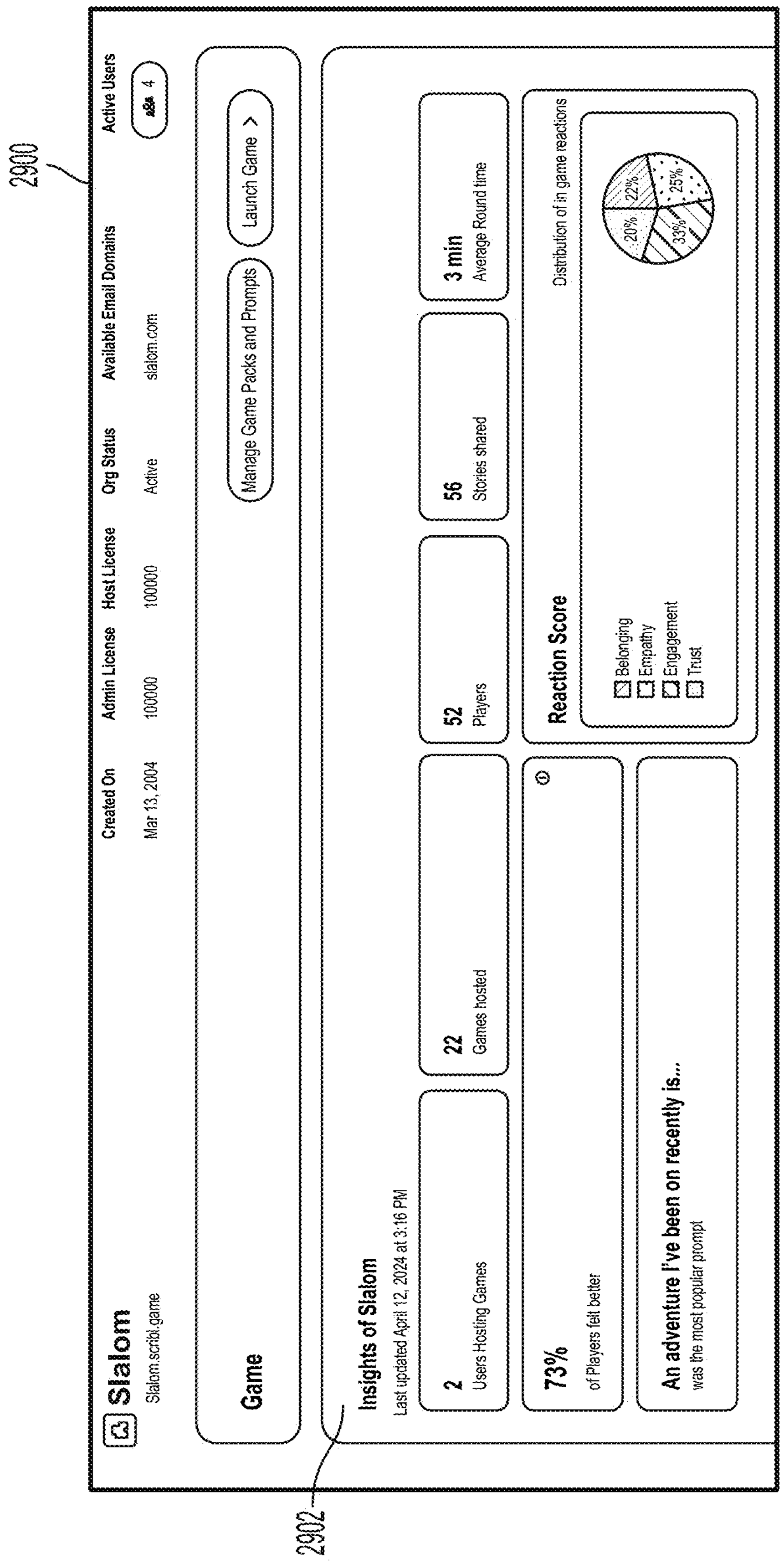
Figure 30:
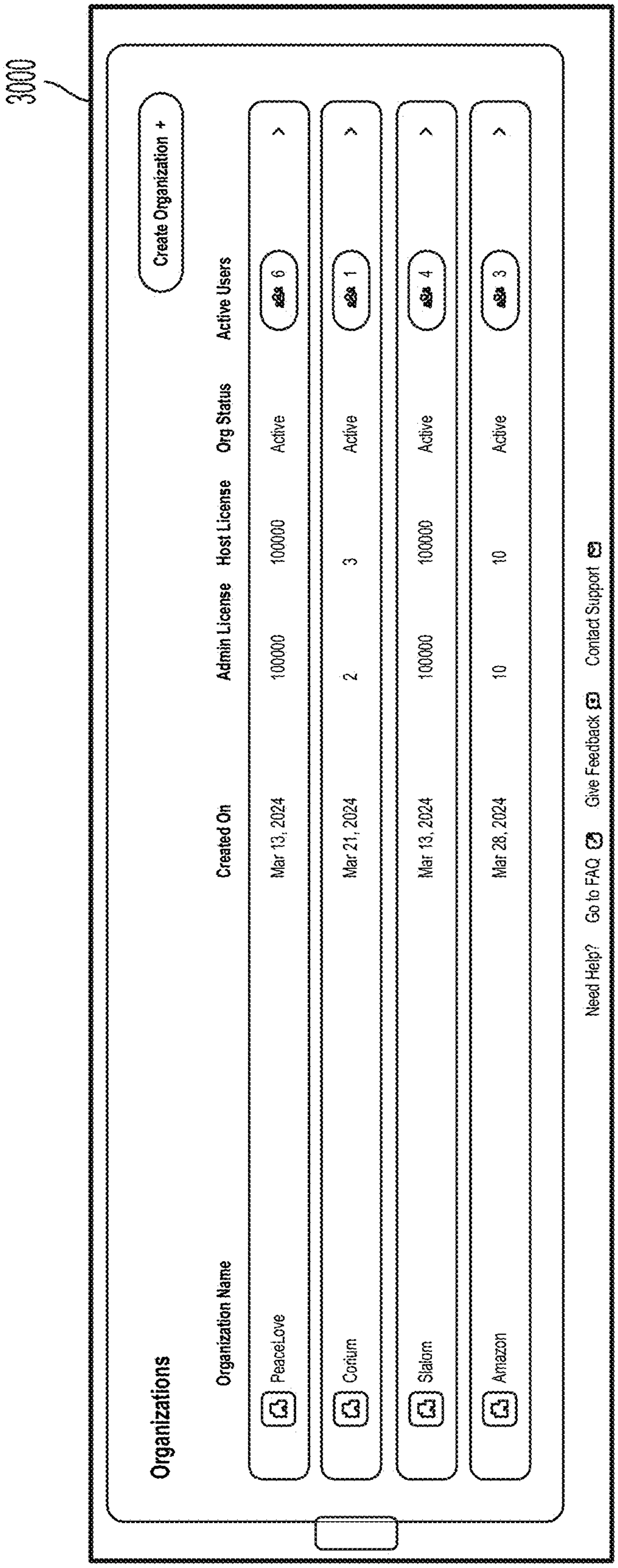
FIGS. 30, 31, 32, 33, and 34 are screenshots of example user interfaces through which admins can manage users, in accordance with some embodiments of the technology described herein.
Figure 31:
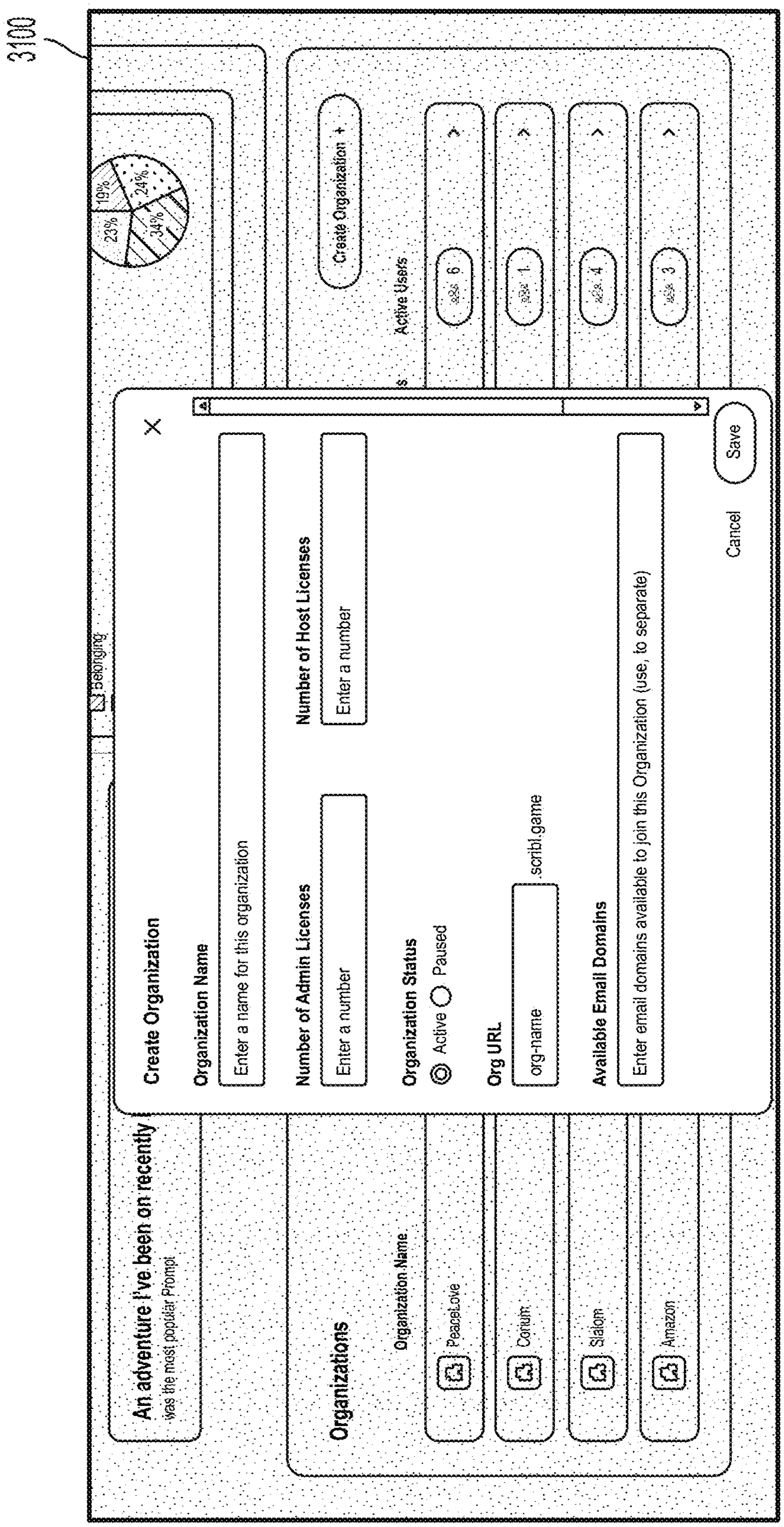
Figure 32:
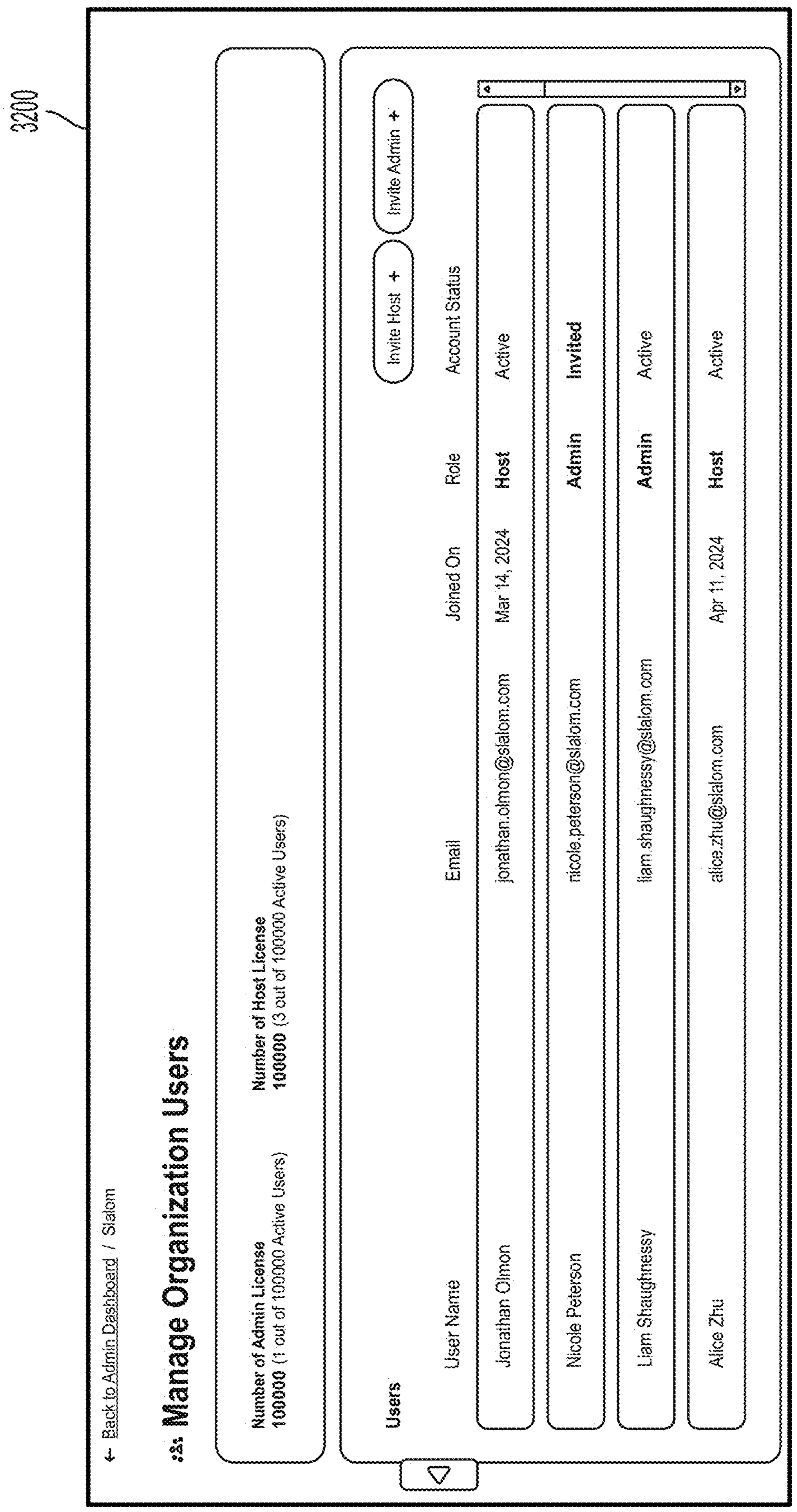
Figure 33:
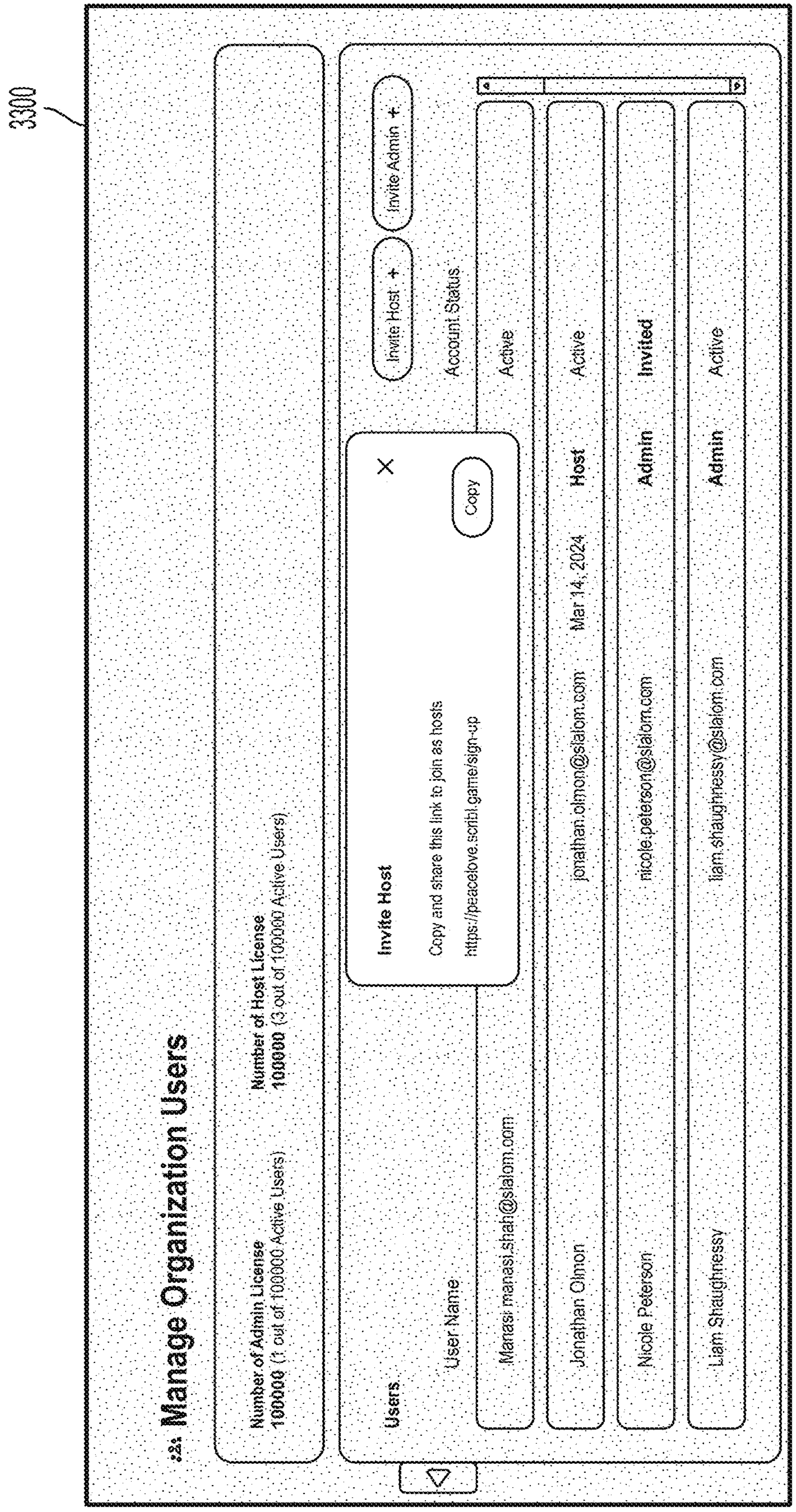
Figure 34:
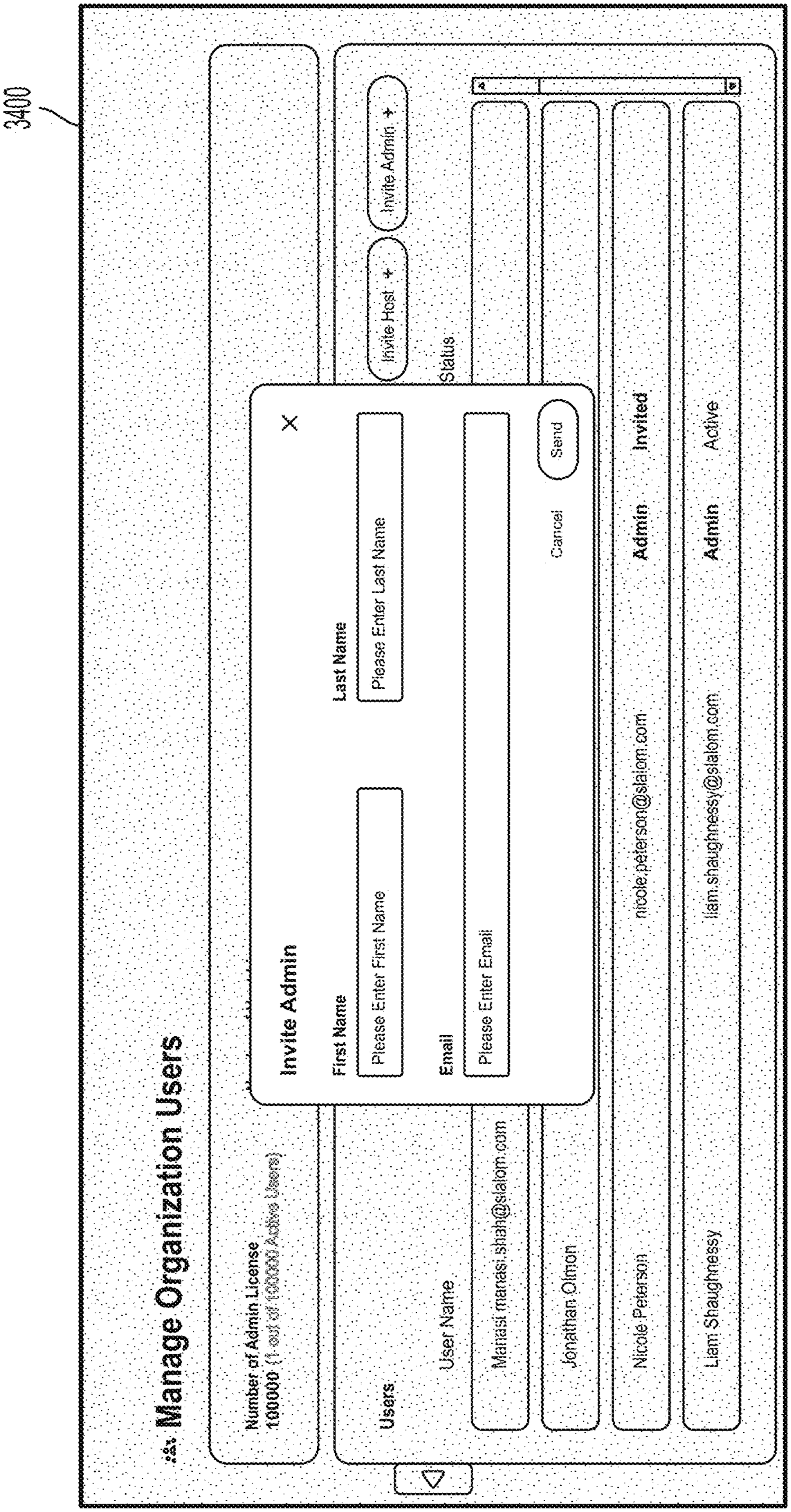

In some embodiments, users can view data in the insights dashboard based on their level of permission. Examples of insights dashboards 2802 and 2902 as part of interfaces 2800 and 2900 are shown in FIGS. 28 and 29. The insights dashboard may include the following information: a number of users hosting games; a number of games hosted; a total number of participants, a total number of stories shared; average game round time; percentage of participants who felt better after playing; the most popular prompt chosen; and/or a reaction score associated with the in-game reactions. In some embodiments, the percentage of players who felt better after playing may be calculated using the pre-sentiment and post-sentiment scores, although other techniques to calculate the percentage may be used as the technology is not limited in this respect. In some embodiments, the reaction score may be calculated based on a simple count of in-game reactions, although other techniques to calculate the reaction score may be used as the technology is not limited in this respect. Another example of an insights dashboard is shown in interface 4700 of FIG. 47.

In some embodiments, global and/or corporate admins may utilize the interfaces 3000, 3100, 3200, 3300, and 3400 shown in FIGS. 30, 31, 32, 33, and 34 to manage users based on their level of permission. For example, global admins may have permission to add an organization (e.g., via user interfaces 3000 and 3100), view insights dashboard of any organization, and add, edit or delete admins and hosts from any organization (e.g., via user interfaces 3200, 3300, and 3400), and corporate admins may have permission to view the insights dashboard of their organization, and add, edit or delete host users from their organization.

Figure 35:
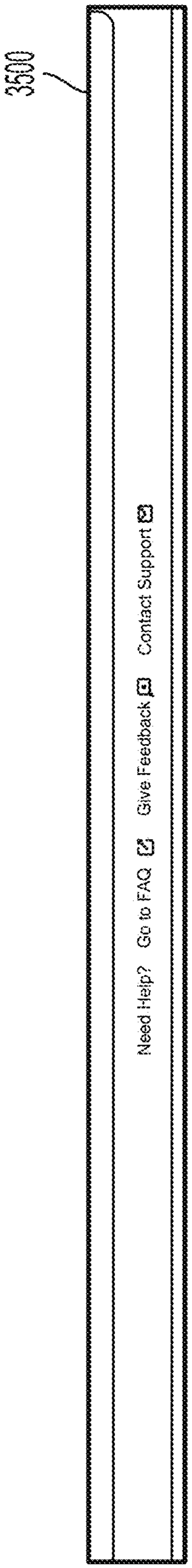
FIG. 35 is a screenshot of an example help menu, in accordance with some embodiments of the technology described herein.
Figure 36:
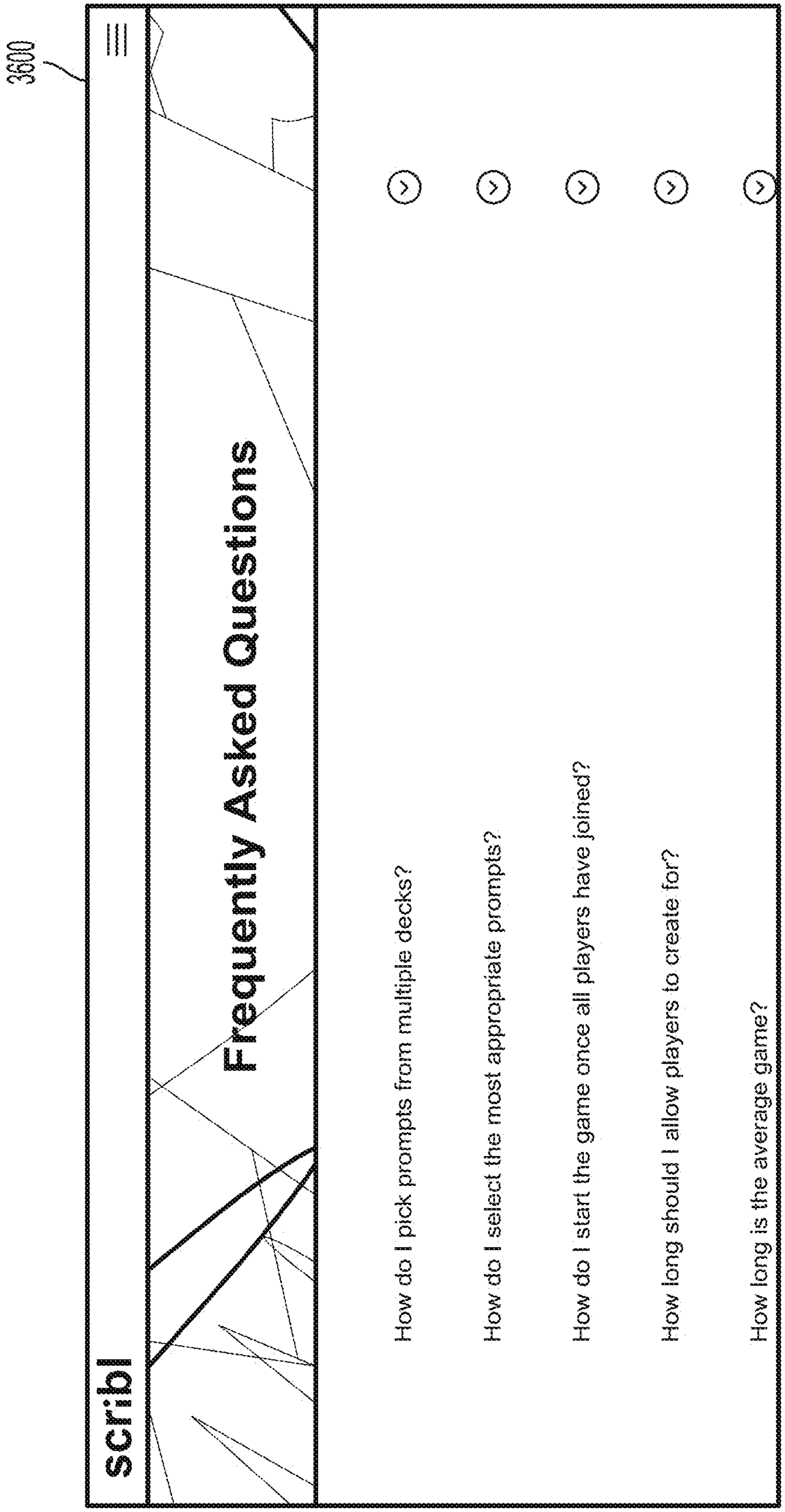
FIG. 36 is a screenshot of an example FAQ interface, in accordance with some embodiments of the technology described herein.
Figure 37:
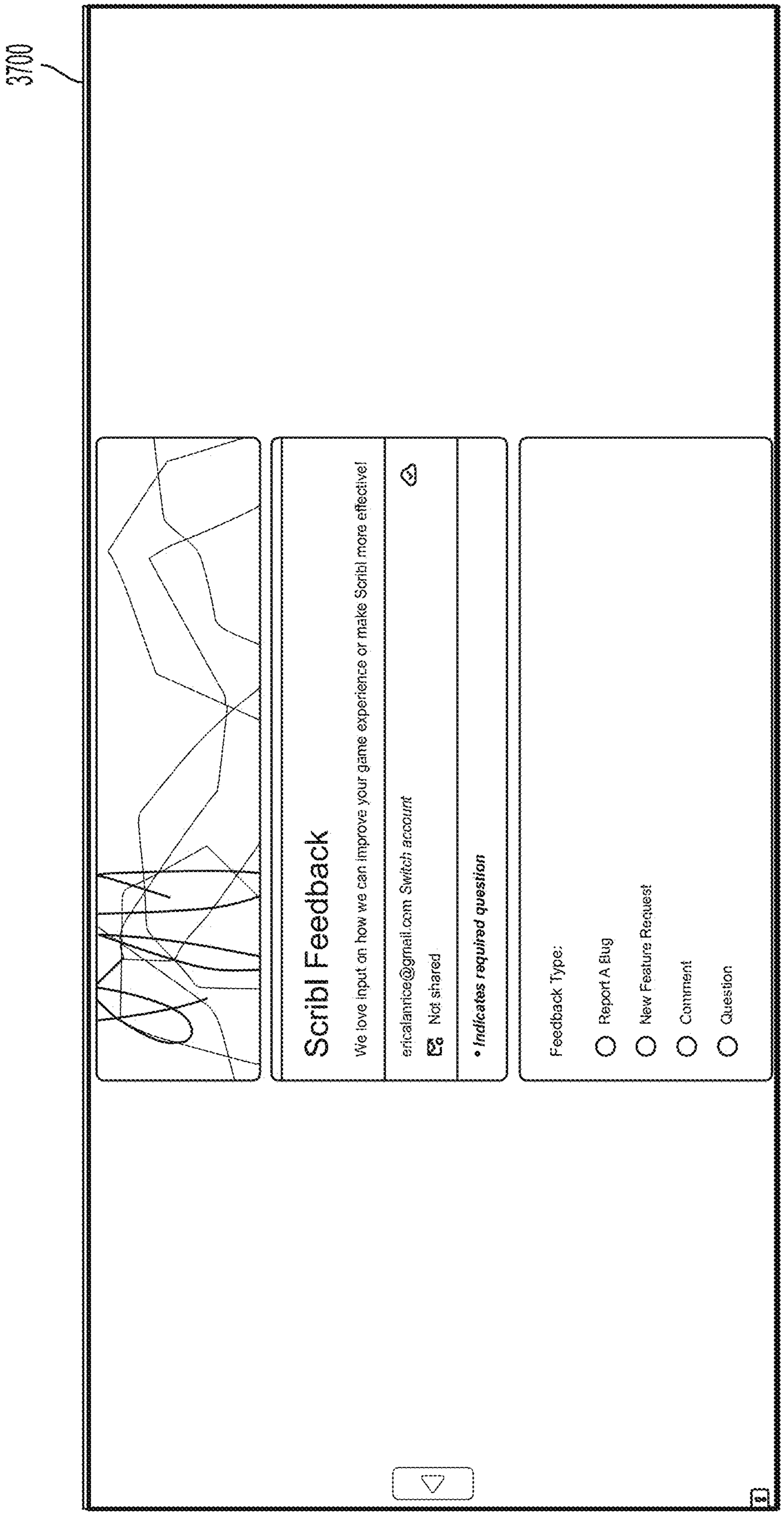
FIG. 37 is a screenshot of an example feedback interface, in accordance with some embodiments of the technology described herein.
Figure 38A:
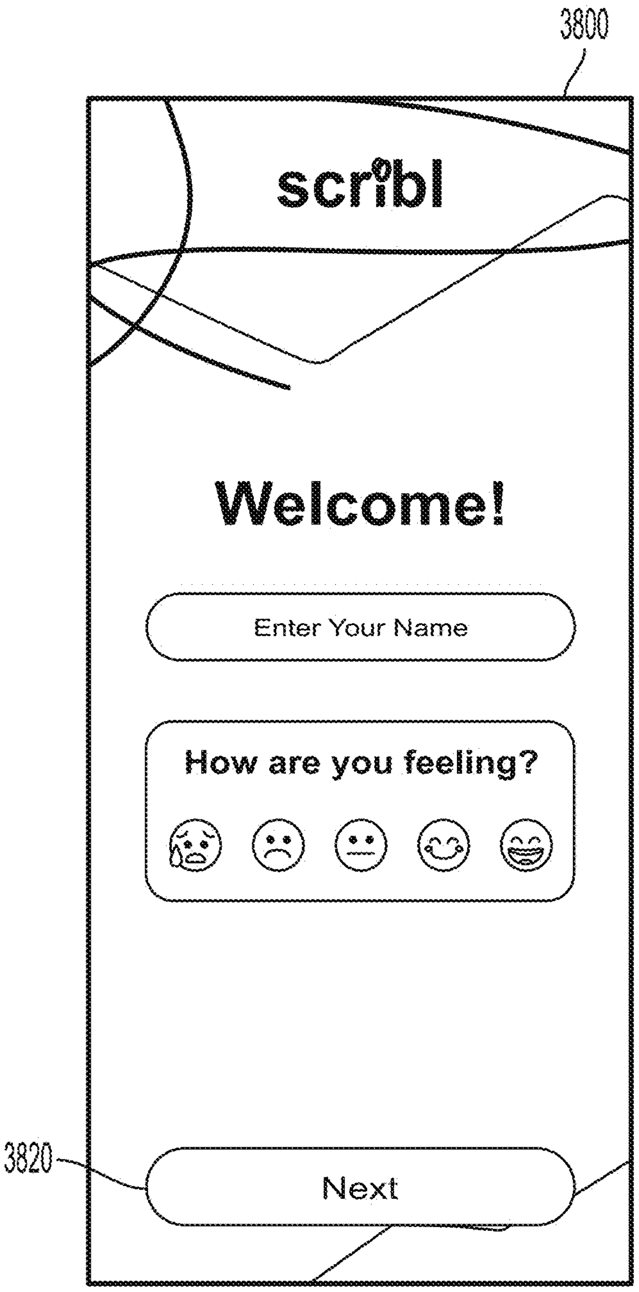
FIGS. 38A-38B are screenshots of example user interfaces for pre-sentiment collection, in accordance with some embodiments of the technology described herein.
Figure 38B:

In some embodiments, help menu 3500 shown in FIG. 35 may be available to all users and may provide links to a webpage including frequently asked questions (FAQs), a feedback form, a webpage including contact support information (e.g., an email address). An example FAQ interface 3600 is shown in FIG. 36. An example portion of feedback form 3700 is shown in FIG. 37.

Figure 39A:
FIGS. 39A-39B are screenshots of example user interfaces for post-sentiment collection, in accordance with some embodiments of the technology described herein.
Figure 39B:
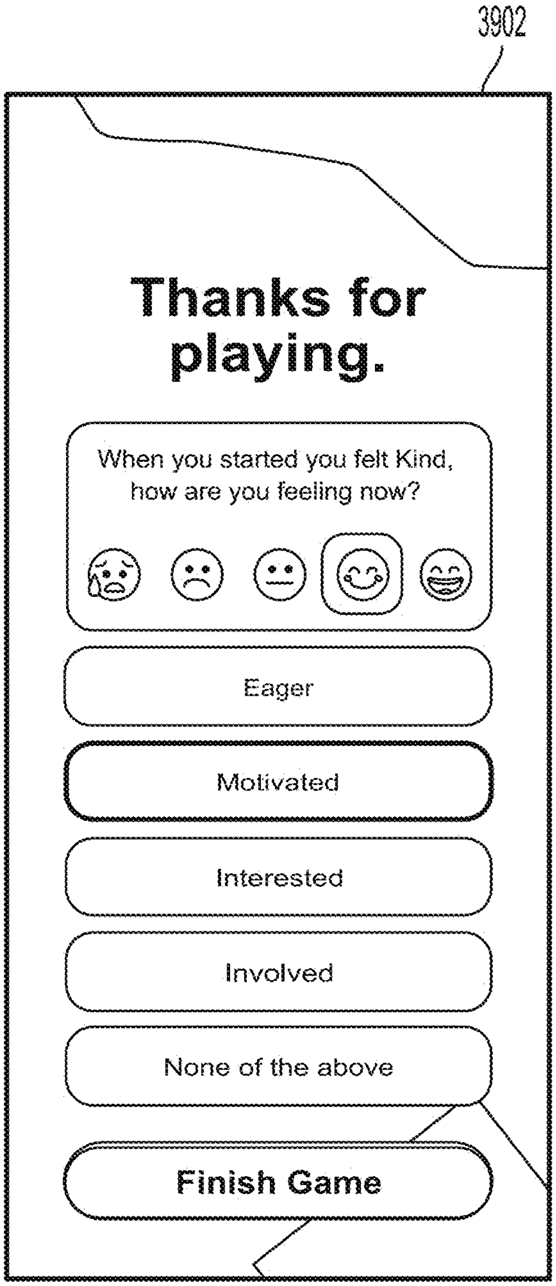
Figure 39C:
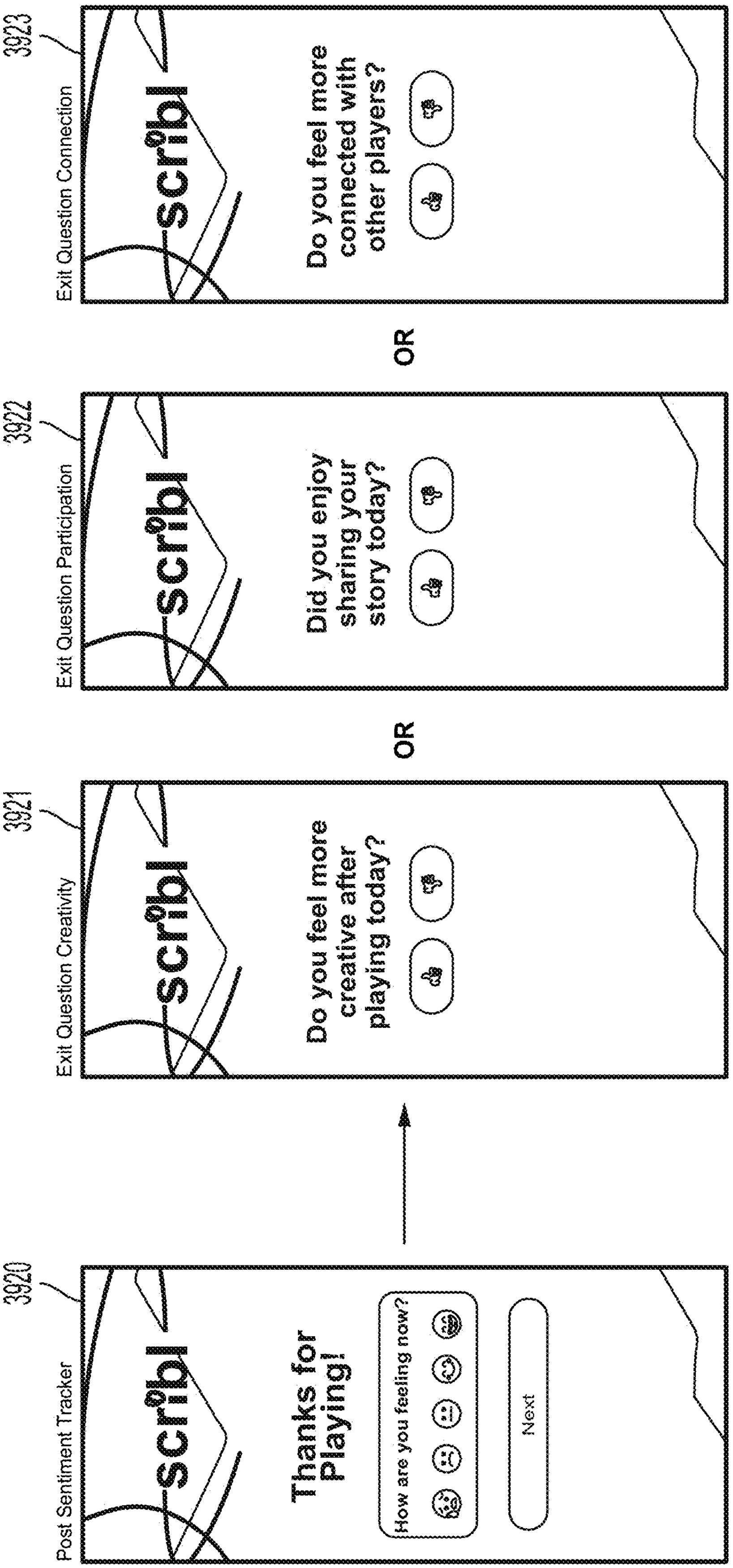
FIG. 39C illustrates example user interfaces for receiving input to exit questions, in accordance with some embodiments of the technology described herein.

In some embodiments, pre and post sentiment collection may be performed using interfaces 3800, 3802, 3900 and 3902 shown in FIGS. 38A, 38B, 39A and 39B. In some embodiments, participants may be prompted to input their pre-session sentiments by choosing one or more emojis in interface 3800. Clicking the next button 3820 causes interface 3802 to be presented where the participants may be prompted to choose one of the listed emotions (e.g., relaxed, optimistic, kind, etc.) or chose "none of the above". In some embodiments, participants may be prompted to input their post-session sentiments by choosing one or more emojis in interfaces 3900, 3902. As shown in FIG. 39B, the participants may be prompted to choose one of the listed emotions (e.g., eager, motivated, involved, etc.) or chose "none of the above".

In some embodiments, participants may be prompted to answer one or more additional questions or provide one or more additional inputs during the game. For example, following post-sentiment collection screen 3920, participants may be prompted to answer a randomized exit question (as shown in interfaces 3921, 3922, 3923 of FIG. 39C) where the participants can respond by clicking a thumbs up or thumbs down emoji. These additional data points may be analyzed and displayed on the dashboard.

Figure 40:
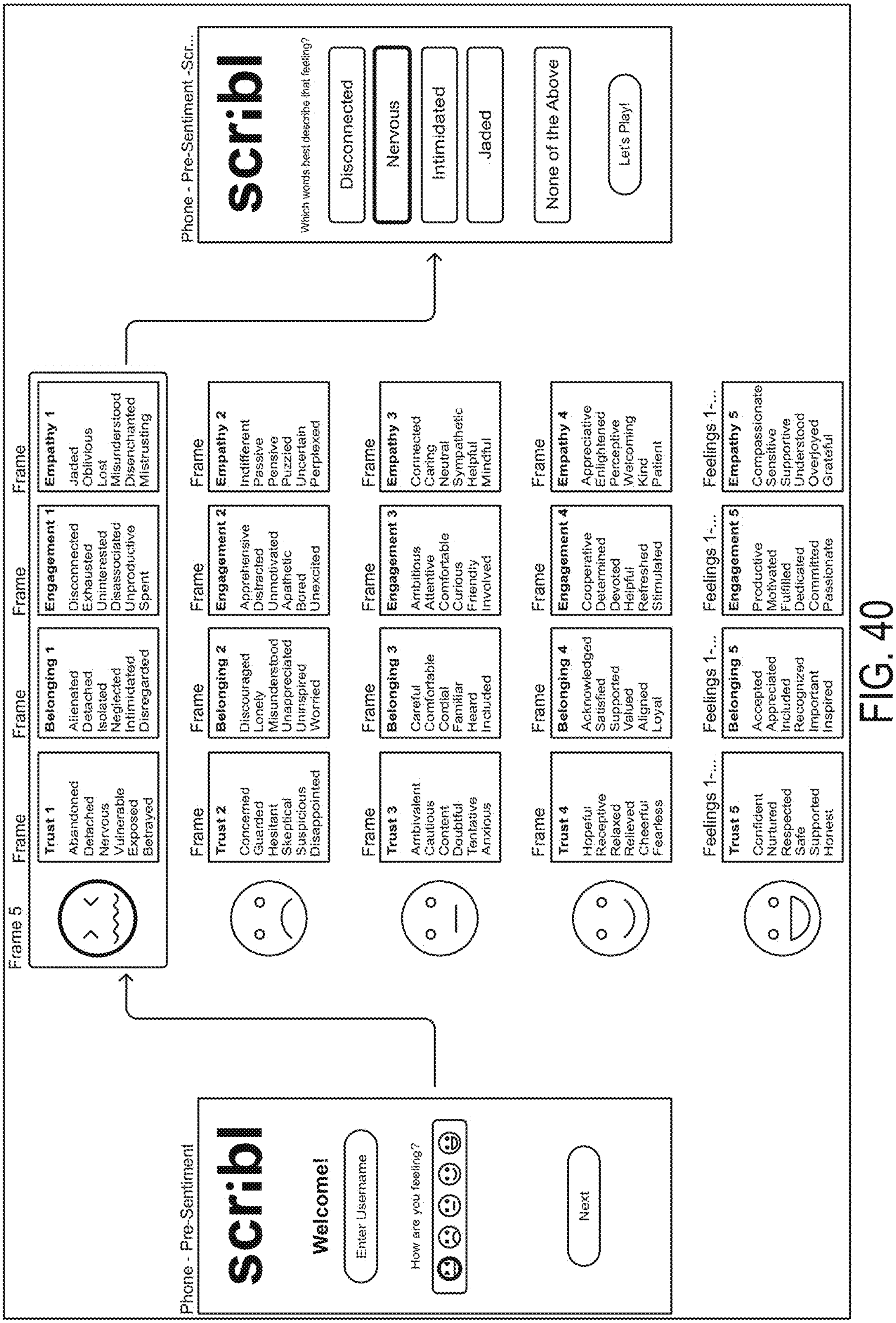
FIGS. 40 and 41 illustrate example emotions and categories, in accordance with some embodiments of the technology described herein.
Figure 41:
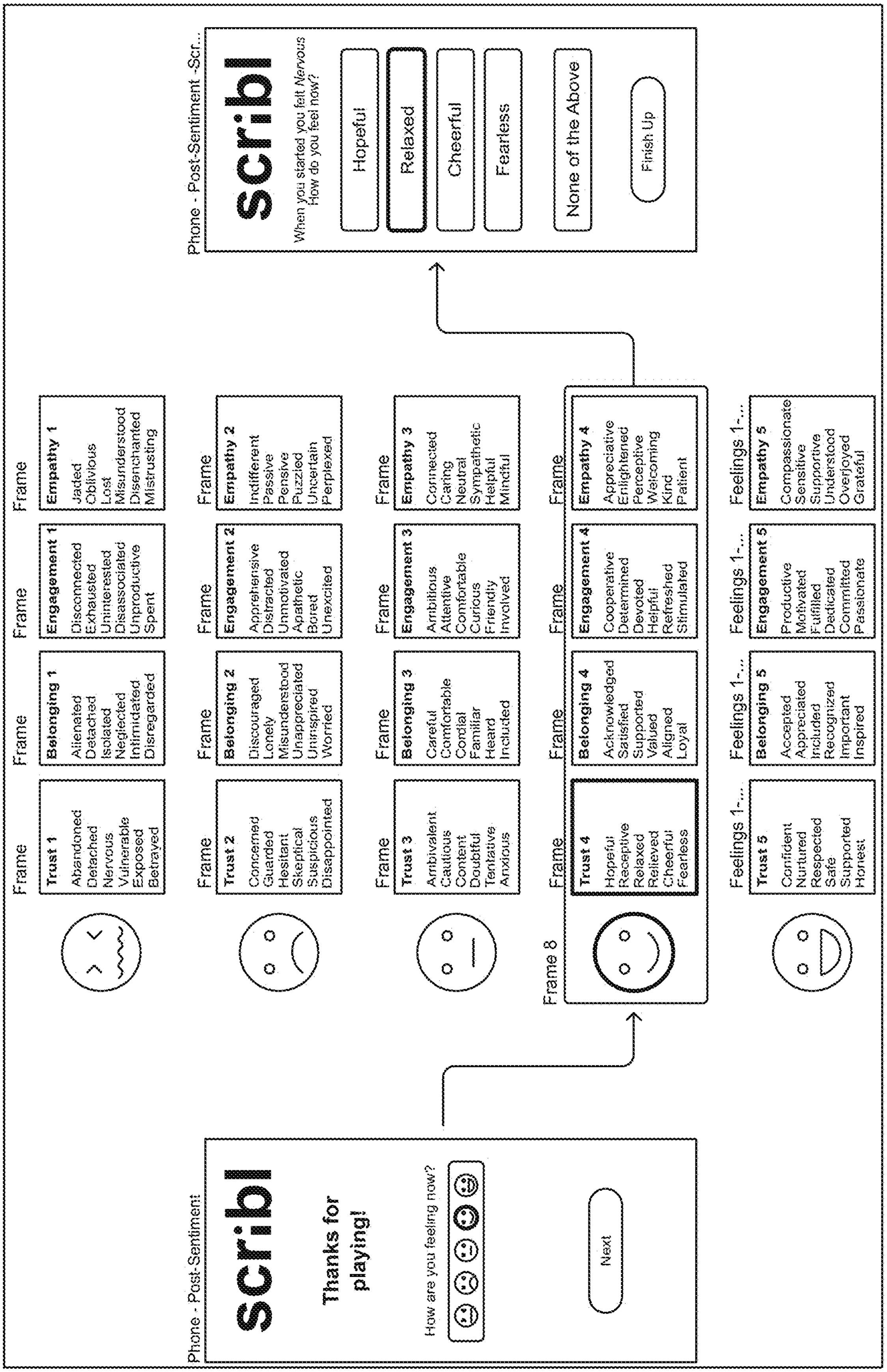

In some embodiments, the emotions presented in the interfaces 3802, 3902 may be chosen from a predetermined list that corresponds to emojis initially selected by the participant (e.g., emojis selected in interfaces 3800, 3900). The list may be broken down into multiple categories (for example, the same categories as in-game reactions). One emotion may be chosen from each of the categories. Example emotions and categories are shown in FIGS. 40 and 41.

Figure 42:
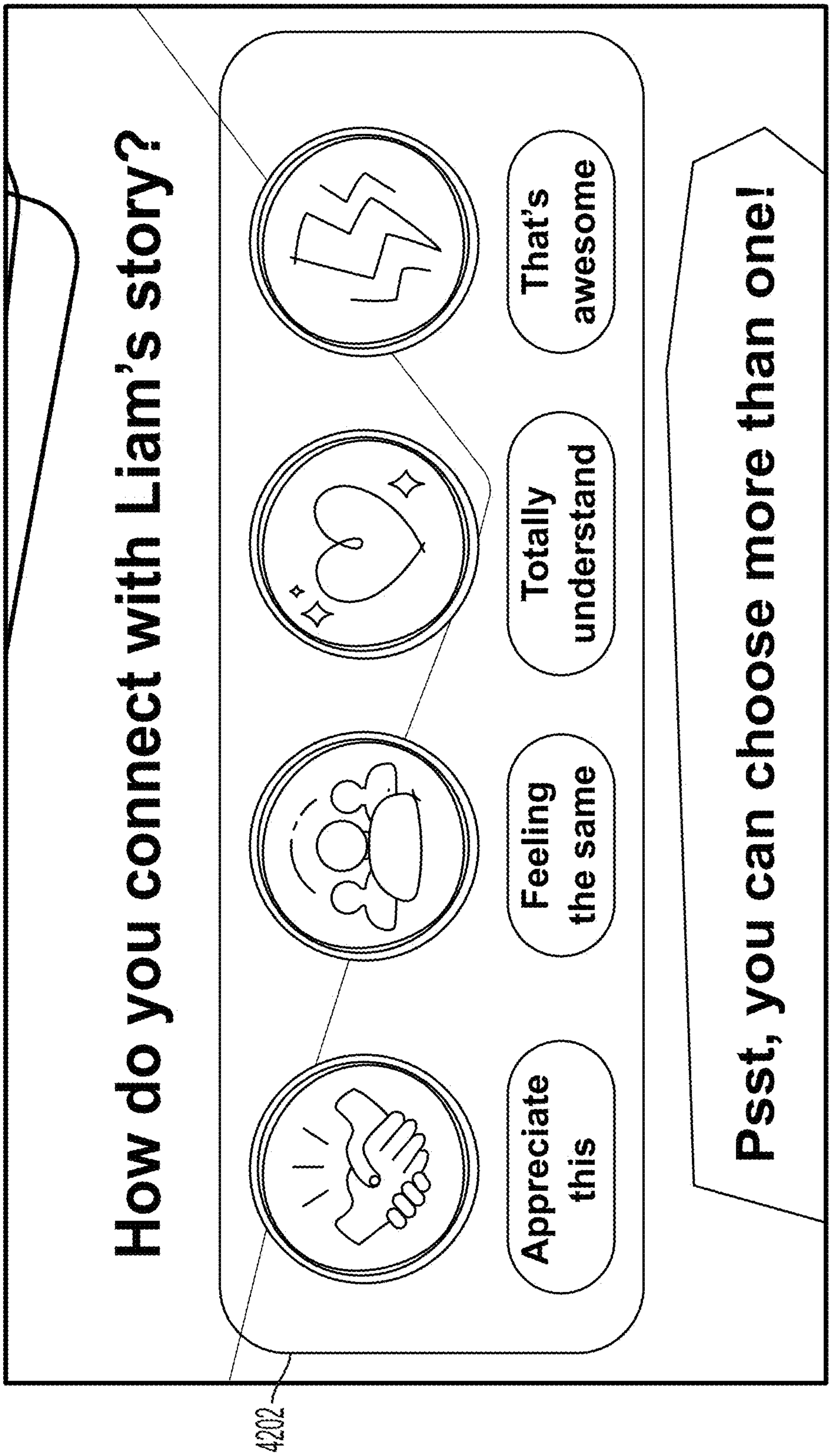
FIG. 42 illustrates example game reaction badges, in accordance with some embodiments of the technology described herein.
Figure 43:
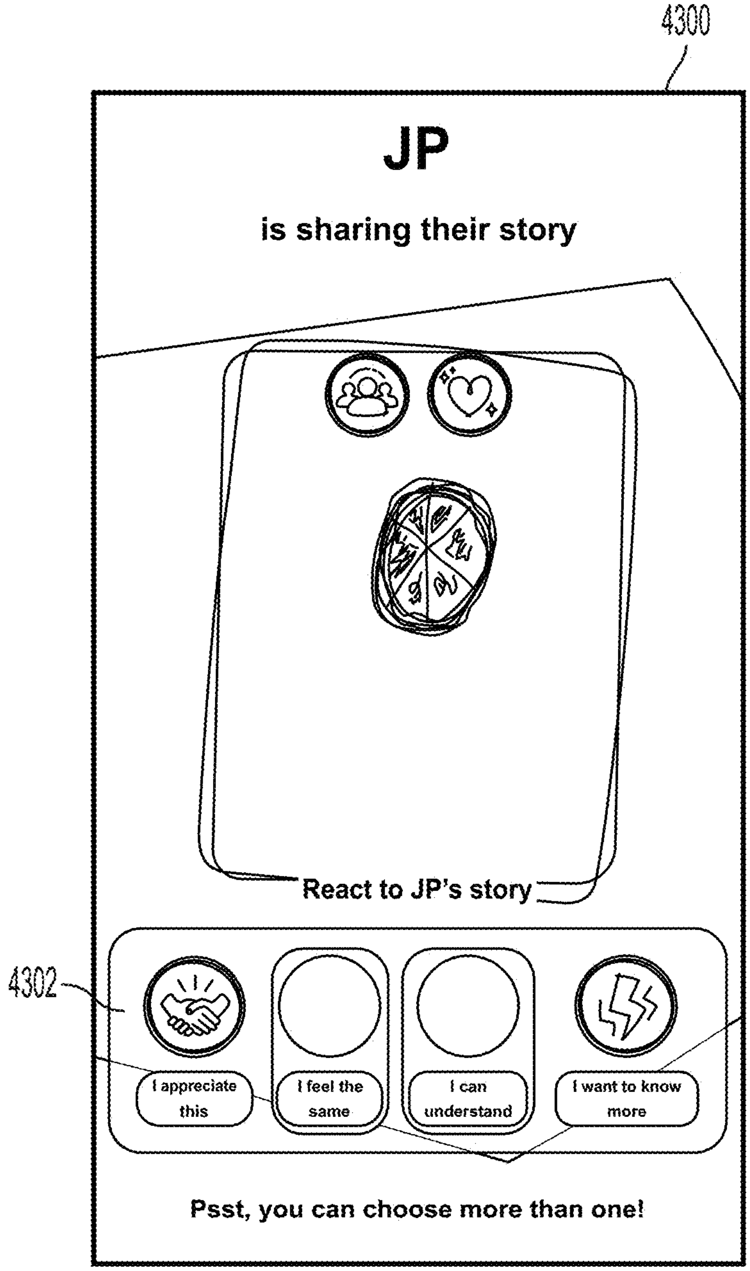
FIG. 43 is a screenshot of an example user interface through which participants can select game reaction badge (s), in accordance with some embodiments of the technology described herein.

In some embodiments, participants may choose from multiple game reaction badges 4202, examples of which are shown in FIG. 42. FIG. 42 shows four in-game reaction badges representing trust "Appreciate this"; belonging "Feeling the same"; empathy "Totally understand"; engagement "That's awesome". Participants may react to a story by choosing one or more of badges 4302, in the interface 4300 shown in FIG. 43, indicating their reaction to the shared story. Once selected, badges may migrate to the top of the screen unless unselected. These reactions may be counted to inform the reaction score in the insights dashboard.

Figure 44:
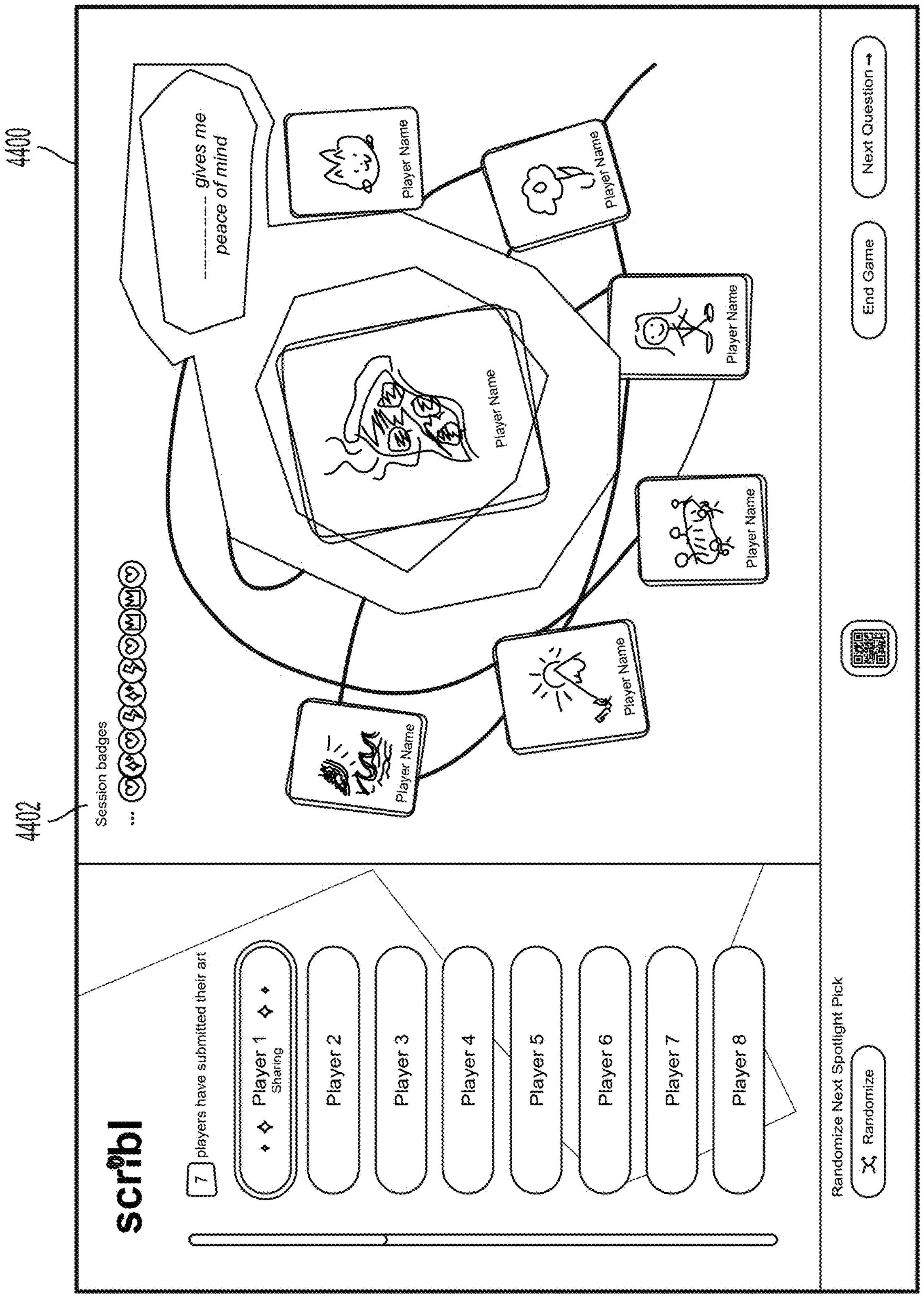
FIG. 44 is a screenshot of an example user interface with a gameboard, in accordance with some embodiments of the technology described herein.

In some embodiments, the gameboard may display a live tally of in-game reactions received in the top left of the screen-labeled "Session Badges" 4402, examples of which are shown in interface 4400 of FIG. 44. As shown in FIG. 44, the last ten reactions received are displayed as session badges 4402. These reactions shift as new reactions are input by participants.

Figure 45:
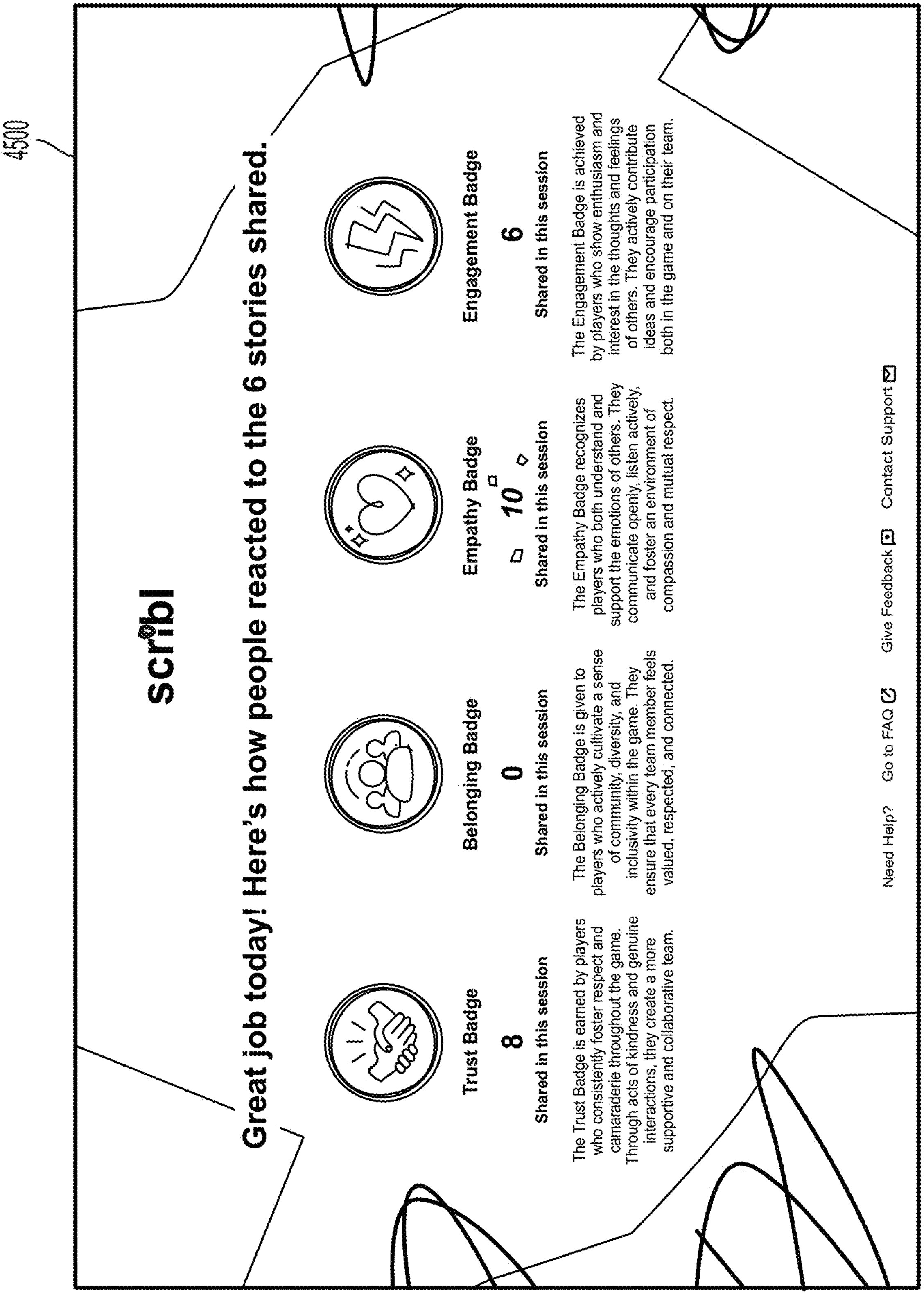
FIG. 45 is a screenshot of an example end game interface presented to a host user, in accordance with some embodiments of the technology described herein.

In some embodiments, an end game screen 4500 shown in FIG. 45 may be presented for a host user. The end game screen 4500 displays a tally of all badges given by participants along with a brief description of each badge and how it relates to team dynamics. The badge that was given or selected the most may be highlighted.

Figure 46:
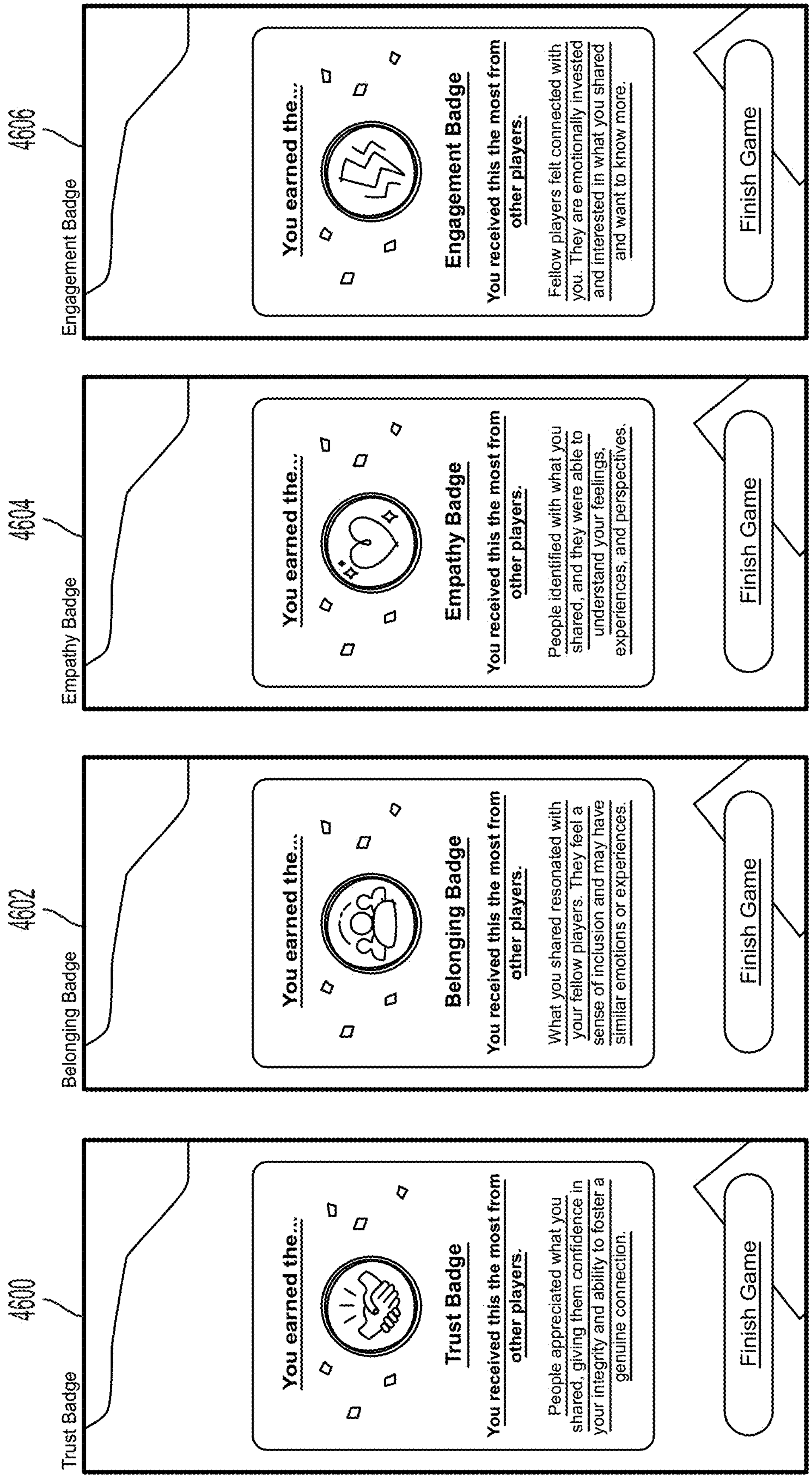
FIG. 46 is a screenshot including example end game interfaces presented to participants, in accordance with some embodiments of the technology described herein.
Figure 47:
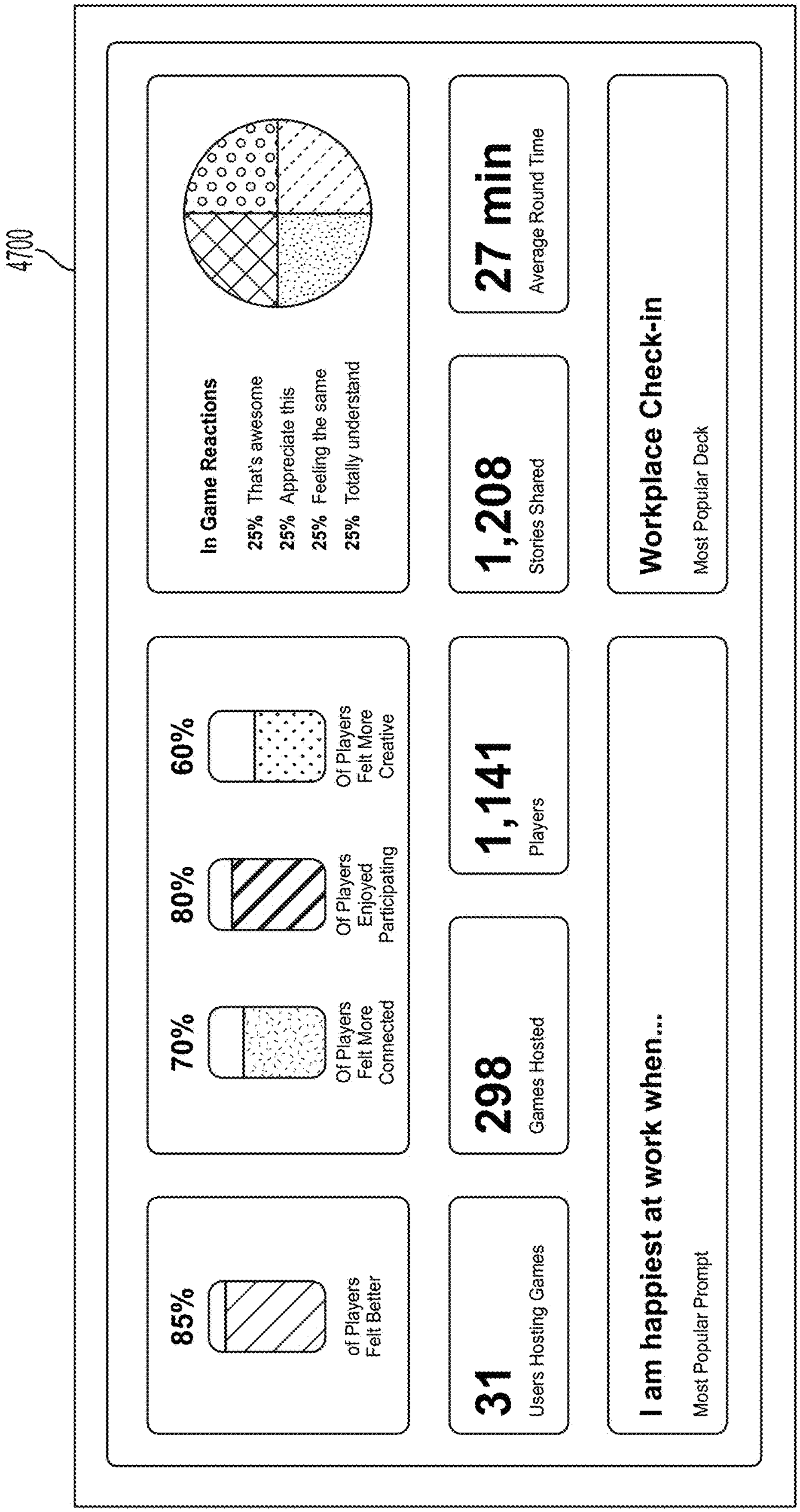
FIG. 47 is a screenshot of an example user interface with an insights dashboard, in accordance with some embodiments of the technology described herein.

In some embodiments, an end game screen, such as screen 4600, 4602, 4604, or 4606 shown in FIG. 46 may be presented for a participant. After entering their post-sentiment, participants may be awarded a badge based on the number of in-game reactions received. The badge they received the most may be displayed along with a short description of the badge and how it relates personally. If they receive an equal number of 2 or more badges, the badge to be displayed may be randomly selected from the 2 or more badges.

Figure 48:
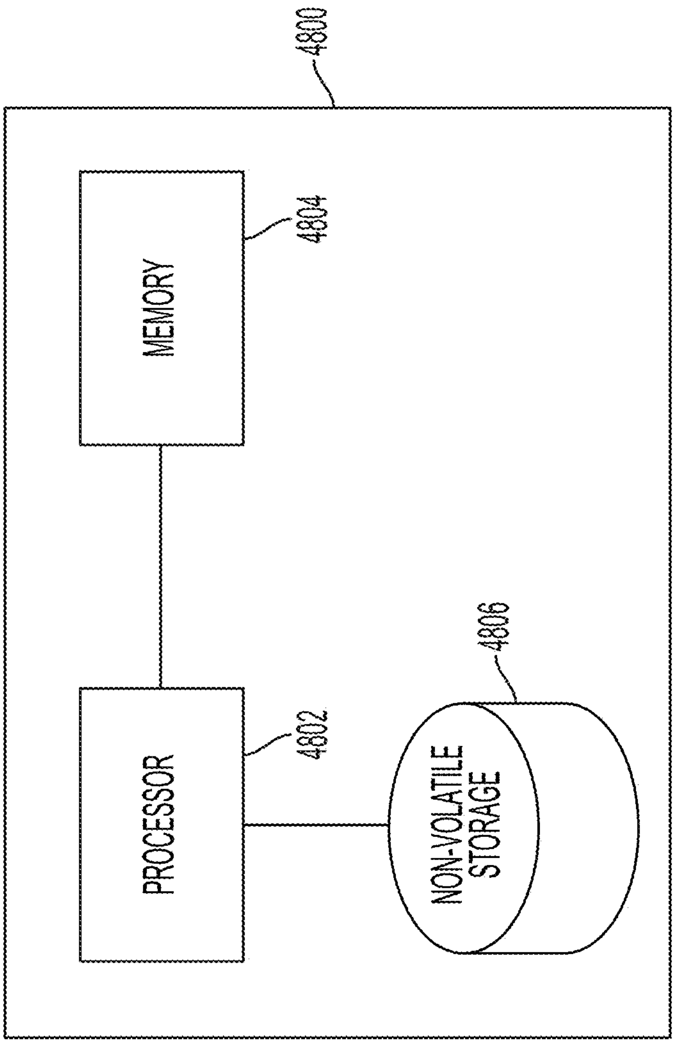
FIG. 48 is a block diagram of an example computing system, according to some embodiments of the technology described herein.

FIG. 48 shows a block diagram of an example computer system 4800 that may be used to implement embodiments of the technology described herein. The computing device 4800 may include one or more computer hardware processors 4802 and non-transitory computer-readable storage media (e.g., memory 4804 and one or more non-volatile storage devices 4806). The processor(s) 4802 may control writing data to and reading data from (1) the memory 4804; and (2) the non-volatile storage device(s) 4806. To perform any of the functionality described herein, the processor(s) 4802 may execute one or more processor-executable instructions stored in one or more non-transitory computer-readable storage media (e.g., the memory 4804), which may serve as non-transitory computer-readable storage media storing processor-executable instructions for execution by the processor(s) 4802.

The computer system 4800 may be a portable computing device (e.g., a smartphone, a tablet computer, a laptop, or any other mobile device), a computer (e.g., a desktop, a rack-mounted computer, a server, etc.), or any other type of computing device.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method comprising:

using at least one processor of a computer-based collaborative platform to perform:

launching a collaborative session for each of a first computing device and a second computing device;

receiving from the first computing device and during an interactive period of the collaborative session:

a first drawing input from a first user of the first computing device via a first drawing canvas presented via a first user interface of the first computing device, the first drawing input including a first drawing corresponding to a prompt; and a first sentiment input from the first user of the first computing device via one or more first graphical user elements presented via the first user interface corresponding to one or more sentiments, the first sentiment input indicating a sentiment of the first user of the first computing device to a story and/or drawing shared by a second user of the second computing device;

receiving from the second computing device and during the interactive period of the collaborative session:

a second drawing input from the second user of the second computing device via a second drawing canvas presented via a second user interface of the second computing device, the second drawing input including a second drawing corresponding to the prompt; and a second sentiment input from the second user of the second computing device via one or more second graphical user elements presented via the second user interface corresponding to the one or more sentiments, the second sentiment input indicating a sentiment of the second user of the second computing device to a story and/or drawing shared by the first user of the first computing device;

receiving, via the first user interface, a set of third sentiment inputs from the first user of the first computing device via one or more third graphical user elements presented via the first user interface, the set of third sentiment inputs indicating sentiments of the first user prior to and after the interactive period of the collaborative session;

receiving, via the second user interface, a set of fourth sentiment inputs from the second user of the second computing device via one or more fourth graphical user elements presented via the second user interface, the set of fourth sentiment inputs indicating sentiments of the second user prior to and after the interactive period of the collaborative session; and generating artwork comprising:

generating a background image for the artwork by:

providing, as inputs to at least one machine learning model, the first sentiment input, the second sentiment input, the set of third sentiment inputs, and the set of fourth sentiment inputs; and processing, using the at least one machine learning model, the first sentiment input, the second sentiment input, the set of third sentiment inputs and the set of fourth sentiment inputs to generate a visualization representing changes in sentiments of the first and second users from prior to the interactive period of the collaborative session to after the interactive period of the collaborative session; and determining a placement of the first drawing and the second drawing on the background image by processing, using the at least one machine learning model, the first drawing input from the first user of the first computing device, the first sentiment input from the first user of the first computing device, the second drawing input from the second user of the second computing device, and the second sentiment input from the second user of the second computing device.

2. The method of claim 1, further comprising:

launching the collaborative session for each of a plurality of computing devices including the first and second computing devices;

receiving a plurality of inputs from the plurality of computing devices during the interactive period of the collaborative session, the plurality of inputs comprising:

a first set of inputs from users of plurality of computing devices, the first set of inputs comprising drawings corresponding to the prompt; and a second set of inputs from the users of the plurality of computing devices, the second set of inputs comprising inputs indicating sentiments of users to each other's drawings and/or stories shared through the respective user interfaces of the plurality of computing devices; and generating the artwork using the first set of inputs and the second set of inputs.

3. The method of claim 1, further comprising:

receiving requests from the first and second computing devices to join the collaborative session, wherein the requests are generated by scanning of a machine-readable code using respective cameras of the first and second computing devices.

4. The method of claim 1, wherein launching the collaborative session for each of the first computing device and the second computing device comprises:

launching a collaborative game session for each of the first and second computing devices.

5. The method of claim 4, wherein generating the artwork further comprises:

generating the artwork using one or more session parameters.

6. The method of claim 1, wherein one or more characteristics of the visualization are changed to represent emotional journeys of the first and second users from prior to the interactive period of the collaborative session to after the interactive period of the collaborative session.

7. The method of claim 1, further comprising:

generating one or more sentiment scores based on the first sentiment input from the first user of the first computing device, the second sentiment input from the second user of the second computing device, the set of third sentiment inputs from the first user of the first computing device, and the set of fourth sentiment inputs from the second user of the second computing device; and generating the background image for the artwork by processing, using the at least one machine learning model, the one or more sentiment scores.

8. The method of claim 1, wherein generating the background image for the artwork comprises creating variations of the first drawing and the second drawing.

9. The method of claim 1, further comprising:

overlaying the first drawing input from the first user of the first computing device and the second drawing input from the second user of the second computing device onto the background image in accordance with the determined placement.

10. The method of claim 8, further comprising:

communicating the generated artwork to the first computing device and the second computing device.

11. A system comprising:

at least one processor; and at least one non-transitory computer-readable storage medium storing instructions that, when executed by the at least one processor, cause the at least one processor to perform a method comprising:

launching a collaborative session for each of a first computing device and a second computing device;

receiving from the first computing device and during an interactive period of the collaborative session:

a first drawing input from a first user of the first computing device via a first drawing canvas presented via a first user interface of the first computing device, the first drawing input including a first drawing corresponding to a prompt; and a first sentiment input from the first user of the first computing device via one or more first graphical user elements presented via the first user interface corresponding to one or more sentiments, the first sentiment input indicating a sentiment of the first user of the first computing device to a story and/or drawing shared by a second user of the second computing device;

receiving from the second computing device and during the interactive period of the collaborative session:

a second drawing input from the second user of the second computing device via a second drawing canvas presented via a second user interface of the second computing device, the second drawing input including a second drawing corresponding to the prompt; and a second sentiment input from the second user of the second computing device via one or more second graphical user elements presented via the second user interface corresponding to the one or more sentiments, the second sentiment input indicating a sentiment of the second user of the second computing device to a story and/or drawing shared by the first user of the first computing device;

receiving, via the first user interface, a set of third sentiment inputs from the first user of the first computing device via one or more third graphical user elements presented via the first user interface, the set of third sentiment inputs indicating sentiments of the first user prior to and after the interactive period of the collaborative session;

receiving, via the second user interface, a set of fourth sentiment inputs from the second user of the second computing device via one or more fourth graphical user elements presented via the second user interface, the set of fourth sentiment inputs indicating sentiments of the second user prior to and after the interactive period of the collaborative session; and generating artwork comprising:

generating a background image for the artwork by:

providing, as inputs to at least one machine learning model, the first sentiment input, the second sentiment input, the set of third sentiment inputs, and the set of fourth sentiment inputs; and processing, using the at least one machine learning model, the first sentiment input, the second sentiment input, the set of third sentiment inputs and the set of fourth sentiment inputs to generate a visualization representing changes in sentiments of the first and second users from prior to the interactive period of the collaborative session to after the interactive period of the collaborative session; and determining a placement of the first drawing and the second drawing on the background image by processing, using the at least one machine learning model, the first drawing input from the first user of the first computing device, the first sentiment input from the first user of the first computing device, the second drawing input from the second user of the second computing device, and the second sentiment input from the second user of the second computing device.

12. The system of claim 11, wherein the method further comprises:

launching the collaborative session for each of a plurality of computing devices including the first and second computing devices;

receiving a plurality of inputs from the plurality of computing devices during the interactive period of the collaborative session, the plurality of inputs comprising:

a first set of inputs from users of plurality of computing devices, the first set of inputs comprising drawings corresponding to the prompt; and a second set of inputs from the users of the plurality of computing devices, the second set of inputs comprising inputs indicating sentiments of users to each other's drawings and/or stories shared through the respective user interfaces of the plurality of computing devices; and generating the artwork using the first set of inputs and the second set of inputs.

13. The system of claim 11, wherein:

one or more characteristics of the visualization are changed to represent emotional journeys of the first and second users from prior to the interactive period of the collaborative session to after the interactive period of the collaborative session.

14. The system of claim 11, wherein the method further comprises:

generating one or more sentiment scores based on the first sentiment input from the first user of the first computing device, the second sentiment input from the second user of the second computing device, the set of third sentiment inputs from the first user of the first computing device, and the set of fourth sentiment inputs from the second user of the second computing device; and generating the background image for the artwork by processing, using the at least one machine learning model, the one or more sentiment scores.

15. The system of claim 11, wherein generating the background image for the artwork comprises creating variations of the first drawing and the second drawing.

16. The system of claim 11, wherein the method further comprises:

overlaying the first drawing input from the first user of the first computing device and the second drawing input from the second user of the second computing device onto the background image in accordance with the determined placement.

17. The system of claim 11, wherein launching the collaborative session for each of the first computing device and the second computing device comprises:

launching a collaborative game session for each of the first and second computing devices.

18. The system of claim 11, wherein generating the artwork further comprises:

generating the artwork using one or more session parameters.

19. The system of claim 18, wherein the method further comprises:

communicating the generated artwork to the first and second computing devices.

20. At least one non-transitory computer-readable storage medium storing instructions that, when executed by at least one processor, cause the at least one processor to perform a method comprising:

launching a collaborative session for each of a first computing device and a second computing device;

receiving from the first computing device and during an interactive period of the collaborative session:

a first drawing input from a first user of the first computing device via a first drawing canvas presented via a first user interface of the first computing device, the first drawing input including a first drawing corresponding to a prompt; and a first sentiment input from the first user of the first computing device via one or more first graphical user elements presented via the first user interface corresponding to one or more sentiments, the first sentiment input indicating a sentiment of the first user of the first computing device to a story and/or drawing shared by a second user of the second computing device;

receiving from the second computing device and during the interactive period of the collaborative session:

a second drawing input from the second user of the second computing device via a second drawing canvas presented via a second user interface of the second computing device, the second drawing input including a second drawing corresponding to the prompt; and a second sentiment input from the second user of the second computing device via one or more second graphical user elements presented via the second user interface corresponding to the one or more sentiments, the second sentiment input indicating a sentiment of the second user of the second computing device to a story and/or drawing shared by the first user of the first computing device;

receiving, via the first user interface, a set of third sentiment inputs from the first user of the first computing device via one or more third graphical user elements presented via the first user interface, the set of third sentiment inputs indicating sentiments of the first user prior to and after the interactive period of the collaborative session;

receiving, via the second user interface, a set of fourth sentiment inputs from the second user of the second computing device via one or more fourth graphical user elements presented via the second user interface, the set of fourth sentiment inputs indicating sentiments of the second user prior to and after the interactive period of the collaborative session; and generating artwork comprising:

generating a background image for the artwork by:

providing, as inputs to at least one machine learning model, the first sentiment input, the second sentiment input, the set of third sentiment inputs, and the set of fourth sentiment inputs; and processing, using the at least one machine learning model, the first sentiment input, the second sentiment input, the set of third sentiment inputs and the set of fourth sentiment inputs to generate a visualization representing changes in sentiments of the first and second users from prior to the interactive period of the collaborative session to after the interactive period of the collaborative session; and determining a placement of the first drawing and the second drawing on the background image by processing, using the at least one machine learning model, the first drawing input from the first user of the first computing device, the first sentiment input from the first user of the first computing device, the second drawing input from the second user of the second computing device, and the second sentiment input from the second user of the second computing device.

* * * * *